United States Patent [19]
Miyazaki et al.

[11] Patent Number: 6,162,264
[45] Date of Patent: *Dec. 19, 2000

[54] PROCESS FOR PRODUCING POROUS COATING LAYER ELECTRODE PLATE FOR SECONDARY BATTERY WITH NONAQUEOUS ELECTROLYTE PROCESS FOR PRODUCING SAME AND SHEET FOR PEELING ACTIVE MATERIAL LAYER

[75] Inventors: Yuichi Miyazaki; Shin Miyanowaki; Yasushi Sato; Tadafumi Shindo, all of Tokyo-to, Japan

[73] Assignee: Dai Nippon Printing Co., Ltd., Tokyo-to, Japan

[*] Notice: This patent is subject to a terminal disclaimer.

[21] Appl. No.: 08/876,983

[22] Filed: Jun. 16, 1997

[30] Foreign Application Priority Data

| Jun. 17, 1996 | [JP] | Japan | 8-177507 |
| Nov. 6, 1996 | [JP] | Japan | 8-308666 |
| Mar. 4, 1997 | [JP] | Japan | 9-049376 |
| Mar. 14, 1997 | [JP] | Japan | 9-079121 |

[51] Int. Cl.$^7$ ............................................. H01M 4/04
[52] U.S. Cl. ........................................................ 29/623.5
[58] Field of Search .................... 29/2, 623.5, 623.1; 141/1.1, 32, 33; 429/233, 232, 234, 245; 427/271

[56] References Cited

U.S. PATENT DOCUMENTS

| 3,860,388 | 1/1975 | Haigh . | |
| 4,196,033 | 4/1980 | Arai et al. | 156/196 |
| 4,242,378 | 12/1980 | Arai | 427/264 |
| 4,610,744 | 9/1986 | Smith et al. | 156/235 |
| 4,783,384 | 11/1988 | Van Beek et al. | 429/218 |
| 5,154,993 | 10/1992 | Beatty | 429/211 |
| 5,419,982 | 5/1995 | Tura et al. | 429/162 |
| 5,435,054 | 7/1995 | Tonder et al. | 29/623 |
| 5,612,153 | 3/1997 | Moulton et al. | 429/191 |
| 5,616,152 | 4/1997 | Velasquez et al. | 29/623.5 |

FOREIGN PATENT DOCUMENTS

| 0216230 | 4/1987 | European Pat. Off. | B44C 5/04 |
| 1029511 | 5/1966 | United Kingdom . | |

*Primary Examiner*—Maria Nuzzolillo
*Assistant Examiner*—Jonathan Crepeau
*Attorney, Agent, or Firm*—Ladas & Parry

[57] ABSTRACT

A porous coating layer formed on a substrate is impregnated, based on a prescribed pattern, with liquid material having a larger cohesion after solidification thereof than that of the coating layer. The liquid material is solidified to form a solidified material. Then, a portion of the coating layer, which has been impregnated with the solidified material is peeled to expose partially the surface of the substrate on the basis of the prescribed pattern, thereby producing the porous coating layer having the prescribed pattern. An electrode plate for a secondary battery with a nonaqueous electrolyte can be produced by utilizing the above-mentioned production process.

33 Claims, 15 Drawing Sheets

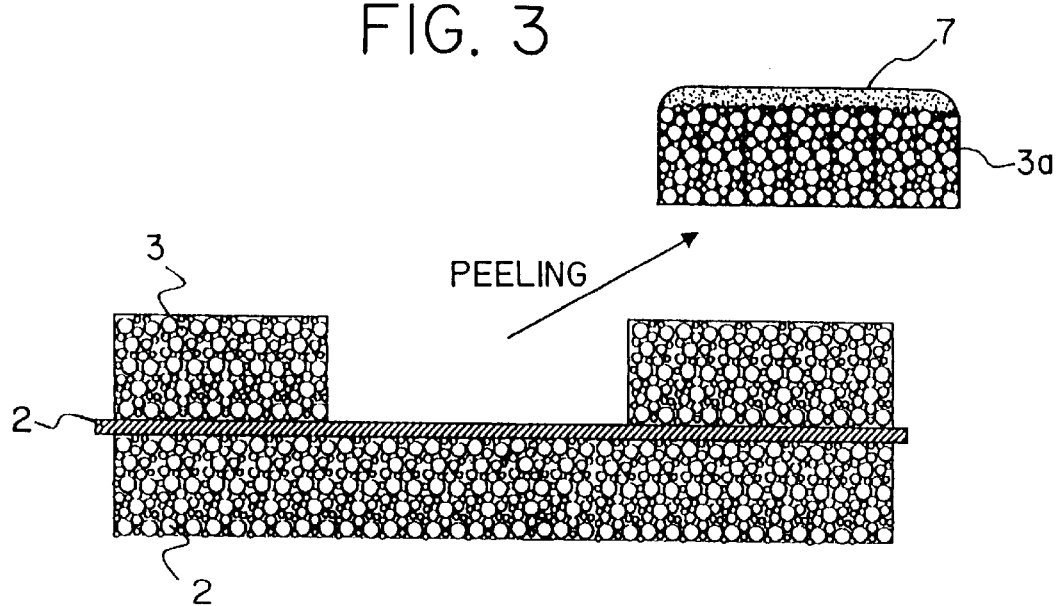
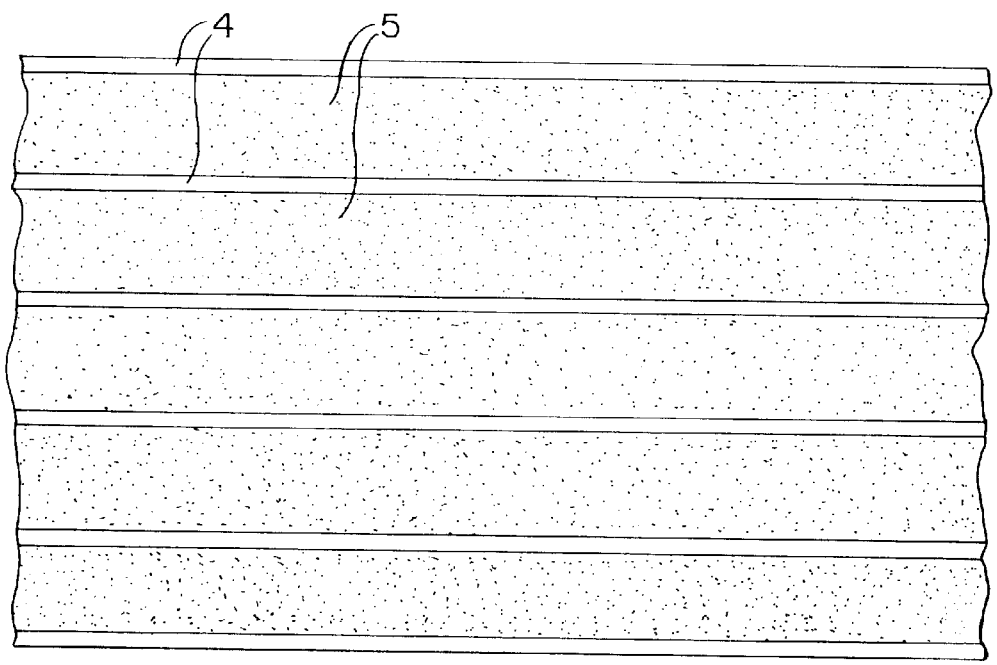

HEATING

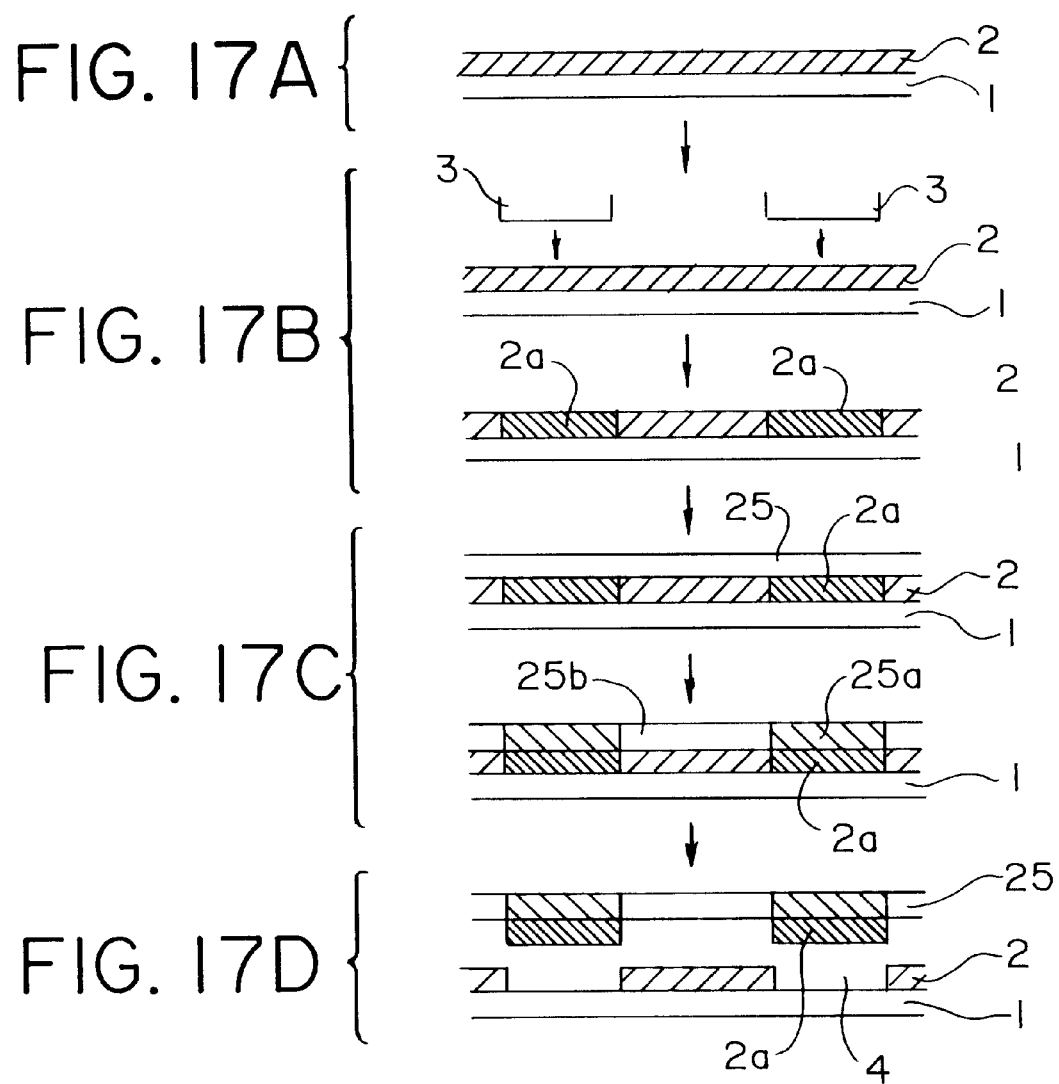

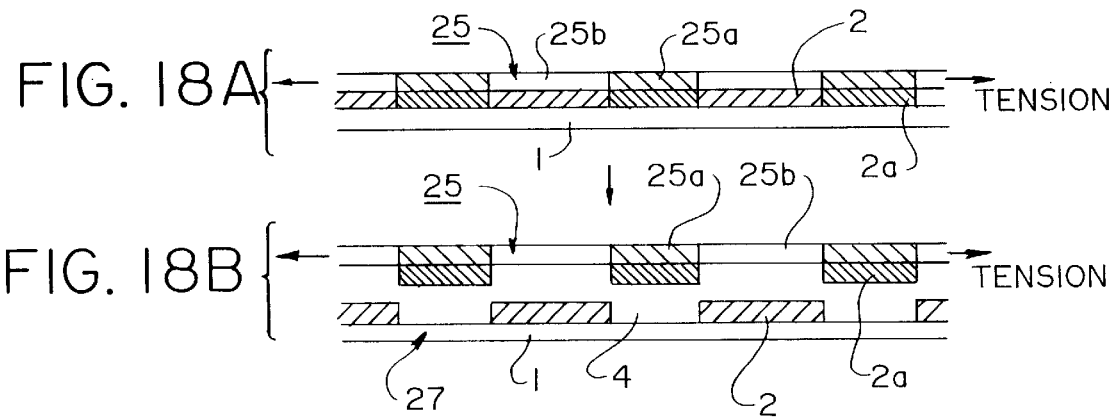
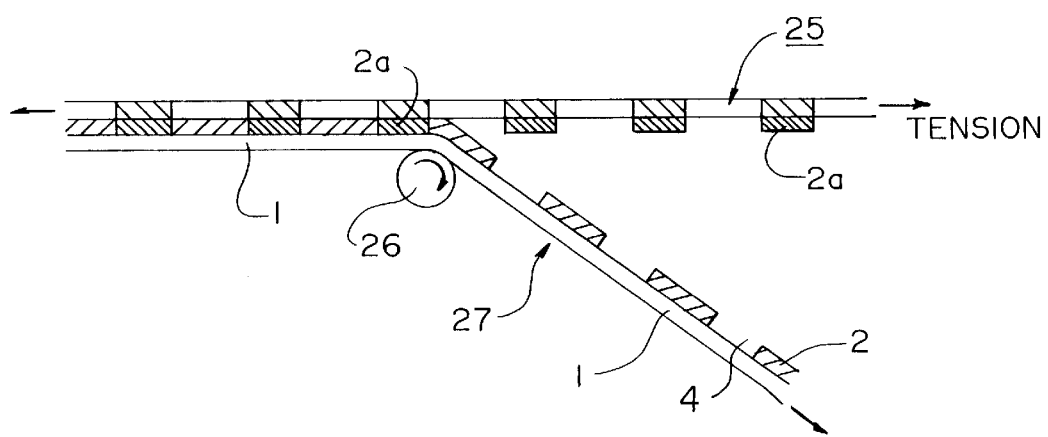

PROCESS FOR PRODUCING POROUS COATING LAYER ELECTRODE PLATE FOR SECONDARY BATTERY WITH NONAQUEOUS ELECTROLYTE PROCESS FOR PRODUCING SAME AND SHEET FOR PEELING ACTIVE MATERIAL LAYER

BACKGROUND OF THE INVENTION

1. Field of the Invention

The present invention relates to a process for producing a porous coating layer, especially a porous coating layer having a prescribed pattern, which is suitable for an active material layer of an electrode plate for a secondary battery with a nonaqueous electrolyte; a process for producing an electrode plate for a secondary battery with a nonaqueous electrolyte, in which the above-mentioned process for producing the porous coating layer is utilized; the electrode plate for a secondary battery with a nonaqueous electrolyte obtained by the above-mentioned process; and a sheet for peeling an active material layer, especially a sheet for peeling an active material layer used in the above-mentioned process for producing the electrode plate for a secondary battery with a nonaqueous electrolyte.

2. Description of the Related Art

In recent years, reduction in size and weight of electronic equipment and communication equipment has rapidly been advanced. This advance has also required reduction in size and weight of batteries used as a driving power source for these equipment. As a result, there has been proposed commercialization of secondary batteries with a nonaqueous electrolyte in which lithium ion secondary batteries having high voltage and high energy density were exemplified as an typical example, in replacement of conventional alkaline batteries.

FIG. 22 shows a structure of a cylindrical shape-lithium ion secondary battery as generally used. The cylindrical shape-lithium ion secondary battery 34 as generally used has an external; appearance given by a metallic column. The battery 34 has a positive electrode 35 at its one end, and a negative electrode 36 at its another end. The battery 34 has an inside structure in which a positive electrode plate 37 generally made of lithium compound such as $LiCoO_2$, a negative electrode plate 38 made of carbonaceous material and a separator 39 arranged between the positive electrode plate 37 and the negative electrode plate 38 for preventing a short circuit of them are wound in a piled up state. The battery is filled with a nonaqueous electrolyte 40 as an electrolyte, which is obtained by dissolving lithium salts into an organic solvent, since lithium contained in the positive electrode plate 37 has a character of reacting with water. Terminals for introducing an electric current (i.e., a positive cable terminal 41 and a negative cable terminal 42) are connected to the above-mentioned electrode.

Regarding an electrode plate, which has a great influence on the performance of the secondary batteries with a non-aqueous electrolyte, there have been proposed methods for increasing the area of the electrode plate which is wound in the battery by reducing the thickness of the electrode in order to prolong the charge-discharge cycle life and to increase the energy density. For example, Japanese Patent Laid-Open Nos. 10456/1988 and 285262/1991 disclose a process for producing a positive electrode plate, which comprises the steps of: dispersing and dissolving an active material powder for a positive electrode plate, which comprises metallic oxides, sulfides, halides and the like, conductive agents and a binder into a suitable wetting agent (hereinafter referred to as the "solvent") to prepare an active material coating composition in the form of paste, and applying the above-mentioned active material coating composition on the surface of a collector as a substrate, made of a metallic foil to prepare an active material layer for a positive electrode plate (hereinafter referred to as the "positive electrode coating layer"). An active material layer for a negative electrode plate obtained by applying the above-mentioned active material coating composition on the substrate is hereinafter referred to as the "negative electrode coating layer". Both of the positive and negative electrode coating layers are simply referred to as the "coating layer". In the preparation of such a positive electrode plate, there is used as a binder, fluororesins such as polyvinylidene fluoride; silicone-acrylic copolymer; styrene-butadiene copolymer, and the like.

A negative electrode plate can be obtained by adding a binder and a suitable wetting agent (i.e., a solvent) to an active material such as carbon for a negative electrode plate to prepare an active material coating composition in the form of paste, and applying the thus prepared active material coating composition to a collector made of a metallic foil.

The binder for preparing the active material coating composition for the above-described coating type electrode plate is required to be chemically stable against the nonaqueous electrolyte, insoluble in the electrolyte, and soluble in a certain solvent to be able to be applied to the surface of the substrate in the form of thin film. The coating layer obtained by applying the coating composition, and drying same is required to be so flexible that there is no occurrence of peeling, chipping and cracks in the coating layer during the assembling step of the battery, and to be excellent in adhesivity to the collector made of a metallic foil.

The existence of the active material and the coating layer is unfavorable for a certain portion of the above-mentioned electrode plate, for example, for a portion to which a terminal for introducing an electric current is connected, and for a portion along which the electrode plate is subjected to a cutting work. Accordingly, the electrode plate has non-coated portions on the basis of a prescribed pattern determined when making a plan for a battery. FIG. 5 is a plan view of the electrode plate. There are formed non-coated portions, i.e., peeled portions 6 to which cable terminals are connected, between the coating layers 2. FIG. 23 is a plan view of a original sheet for a plurality of electrode plates. The original sheet has longitudinal non-coated portions along the both longitudinal edges of the original sheet and lateral non-coated portions 4 which cross the above-mentioned longitudinal non-coated portions at right angles.

As a process for forming a pattern of the non-coated portion, there has been a process of mechanically controlling a coating head during applying the coating composition for an electrode plate onto the collector, to directly form each pattern of the coated portion (i.e., a portion in which the coating layer exists) and the non-coated portion, and another process of peeling the prescribed portion of the coating layer (prepared by applying the coating composition for the electrode plate onto the collector and drying same) by means of a mechanical means, for example, a spatula or the like, to form the non-coated portion.

However, the process of mechanically controlling the coating head has a problem of insufficient mechanical accuracy, thus making it hard to form a prescribed pattern at a high velocity while maintaining a proper measurement accuracy of the pattern, and leading to non-uniform thickness of the coating layer. The process of partially peeling the dried coating layer requires a long period of time for the peeling, and has problems that a proper measurement accuracy of the pattern cannot be maintained, and production of powder at peeled edges of the coating layer on the basis of the pattern may be caused during or after the peeling step.

SUMMARY OF THE INVENTION

The first object of the present invention is to provide a process for producing a porous coating layer having a prescribed pattern, which permits to keep the thickness of the coating layer uniform and to keep the prescribed pattern sharp.

The second object of the present invention is to provide a process for producing an electrode plate having a prescribed pattern for a secondary battery with a nonaqueous electrolyte, which permits to keep the thickness of the active material layer uniform and to keep the prescribed pattern sharp.

The third object of the present invention is to provide an electrode plate having a prescribed pattern for a secondary battery with a nonaqueous electrolyte, in which the thickness of the active material layer is kept uniform and the prescribed pattern is kept sharp.

The fourth object of the present invention is to provide a sheet for peeling an active material layer which permits to effectively form a prescribed sharp pattern in the above-described process for producing the porous coating layer and the above-described process for producing the electrode plate for a secondary battery with a nonaqueous electrolyte.

The present inventors have carried out extensive studies in order to solve the problems of the conventional prior art, and have obtained the following findings:

(a) The coating layer for the electrode plate is porous. When the coating layer having numerous fine cavities existing therein is impregnated with liquid material having a larger cohesion after solidification thereof than that of the coating layer in an optional pattern, the liquid material solidifies by the cooling or through chemical reaction so as to surround the coating layer. Only a portion of the coating layer in which the liquid material is solidified, can easily be peeled from the surface of the collector. Thus, the surface of the collector can be partially and well exposed without leaving portions to be removed of the coating layer non-peeled, the boundary between the peeled portions and the non-peeled portion of the coating layer is kept very sharp, and there is no occurrence of problems of production of powder even when carrying out the peeling step;

(b) When a porous sheet is brought into contact with the portion of the coating layer which is impregnated with the liquid material, prior to the solidification of the liquid material, to the portion of the coating layer and the porous sheet is combined together through the liquid material, the impregnated portion of the coating layer can be peeled together with the porous sheet.

The present invention has been made on the basis of the above-mentioned findings.

In order to attain the first object of the present invention, the process thereof for producing a porous coating layer having a prescribed pattern, comprises the steps of:

impregnating a porous coating layer formed on a substrate with liquid material having a larger cohesion after solidification thereof than that of said coating layer based on a prescribed pattern;

solidifying said liquid material to form a solidified material; and peeling a portion of said coating layer, which has been impregnated with said solidified material, to expose partially a surface of said substrate based on said prescribed pattern.

In order to attain the second object of the present invention, the process thereof for producing an electrode plate for a secondary battery with a nonaqueous electrolyte, comprises the steps of:

applying an electrode forming composition comprising active material and a binder on a collector, and drying same to form an active material layer on the collector;

impregnating said active material layer with liquid material having a larger cohesion after solidification thereof than that of said active material based on a prescribed pattern;

solidifying said liquid material to form a solidified material; and peeling a portion of said active material layer, which has been impregnated with said solidified material, to expose partially a surface of said collector based on said prescribed pattern.

In these processes, (1) Said liquid material preferably comprises material which is solid at a room temperature, and can be liquefied by heat.
(2) Said material which can be liquefied by heat preferably comprises at least one of thermoplastic resin, organic or inorganic wax and a low melting point-metal.
(3) Said material which can be liquefied by heat preferably has viscosity of from 10 to 50,000 cP when the melting thereof.
(4) Said material which can be liquefied by heat preferably has a melting point of from 20° C. to 250° C.
(5) Said material which can be liquefied by heat preferably comprises at least one of polyethylene, polypropylene, low molecular weight polyethylene, low molecular weight polypropylene, wax and derivative thereof.
(6) Said liquid material may comprise material which can be solidified by chemical reaction.
(7) Said liquid material may comprise at least one of polymerization material and cross-linking material.
(8) Said substrate may be a collector for a lithium battery.
(9) Said porous coating layer may be a coating layer comprising active material and a binder.
(10) A step of bringing a porous sheet into contact with a surface of said coating layer to cause a part of said liquid material existing in said coating layer and/or existing on the surface thereof to migrate into said porous sheet may be carried out between said step of impregnating the coating layer with the liquid material based on the prescribed pattern and said step of solidifying the liquid material; said step of solidifying the liquid material may comprise integrally solidifying the liquid material remaining in said coating layer and the liquid material caused to migrate into said porous sheet; and said step of peeling the portion of the coating layer may comprise peeling the portion of the coating layer, which has been impregnated with the liquid material together with said porous sheet, to expose partially the surface of the substrate based on the prescribed pattern.

When carrying out these steps, the portion of the coating layer, which is impregnated with the liquid material in the form of a pattern, can be peeled after the solidification of the liquid material together with the porous sheet stuck on the portion based on the pattern, with the result that all the portions of the coating layer to be removed on the basis of the pattern can be removed by carrying out a single peeling step without leaving the portions to be removed of the coating layer non-peeled. Since the porous sheet is placed, prior to the solidification of the liquid material, namely in the state of liquid, on the portion of the coating layer, which is impregnated with the liquid material, cracks do not easily tend to be produced on the portion of the coating layer to be removed. Accordingly, even when liquid material having larger cohesion is used, there is no occurrence of marks of crack on the exposed portion of the substrate, thus leading to a sharp edge of the formed pattern.

(11) The portion of the coating layer, which has been impregnated with the liquid material, is preferably peeled together with said porous sheet by peeling the porous sheet from the substrate while imparting tension to said porous sheet not so as to be loosened, in said step of partially exposing the surface of the substrate based on the prescribed pattern.

When pulling the porous sheet in order to peel the portion of the coating layer on the basis of the pattern, only the porous sheet may be peeled from the boundary between the porous sheet and the coating layer, with the result that only the porous sheet may be peeled from the electrode plate and the portions to be removed of the coating layer may be left non-peeled and remains on the substrate. The imparting of tension to the porous sheet not so as to be loosened can prevent the peeling of only the porous sheet.

(12) Said liquid material preferably comprise material which is solid at a room temperature, and can be liquefied by heat.

Since it is possible to remelt the liquid material with which the coating layer is impregnated on the basis of the pattern, by heat and to solidify the thus remelt liquid material again, the step of integrally bonding the porous sheet with the coating layer can be modified on the basis of various manners, thus making it possible to apply this process not only to a continuous production line but also to an intermittent production line.

(13) Said liquid material may comprise at least one of polymerization material and cross-linking material.

(14) Said substrate may be a collector for a lithium battery.

(15) Said binder may comprise fluororesin.

(16) Said liquid material may comprise thermoplastic resin; said step of impregnating the active material layer with the liquid material may comprise impregnating a portion of the active material layer to be removed with the thermoplastic resin by the use of heat; said step of solidifying the liquid material may comprise cooling said thermoplastic resin; and said step of peeling the active material layer may comprise removing said thermoplastic resin together with the portion of the active material to be removed.

(17) Said step of impregnating the portion of the active material layer to be removed with the thermoplastic resin may comprise heat-pressing a peeling sheet impregnated with said thermoplastic resin onto the portion of the active material layer to be removed; and said step of removing the thermoplastic resin together with the portion of the active material layer to be removed may comprise peeling said peeling sheet from said active material layer to remove said portion of the active material layer to be removed in a heat-pressing region together with the peeling sheet.

(18) Said thermoplastic resin in the item (16) preferably comprise at least one of polyethylene, polypropylene and derivative thereof.

(19) Said peeling sheet in the item (17) preferably comprise a porous sheet.

(20) Said thermoplastic resin in the item (17) preferably has a melting point of from 100° C. to 250° C.

(21) Said thermoplastic resin in the item (17) preferably has viscosity of from 100 to 50,000 cP when the melting thereof.

(22) Said peeling sheet in the item (17) may comprise a nonwoven fabric cloth.

(23) Heating in the item (17) in the heat-pressing of said peeling sheet may be conducted from a side of the collector.

(24) Said step in the item (16) of impregnating the portion of the active material layer to be removed with the thermoplastic resin may comprise heating said active material layer and then bringing a formed body which is made of said thermoplastic resin and is solid at a room temperature into contact with said portion of the active material layer to be removed.

(25) Said formed body in the item (24) made of the thermoplastic resin preferably has substantially the same shape as that of the portion of the active material layer to be removed.

(26) The active material layer may continuously be impregnated with said thermoplastic resin while pressing said formed body in the item (24) made of the thermoplastic resin on the heated surface of the active material layer.

(27) Said thermoplastic resin in the item (24) preferably comprise at least one of polyethylene, polypropylene and derivative thereof.

(28) Said thermoplastic resin in the item (24) preferably has a melting point of from 20° C. to 250° C.

(29) Said thermoplastic resin in the item (24) preferably has viscosity of from 100 to 50,000 cP when the melting thereof.

(30) Said heating of the active material layer in the item (24) may be conducted from a side of the collector.

(31) A step of bringing a porous sheet into contact with the active material layer to cause a part of said liquid material existing in said active material layer and/or existing on the surface thereof to migrate into said porous sheet may be carried out between said step of impregnating the active material layer with the liquid material and said step of solidifying the liquid material; said step of solidifying the liquid material may comprise integrally solidifying the liquid material remaining in said active material layer and the liquid material caused to migrate into said porous sheet; and said step of peeling the portion of the active material layer may comprise peeling the portion of the coating layer, which has been impregnated with the liquid material together with said porous sheet in the integral solidification condition of the liquid material in the active material layer and the liquid material in the porous sheet, to expose partially the surface of the substrate based on the prescribed pattern.

(32) The portion of the coating layer, which has been impregnated with the liquid material may be peeled together with said porous sheet by peeling the porous sheet from the collector while imparting tension to said porous sheet not so as to be loosened, in said step in the item (31) of partially exposing the surface of the collector based on the prescribed pattern.

(33) Said liquid material in the item (31) preferably comprises material which is solid at a room temperature, and can be liquefied by heat.

(34) Said material in the item (33) which can be liquefied by heat preferably comprise at least one of thermoplastic resin, organic or inorganic wax and a low melting point-metal.

(35) Said thermoplastic resin in the item (34) is preferably at least one thermoplastic resin selected from the group consisting of ethylene homopolymer, propylene homopolymer, ethylene copolymer and propylene copolymer.

(36) Said material in the item (33) which is solid at a room temperature, and can be liquefied by heat preferably has a melting point of from 20° C. to 250° C.

(37) Said material in the item (33) which is solid at a room temperature, and can be liquefied by heat preferably has viscosity of from 10 to 50,000 cP when the melting thereof.

(38) A step of bringing a porous sheet into contact with the active material layer to cause a part of said liquid material existing in said active material layer and/or existing on the surface thereof to migrate into said porous sheet may be carried out between said step of impregnating the active material layer with the liquid material and said step of solidifying the liquid material; said step of solidifying the liquid material may comprise integrally solidifying the liquid material remaining in said active material layer and the liquid material caused to migrate into said porous sheet by cooling same; and said step of peeling the portion of the active material layer may comprise peeling the portion of the coating layer, which has been impregnated with the liquid material together with said porous sheet in the integral solidification condition of the liquid material in the active material layer and the liquid material in the porous sheet, to expose partially the surface of the collector based on the prescribed pattern.

(39) A step of cooling the liquid material to solidify same, a step of bringing a porous sheet into contact with the active material layer and a step of heating contact portions of the active material layer and the porous sheet to remelt a part of the solidified liquid material so as to cause the remelt liquid material to migrate into the porous sheet may be conducted in this order between said step of impregnating the active material layer with the liquid material and said step of solidifying the liquid material; and said step of peeling the portion of the active material layer may comprise peeling the portion of the coating layer, which has been impregnated with the liquid material together with said porous sheet in the integral solidification condition of the liquid material in the active material layer and the liquid material in the porous sheet, to expose partially the surface of the collector based on the prescribed pattern.

(40) A step of cooling the liquid material to solidify same and a step of bringing a heated porous sheet into contact with the active material layer to remelt a part of the solidified liquid material so as to cause the remelt liquid material to migrate into the porous sheet may be conducted in this order between said step of impregnating the active material layer with the liquid material and said step of solidifying the liquid material; and said step of peeling the portion of the active material layer may comprise peeling the portion of the coating layer, which has been impregnated with the liquid material together with said porous sheet in the integral solidification condition of the liquid material in the active material layer and the liquid material in the porous sheet, to expose partially the surface of the collector based on the prescribed pattern.

According to the features in the items (38), (39) and (40), it is possible to produce an electrode plate having an excellent quality for a secondary battery with a nonaqueous electrolyte in which there is no occurrence of marks of crack on the non-coated portion after the peeling (i.e., the exposed portion of the collector), a proper measurement accuracy of the pattern can be maintained, no production of powder occurs at peeled edges of the coating layer on the basis of the pattern.

(41) Said porous sheet in the item (31) may comprise any one of polyester mesh, metallic mesh, cloth, paper and a nonwoven fabric cloth.

In order to attain the third object of the present invention, an electrode plate for a secondary battery with a nonaqueous electrolyte, can be produced by carrying out a process comprising the steps of:

applying an electrode forming composition comprising active material and a binder on a collector, and drying same to form an active material layer on the collector;

impregnating said active material layer with liquid material having a larger cohesion after solidification thereof than that of said active material based on a prescribed pattern;

solidifying said liquid material to form a solidified material; and peeling a portion of said active material layer, which has been impregnated with said solidified material, to expose partially a surface of said collector based on said prescribed pattern.

In the process carried out for the production of the above-described electrode plate for a secondary battery with a nonaqueous electrolyte, (1) Said liquid material may comprise thermoplastic resin; said step of impregnating the active material layer with the liquid material may comprise impregnating a portion of the active material layer to be removed with the thermoplastic resin by the use of heat; said step of solidifying the liquid material may comprise cooling said thermoplastic resin; and said step of peeling the active material layer may comprise removing said thermoplastic resin together with the portion of the active material to be removed.

(2) Said step in the item (1) of impregnating the portion of the active material layer to be removed with the thermoplastic resin may comprise heat-pressing a peeling sheet impregnated with said thermoplastic resin onto the portion of the active material layer to be removed; and said step in the item (1) of removing the thermoplastic resin together with the portion of the active material layer to be removed comprises peeling said peeling sheet from said active material layer to remove said portion of the active material layer to be removed in a heat-pressing region together with the peeling sheet.

(3) Said step in the item (1) of impregnating the portion of the active material layer to be removed with the thermoplastic resin may comprise heating said active material layer and then bringing a formed body which is made of said thermoplastic resin and is solid at a room temperature into contact with said portion of the active material layer to be removed.

(4) A step of bringing a porous sheet into contact with the active material layer to cause a part of said liquid material existing in said active material layer and/or existing on the surface thereof to migrate into said porous sheet may be carried out between said step of impregnating the active material layer with the liquid material and said step of solidifying the liquid material; said step of solidifying the liquid material may comprise integrally solidifying the liquid material remaining in said active material layer and the liquid material caused to migrate into said porous sheet; and said step of peeling the portion of the active material layer may comprise peeling the portion of the coating layer, which has been impregnated with the liquid material together with said porous sheet in the integral solidification condition of the liquid material in the active material layer and the liquid material in the porous sheet, to expose partially the surface of the substrate based on the prescribed pattern.

In order to attain the fourth object of the present invention, a sheet thereof for peeling an active material layer, comprises a porous sheet and thermoplastic resin impregnated in said porous sheet.

The present invention may be classified into the first group as the generic group in which a means for peeling a portion of an active material layer, which is impregnated with liquid material is not defined, the second group characterized in that a peeling sheet impregnated with thermoplastic resin is used as such a peeling means, and the peeling sheet is heat-pressed on a portion to be removed of the active material layer, the third group characterized in that a formed body made of thermoplastic resin which is solid at a room temperature, is used as the peeling means, and the fourth group characterized in that a porous sheet is used as the peeling means.

BRIEF DESCRIPTION OF THE DRAWINGS

FIG. 3 is a schematic descriptive view illustrating further another step of the process of the present invention in the first group;

FIG. 4 is a schematic descriptive view illustrating one example of a pattern formed by the process of the present invention in the first group;

FIGS. 17(A) to 17(d) are schematic descriptive views illustrating the steps of the process of the fourth group;

FIGS. 18(A) and 18(b) are schematic descriptive views illustrating one example of a peeling step in the process of the present invention in the fourth group;

FIG. 19 is a schematic descriptive view illustrating another example of a peeling step in the process of the present invention in the fourth group;

DETAILED DESCRIPTION OF THE PREFERRED EMBODIMENTS

Now, the present invention in the first group will be described in detail below.

A process of the present invention in the first group, for producing a porous coating layer is characterized by comprising the steps of impregnating a porous coating layer formed on a substrate with liquid material having a larger cohesion after solidification thereof than that of said coating layer based on a prescribed pattern; solidifying said liquid material to form a solidified material; and peeling a portion of said coating layer, which has been impregnated with said solidified material, to expose partially a surface of said substrate based on said prescribed pattern. A typical example in which the process of the present invention is utilized in the production of an electrode plate for a secondary battery with a nonaqueous electrolyte will be described below. Of course, the application of the process of the present invention is not limited to the application thereof to the production of such an electrode plate for a secondary battery with a nonaqueous electrolyte.

The present inventors have carried out extensive studies of a process for forming an active material coating layer based on a prescribed pattern in the production of an electrode plate for a secondary battery with a nonaqueous electrolyte. In the above-mentioned studies, they directed their attention to the following facts:

(1) Since the active material coating layer is composed of particles of an active material in a large amount and resin as a binder in a relatively small amount, the active material coating layer is porous, and has a poor adhesivity to a collector; and (2) Since the resin as a binder is used in a small amount, cohesion (i.e., strength) in the lateral direction of the active material layer is low.

More specifically, liquid material tends to be easily permeate through the active material layer in the width direction due to the porosity thereof. When the active material layer is impregnated with liquid material on the basis of an optional pattern, and the liquid material permeating in the active material layer is solidified, the impregnated portion of the active material layer is remarkably different from the non-impregnated portion thereof in physical strength, and as a result that only the impregnated portion of the active material layer can easily be peeled from the collector, thus exposing the surface of the collector to be exposed on the basis of the pattern without leaving the portion to be removed of the active material layer non-peeled.

Figure 1:
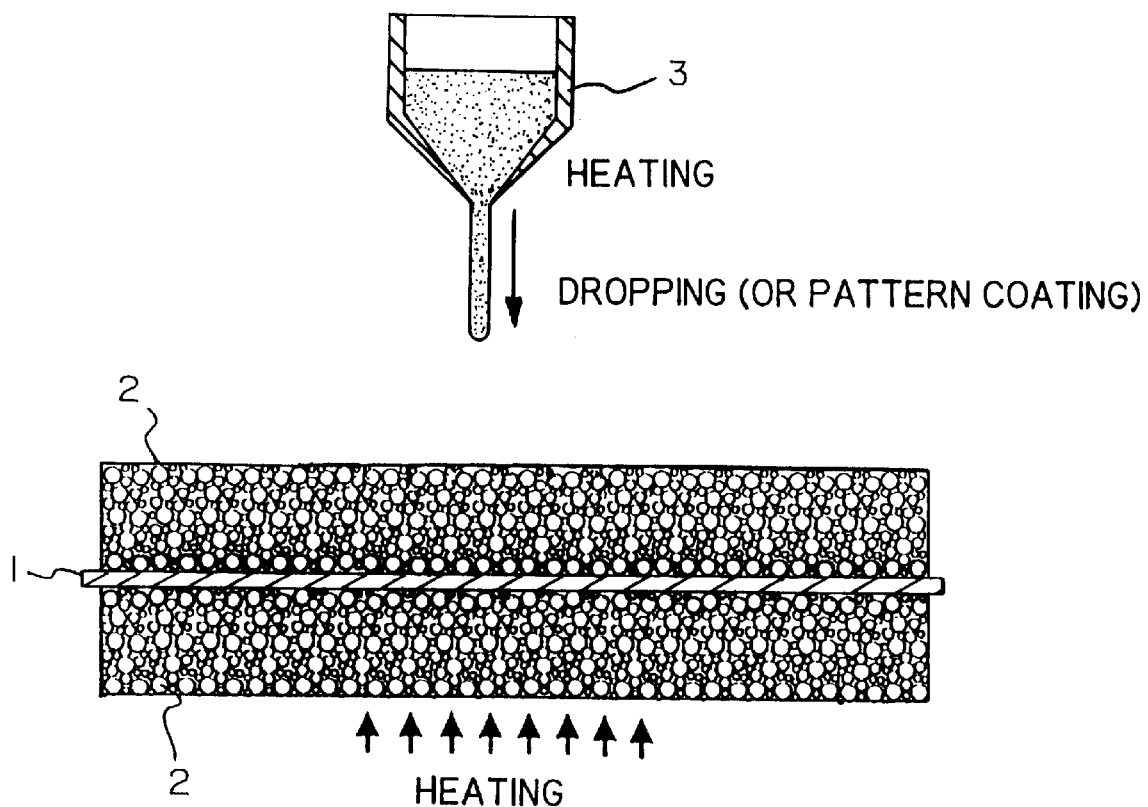
FIG. 1 is a schematic descriptive view illustrating one step of the process of the present invention in the first group.

The above-mentioned process of the present invention will be described with reference to the drawings. As shown in FIG. 1, a solidifying agent 3 as liquid material such as wax is melted by heat, and the thus melted solidifying agent is dropped on an active material coating layer 2 formed on the surface of a collector 1. The dropped solidifying agent 3 permeates through the active material coating layer 2, and cavities in the active material coating layer 2 are filled with the solidifying agent 3. In this case, the collector 1 and/or the active material coating layer 2 may be heated in order to prevent the liquefied solidifying agent 3 from being solidified before the solidifying agent 3 reaches the surface of the collector 1.

Figure 2:
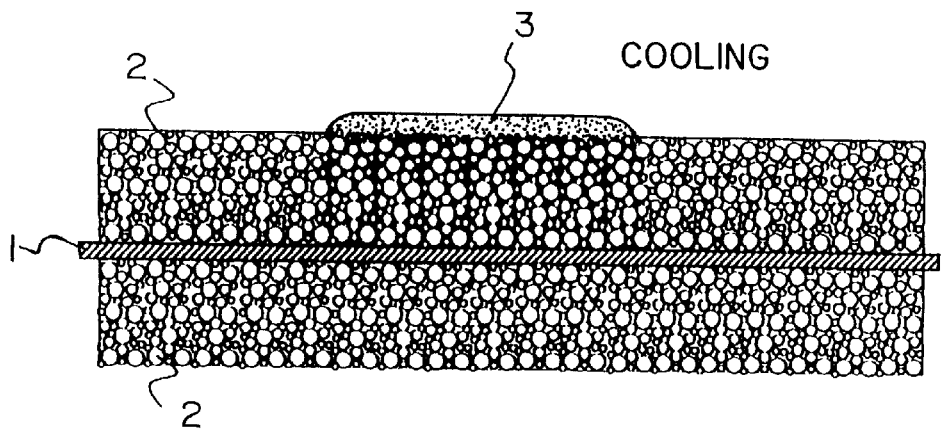
FIG. 2 is a schematic descriptive view illustrating another step of the process of the present invention in the first group.

FIG. 2 shows a state in which the solidifying agent 3 permeates through the active material coating layer 2, and it is solidified by the cooling. In this state, a portion of the active material coating layer 2, through which the solidifying agent 3 permeates, has a excessively higher density than that of the other portion, and cohesion of the former is higher than that of the latter.

FIG. 3 shows a state in which the portion of the active material coating layer 2, which is impregnated with the solidifying agent is peeled. The portion 2a of the active material coating layer 2, which is impregnated with the solidifying agent 3, has a higher density and a higher cohesion through the impregnation with the solidifying agent 3, and the cohesion of the portion is excessively higher than that of the adjacent other portion of the active material coating layer 2, which is not impregnated with the solidifying agent 3, as described above. Accordingly, the portion 2a of the active material coating layer 2, which is impregnated with the solidifying agent is peeled by an appropriate means, can be peeled in a state that the active material coating layer 2 is surrounded by the solidifying agent 3, and the surface of the collector can be exposed on the basis of the sharp pattern after the peeling of the portion 2a.

A shape of the pattern formed by the process of the present invention can optionally be selected. Examples of the pattern are shown in FIGS. 4 to 6.

Figure 5:
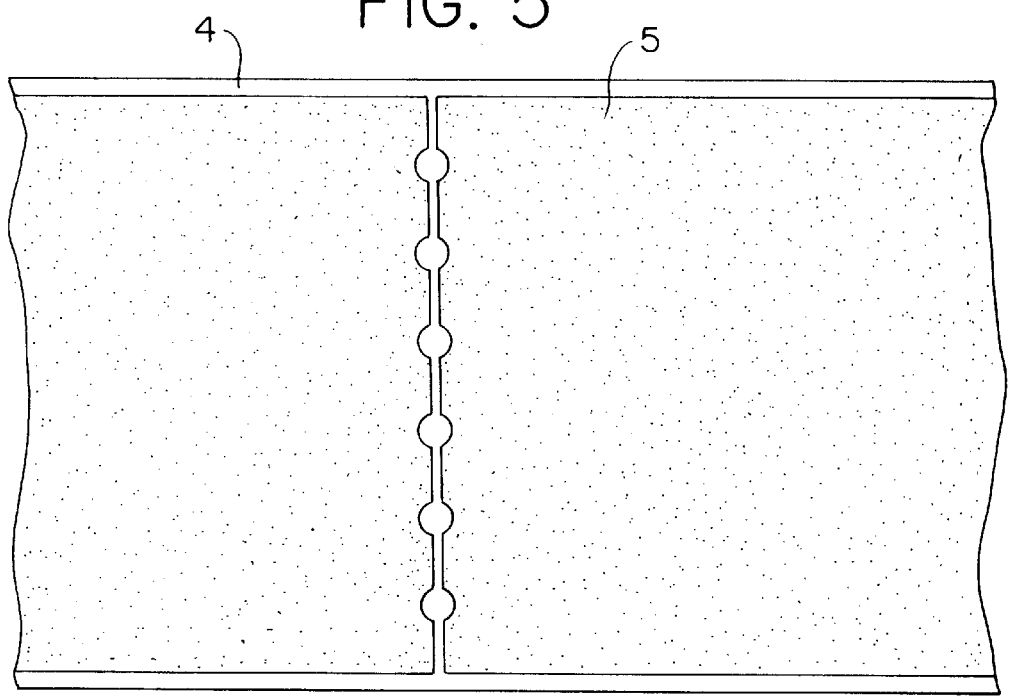
FIG. 5 is a schematic descriptive view illustrating another example of a pattern formed by the process of the present invention in the first group.
Figure 6:
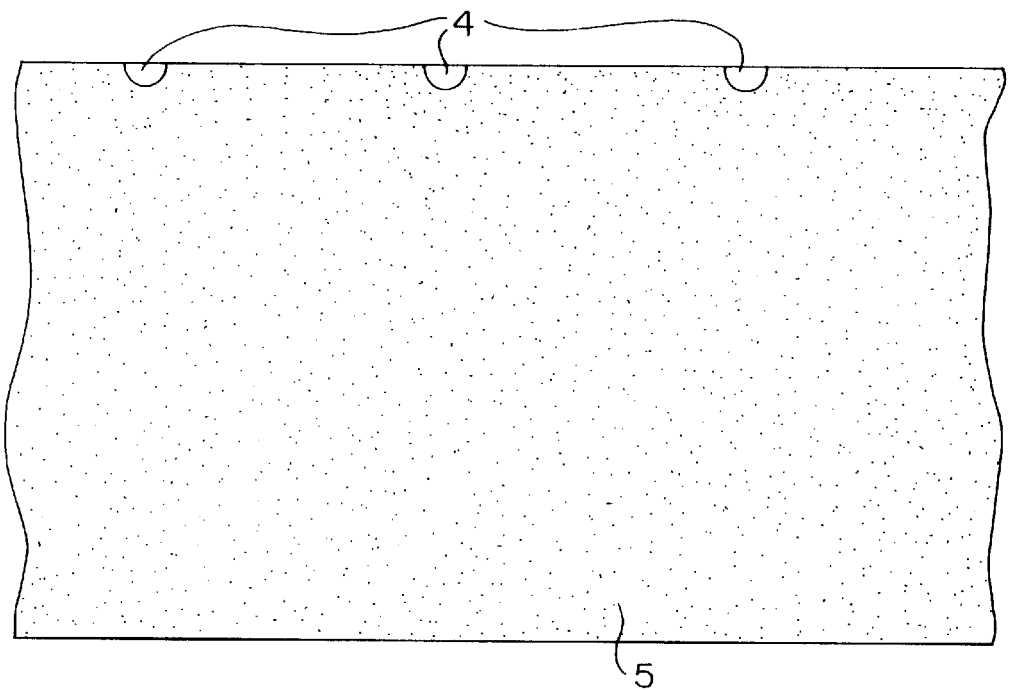
FIG. 6 is a schematic descriptive view illustrating further another example of a pattern formed by the process of the present invention in the first group.

In FIGS. 4 to 6, 4 is a peeled portion and 5 is a non-peeled portion. In FIGS. 5, 6 is a peeled portion to which a terminal is to be connected.

In the process of the present invention, there is used, as a solidifying agent 3, material which is solid at a room temperature, and can be liquefied by heat, for example, at least one of thermoplastic resin, organic or inorganic wax and a low melting point-metal. In view of the object of the present invention, the solidifying agent 3 preferably has a melting point of from 20° C. to 250° C., and more preferably of from 60° C. to 150° C. When the melting point of the solidifying agent 3 is excessively low, it softens at a room temperature, leading to hard handling thereof and a poor productivity of the electrode plate. When the melting point thereof is excessively high, on the other hand, there occurs uneconomical problems in energy.

The solidifying agent 3 preferably has viscosity of from 10 to 50,000 cP when the melting thereof, and more preferably of from 300 to 6,000 cP. When the viscosity of the solidifying agent 3 is excessively high, the solidifying agent 3 tends to not permeate easily into fine cavities of the active material coating layer 2, leading to a poor productivity of the electrode plate. When the viscosity thereof is excessively low, the solidifying agent 3 in a molten state tends to spread over in the inside of the active material coating layer 2 in a direction along a plane parallel to the surface thereof by the capillary phenomenon, thus making it impossible to form a sharp pattern. It is preferable to limit an adhesive strength between the solidifying agent 3 and the collector 1 to a value as small as possible, in the light of workability in the peeling step.

As concrete examples of the solidifying agent 3, there may be listed the following: (1) thermoplastic resin such as polyolefin resin such as polyethylene, polypropylene and the like; polyvinyl chloride resin; polystyrene; polyvinyl acetate resin; ethylene-vinyl acetate copolymer; ethylene-vinyl chloride copolymer; and the like, (2) low molecular weight polyethylene, (3) low molecular weight polypropylene, (4) copolymer thereof, (5) synthetic wax such as microcrystalline wax, polyethylene wax oxide, and the mixture thereof, (6) natural wax such as carnauba wax, and (7) derivative and mixture thereof.

As a solidifying agent 3 other than the above-described, there may be used material which can transform from the liquid phase into the solid phase through a chemical reaction, for example, polymerization liquid material and cross-linking liquid material. As such polymerization liquid material and cross-linking liquid material, there may be used polymerization liquid material and cross-linking liquid material used in a printing ink or a coating composition which have properties such as a thermosetting property, a catalytic-setting property, a setting property at a room temperature, a electron beam-setting property and an ultraviolet-setting property. Solidification of such kind of solidifying agent 3 may be carried out by heat, catalyst, the addition of a cross-linking agent, radiation of electron beam or ultraviolet.

When the coating layer 2 is impregnated with the above-mentioned solidifying agent 3, it is necessary for the solidifying agent 3 to permeate through fine cavities in the coating layer 2 so as to reach the surface of the collector 1. If the liquefied solidifying agent 3 is solidified before it reaches the surface of the collector 1, a portion to be removed of the coating layer 2 may be left non-peeled even when the coating layer 2 impregnated with the solidifying agent 3 is peeled from the collector 1. In order to solve the above-mentioned problem, at least one of the collector 1 and the coating layer 2 may be heated to an appropriate temperature to delay the solidification of the solidifying agent 3, or the solidifying agent 3 having a low viscosity may be selected to increase the permeating velocity of thereof, or the solidifying agent 3 may be kept at a sufficiently high temperature to delay the solidification thereof.

In case where a copper foil is used as the collector 1 for the negative electrode, the copper foil tends to be oxidized to produce a reddish surface thereof upon heating it to the temperature of at least 140° C. When the coating layer 2 is heated by means of a hot plate during applying (dropping) the solidifying agent 3, the increase in temperature of the hot plate to at least 140° C. does not however cause the occurrence of the above-mentioned problem of oxidation of the copper foil, since the both surfaces of the copper foil are coated with the coating layers 2 and the heat is conducted from the side of the surface of the coating layer 2 onto which the solidifying agent 3 has been applied.

In case where the pattern is formed on the one surface of the electrode plate, and then another pattern is formed on the other surface thereof, to respectively form the pattern at the same position on the both surfaces of the electrode plate, it is preferable to heat the coating layer 2 by means of extreme infrared radiation or the like from the side of the surface on which the pattern is to be formed, to keep the exposed back surface of the collector 1 at a temperature of under 140° C., in order to prevent the exposed surface of the copper foil from being oxidized.

With respect to a method of permeating the solidifying agent 3 through the coating layer 2 on the basis of the pattern, there are many methods, i.e., a method of applying the solidifying agent 3 in the molten state onto the coating layer 2, a method of arranging a solid body made of the solidifying agent 3 on the basis of the pattern on the coating layer 2 and heating the coating layer 2 to melt the solidifying agent 3 which is in contact with the coating layer 2 so as to impregnate the coating layer 2 with the solidifying agent 3, a method of previously preparing a stencil having a prescribed pattern, and applying the solidifying agent 3 onto the coating layer 2 with the use of the stencil to impregnate the coating layer 2 with the solidifying agent 3, and the like. In case where the solidifying agent 3 in the molten state is applied onto the coating layer 2, it is possible to use a conventional coating apparatus such as a dispenser, a gravure roll, a die head and the like. For example, if the dropping apparatus for the solidifying agent as shown in FIG. 1 is secured to an x-axis and y-axis plotter type driving apparatus, it is possible to drop the solidifying agent 3 based on the prescribed pattern in accordance with the movement of the x-axis and y-axis plotter. When the x-axis and y-axis plotter is moved so as to draw a character, a figure or a pattern, the solidifying agent 3 is dropped to draw the above-mentioned prescribed character, figure or pattern.

The portion of the coating layer 2 impregnated with the solidifying agent is normally stuck to the collector 1 in a smaller strength, and this portion can easily be peeled. With respect to a peeling means, tension may be imparted to the collector 1 to lift up the portion of the coating layer 2 impregnated with the solidifying agent from the collector 1 so as to perform the peeling thereof, or it may be peeled from the collector 1 by means of a spatula, or it may be peeled with the use of an adhesive tape, or it may be peeled from the collector 1 by the blowing of air.

The impregnation of the coating layer with the solidifying agent 3 may be carried out before or after the pressing step described later of the coating layer 2.

Description will be given of each of materials of which the electrode plate is composed, in case where the process of the present invention is applied to the production of the electrode plate for a secondary battery with a noaqueous electrolyte. The secondary battery with a noaqueous electrolyte may be exemplified by a lithium secondary battery, and is characterized in the use of the nonaqueous organic solvent as an electrolyte. For example, there is used an electrode plate in which the coating layer (i.e., the active material coating layer) containing the active material for the electrode is formed on the collector made of a metallic foil, and the nonaqueous organic solvent is used as an electrolyte. In this battery, charge and discharge can be performed by interchange of electrons during the movement of a lithium ion between the positive electrode and the negative electrode.

The coating layer containing the active material, of which the electrode plate for a secondary battery with a nonaqueous electrolyte of the present invention is formed, can be formed by the coating composition for the electrode which comprises active material and a binder. As an active material for the positive electrode used in the present invention, there may be used at least one kind of lithium oxide such as $LiCoO_2$, $LiMn_2O_4$ and the like, and chalcogen compounds such as $TiS_2$, $MnO_2$, $MoO_3$, $V_2O_5$ and the like.

As an active material for the negative electrode, it is preferable to use metallic lithium, lithium alloy and carbonaceous material such as graphite, carbon black, acetylene or the like. When $LiCO_2$ is used as the active material for the positive electrode and the carbonaceous material is used as the active material for the negative electrode, it is possible to obtain a lithium secondary battery having a high discharge voltage of about 4 volts. It is preferable to disperse uniformly these active materials in the coating layer as formed. For this reason, it is preferable to use powder of the active material having a particle size of from 1 to 100 $\mu$m and an average particle size of about 10 $\mu$m.

As a binder used in the process of the present invention, there may be selectively used for example thermoplastic resin, i.e., polyester resin, polyamide resin, polyacrylic acid-ester resin, polycarbonate resin, polyurethane resin, cellulose resin, polyolefin resin, polyvinyl resin, fluororesin and polyimide resin. In this case, compounds in which reactive functional group is introduced (i.e., acrylate monomer or oligomer) may be simultaneously mixed. The acrylate monomer and the oligomer may be used alone or in combination.

The coating layer containing the active material, of which the electrode plate for a secondary battery with a nonaqueous electrolyte of the present invention is formed, can be prepared in the following manner. First, the coating composition to be applied onto the collector is prepared with the use of the above-described materials. More specifically, the binder and the powdery active material, which are properly selected from the above-mentioned materials, are kneaded or dissolved in a state of dispersion with the use of an appropriate dispersing agent to prepare the coating composition for the electrode plate.

Then, the thus prepared coating composition is applied on the collector. As a coating method, a conventional coating method such as a gravure coating method, a die coating or a slide coating may be used. Then, the coating composition is dried by carrying out a drying step to prepare a coating layer having a prescribed thickness.

As a collector used in the electrode plate of the present invention for a secondary battery with a nonaqueous electrolyte, it is preferable to use a metallic foil such as for example an aluminum foil, a copper foil or the like. Such a metallic foil preferably has a thickness of from about 10 $\mu$m to about 30 $\mu$m.

Description will be given below of a concrete method for preparing the coating composition for the electrode plate used in the present invention, which contains the active material. First, the binder and the powdery active material which are appropriately selected from the above-described materials, are added to a dispersing medium comprising an organic solvent such as toluene, and a conductive agent is added to the dispersing medium, as an occasion demands, to prepare a mixture. The thus prepared mixture is subjected to a mixing and dispersing process with the use of the conventional dispersing apparatus such as a homogenizer, a ball mill, a sand mill, a roll mill and the like.

In this stage, there may be applied the same mixing ratio of the binder and the active material as the conventional mixing ratio thereof. There may preferably be applied the mixing ratio of the binder: the active material=2:8 through 1:9. As a conductive agent added as an occasion demands, there may be used for example carbonaceous material such as graphite, carbon black, acetylene black or the like.

The thus prepared coating composition for the electrode plate, containing the active material, is applied on the collector made of a metallic foil such as an aluminum foil, a copper foil and the like with the use of a gravure coater, a gravure reverse coater, a die coater or the like, and then dried. The applying step and the drying step are carried out several times to prepare a coating layer having the thickness of from 10 to 200 $\mu$m, preferably of from 50 to 170 $\mu$m.

The coating layer obtained by carrying out the above-mentioned applying and drying steps is preferably subjected to a press treatment with the use of a metallic roll, a heating roll, a sheet pressing machine or the like, to prepare the electrode plate of the present invention, in order to improve homogeneousness of the coating layer. The pressing condition of from 500 kgf/cm$^2$ to 7,500 kgf/cm$^2$, more preferably of from 3,000 kgf/cm$^2$ to 5,000 kgf/cm$^2$ may be applied to the above-described press treatment. With a pressing force of under 500 kgf/cm$^2$, the homogeneousness of the coating layer may not sufficiently be improved. With a pressing force of over 7,500 kgf/cm$^2$, the electrode plate itself including the collector may be broken, thus causing an unfavorable problem.

In case where the secondary battery is produced with the use of the electrode plate of the present invention, which has been prepared in the above-described manner, it is preferable to apply a heating treatment and a decompression treatment to the electrode plate prior to the assembling step of the secondary battery, in order to remove moisture in the coating layer of the electrode plate, which contains the active material. The process of the present invention for producing a porous coating layer is applied to the electrode plate prepared in the above-described manner.

In case where the lithium secondary battery is produced with the use of the thus prepared electrode plates, as positive and negative plates, of the present invention for a secondary battery with a nonaqueous electrolyte, there is used, as an electrolyte, a nonaqueous electrolyte which is obtained by dissolving lithium salts as solute into an organic solvent.

In this stage, there may be used, as an organic solvent, cyclic esters, chain esters, cyclic ethers, chain ethers or the like. The cyclic esters may be exemplified by propylene carbonate, butylene carbonate, γ-buthyrolactone, vinylene carbonate, 2-methyl-γ-buthyrolactone, acetyl-γ-buthyrolactone and γ-valerolactone. The chain esters may be exemplified by dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, propionic acid alkyl ester, malonic acid dialkyl ester and acetic acid alkyl ester. The cyclic ethers may be exemplified by tetrahydrofuran, alkyltetrahydrofuran, dialkyltetrahydrofuran, alkoxytetrahydrofuran, dialkoxytetrahydrofuran, 1,3-dioxolan, alkyl-1,3-dioxolan and 1,4-dioxolan. The chain ethers may be exemplified by 1,2-dimethoxyethane, 1,2-diethoxyethane, diethyl ether, ethylene glycol dialkylether, diethylene glycol dialkylether, triethylene glycol dialkylether and tetraethylene glycol dialkylether.

As lithium salts as solute forming the nonaqueous electrolyte in cooperation with the above-mentioned organic solvent, there may be used inorganic lithium salt such as $LiClO_4$, $LiBF_4$, $LiPF_6$, $LiAsF_6$, LiCl, LiBr or the like, or organic lithium salt such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$, $LiOSO_2C_7F_{15}$, or the like.

Although the process of the present invention for producing porous coating layer is described to be applied to the production of the electrode plate for a secondary battery with a nonaqueous electrolyte, the application of the process of the present invention is not limited only to the above-described application, and the process of the present invention can also be applied for the other object.

The above-mentioned other object may be exemplified by the production of a substrate for a plasma-display panel. For example, in a back surface plate of the plasma-display panel, an electrode (generally made of gold) is formed on the surface of a substrate made of glass through a primer layer. The primer layer is required to be formed by the coating method on an inside region of the surface of the glass substrate, which is apart from the periphery thereof by about 5 mm, in order to prevent the peripheral portion from being unclean. The above-mentioned primer layer can be formed, for example, by applying paste which comprises frit of lead glass of 80 wt. %, a resin binder of 1 wt. % such as ethylcellulose and the balance being a solvent, and has viscosity of about 80,000 cP onto the surface of the substrate and drying and sintering same.

In the application method of the paste, it is hard to form the primer layer on an inside region of the surface of the glass substrate, which is apart from the periphery thereof by about 5 mm. However, when the process of the present invention is utilized in the production of the above-mentioned plasma-display panel, it is possible to form the primer layer on the glass substrate on the basis of the precise pattern by applying the paste, i.e., the coating composition for the primer layer on the entire surface of the glass substrate and drying same, then peeling the peripheral portion of the primer layer having a width of about 5 mm to remove same from the glass substrate, and then sintering the glass substrate having the primer layer on the basis of the precise pattern.

Now, the present invention in the second group will be described in detail below.

Figure 7A:
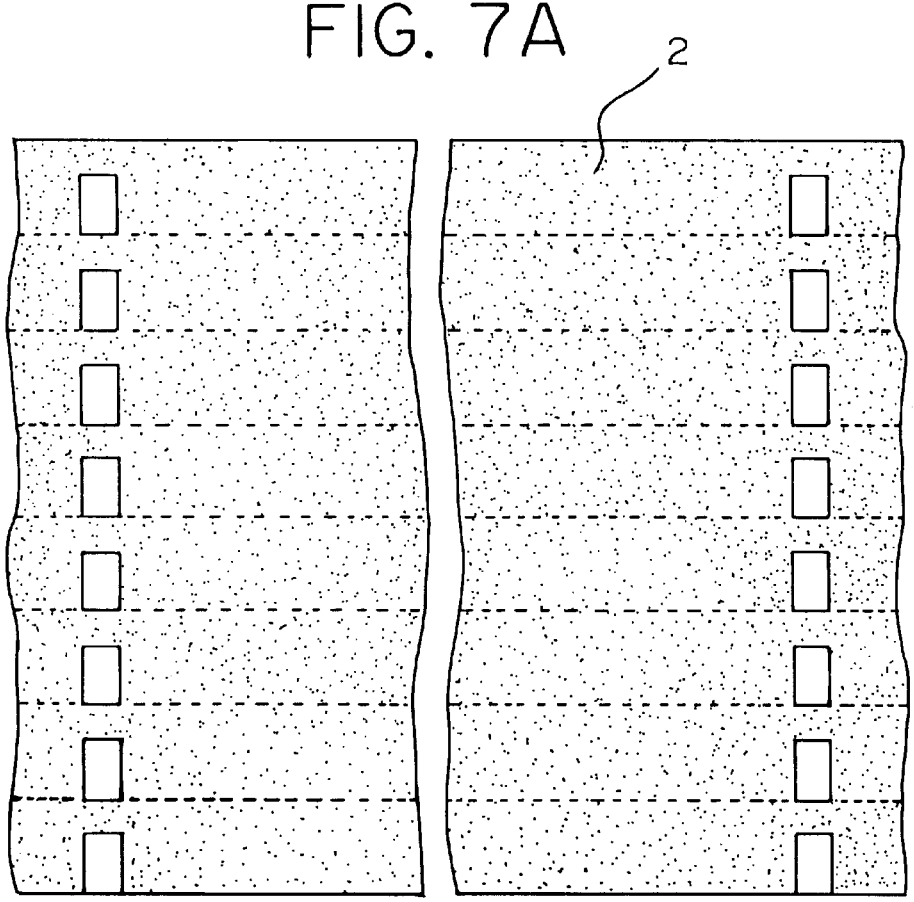
FIG. 7(a) is a plan view of an electrode plate of the present invention in the second group, and FIG. (b) is an enlarged cross-sectional view of the electrode plate.
Figure 7B:
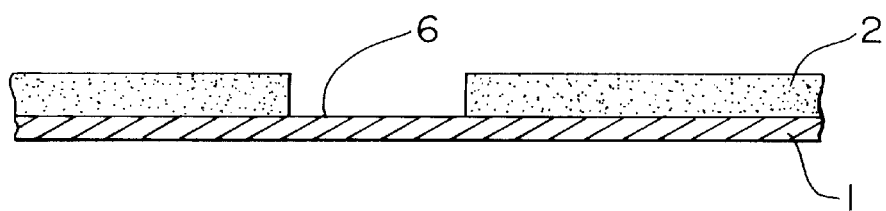
Figure 8:
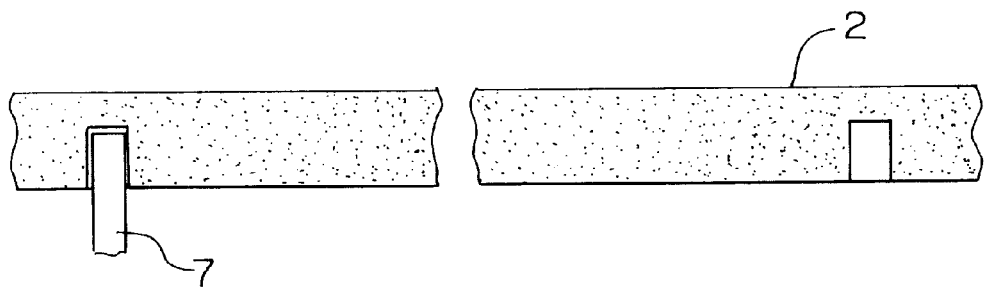
FIG. 8 is a plan view of another electrode plate of the present invention in the second group.

The electrode plate of the present invention in the second group may be composed either of an original sheet having a series of plural plates as shown in FIG. 7(a), or of a single plate which is obtained by cutting the original sheet along lateral lines as shown in FIG. 7(a). In FIG. 8, a terminal 7 is connected to a portion of the surface of the collector, which is exposed on the basis of the prescribed pattern.

Figure 9:
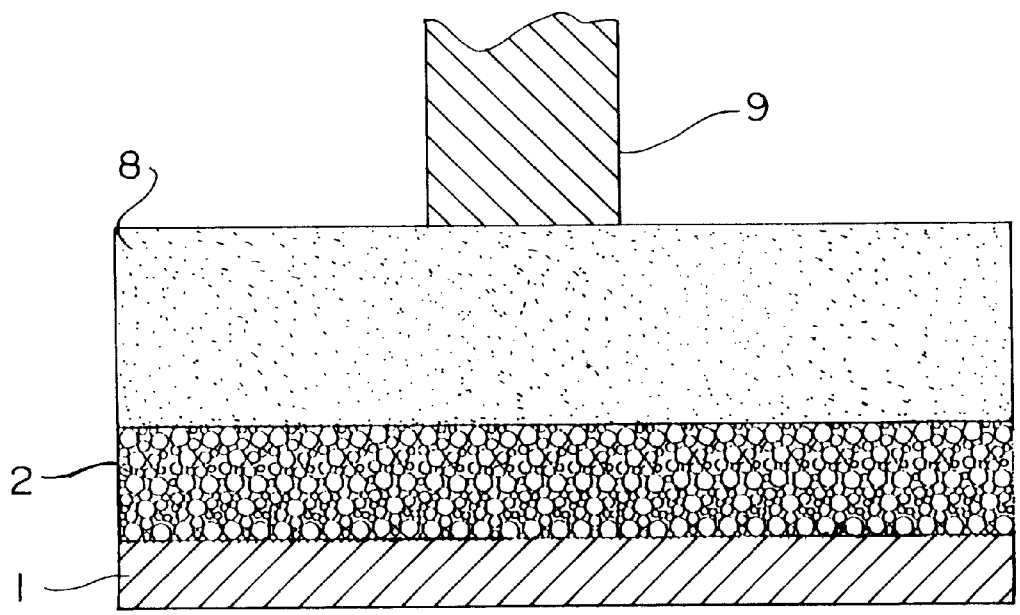
FIG. 9 is a schematic descriptive view illustrating one step of the process of the present invention in the second group.
Figure 10:
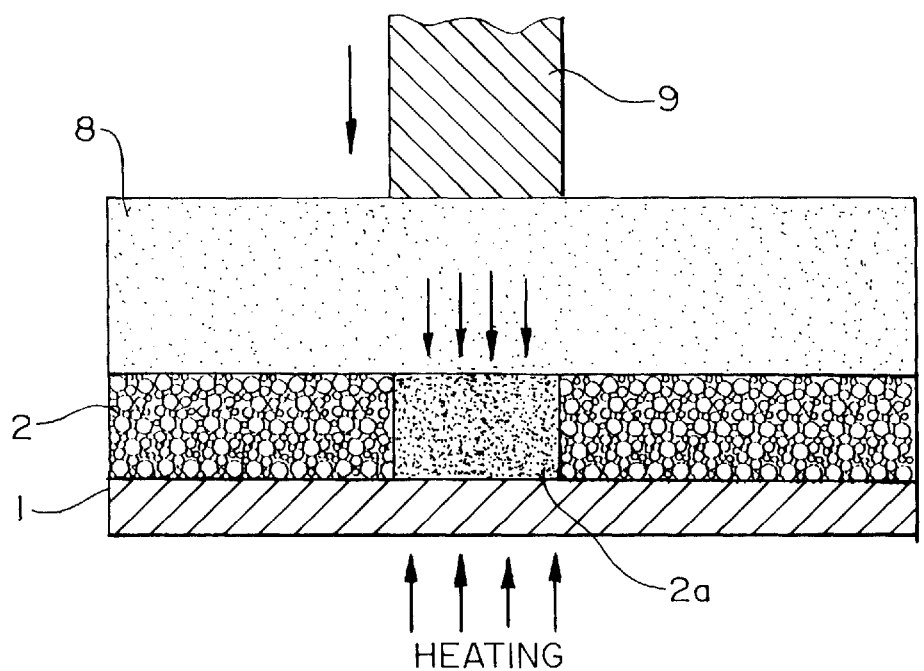
FIG. 10 is a schematic descriptive view illustrating another step of the process of the present invention in the second group.

According to the present invention, it is possible to produce the electrode plate in which the active material layer is partially removed on the basis of the prescribed pattern. As shown in FIG. 9, the active material layer 2 which comprises active material and a binder is formed on a collector 1. A peeling sheet 8 impregnated with thermoplastic resin is placed on the surface of the active material layer 2. The peeling sheet 8 suffices to have an area larger than a region of the active material layer 2 to be removed, and may have either an area covering the entire active material layer 2, or an area covering only the region of active material layer to be removed. Then, a pressure heating body 9 is pressed on the surface of the above-mentioned peeling sheet 8 as shown in FIG. 10. The pressure heating body 9 is composed of a metallic body which has a built-in heater and permits a temperature control thereof. The pressure heating body 9 has substantially the same bottom shape as the region of the active material layer 2 to be removed.

The thermoplastic resin with which the peeling sheet is impregnated is melted and permeates through the porous active material layer 2 by pressing the pressure heating body 9 on the peeling sheet 8 to heat the thermoplastic resin as shown in FIG. 10, or heating the thermoplastic resin from the side of the collector 1 as shown in bold arrows as shown in FIG. 10. The pressure heating body 9 is lifted up from the peeling sheet 8, and then, the collector 1 with the active material layer 2 and the peeling sheet 8 are kept at a room temperature, or subjected to a forced cooling. Alternately, the heating of the thermoplastic resin from the side of the collector 1 is stopped, and then the collector 1 with the active material layer 2 and the peeling sheet 8 are kept at a room temperature, or subjected to a forced cooling. Then, the thermoplastic resin permeating through the active material layer 2 rapidly solidifies. The thus solidified thermoplastic resin adheres to the peeling sheet 8 in a sufficient strength. After completion of the cooling, when the peeling sheet 8 is peeled from the active material layer 2, then only the portion 2a to be removed of the active material layer 2, impregnated with the thermoplastic resin can be peeled together with the peeling sheet 8 from the surface of the collector 1. If the portion 2a to be removed of the active material layer 2 is separated from the peeling sheet, and the portion 2a is left on the collector 1, this portion 2a may be peeled with the use of a suitable peeling means. The non-coated portion (i.e., peeled portion) having a sharp edge can easily be formed on the collector 1 on the basis of the prescribed pattern in this manner.

Then, description will be given of materials used for carrying out the present invention.

As a collector used in the electrode plate of the present invention for a secondary battery with a nonaqueous electrolyte, it is preferable to use a metallic foil such as for example an aluminum foil, a copper foil or the like. Such a metallic foil preferably has a thickness of from about 5 $\mu$m to about 30 $\mu$m.

In the present invention, either the active material layer for the positive electrode, or the active material layer for the negative electrode is formed on the collector 1. A coupling agent layer may be formed on the surface of the collector 1 in order to improve the adhesivity between the collector 1 and the active material layer for the positive or negative electrode. As a coupling agent used for the formation of the coupling agent layer, there may be used a coupling agent having an excellent adhesivity to both of the collector 1 made of a metallic foil and the active material layer, which is appropriately selected from the coupling agents such as a silane-coupling agent, a titanate-coupling agent, an aluminum-coupling agent and the like.

The silane-coupling agent may be exemplified by $\gamma$-(2-aminoethyl) aminopropyl trimethoxy silane, $\gamma$-(2-aminoethyl) aminopropyl methyldimethoxy silane, $\beta$-(3,4-epoxycyclohexyl) ethyltrimethoxy silane, $\gamma$-methacryloxypropyl trimethoxy silane, N-$\beta$-(N-vinylbenzilaminoethyl)-$\gamma$-aminopropyl trimethoxy silane hydrochloric acid salt, $\gamma$-glycidoxypropyl trimethoxy silane, amino silane, $\gamma$-mercaptopropyl trimethoxy silane, methyl trimethoxy silane, methyl triethoxy silane, vinyltriacetoxy silane, $\gamma$-chloropropyl trimethoxy silane, hexamethyldisilazine, $\gamma$-anilinopropyl trimethoxy silane, vinyltrimethoxy silane, vinyltriethoxy silane, vinyltris ($\beta$-methoxyethoxy) silane, octadecyldimethyl [3-(trimethoxysilyl) propyl] ammonium chloride, $\gamma$-mercaptopropyl methyldimethoxy silane, methyltrichloro silane, dimethyldichloro silane and trimethylchloro silane.

The titanate-coupling agent may be exemplified by isopropyltriisostearoyl titanate, isopropyltridodecylbenzenesulfonyl titanate, isopropyltris (dioctylpyrophosphate) titanate, tetraisopropylbis (dioctylphosphite) titanate, tetraoctylbis (ditridecylphosphite) titanate, tetra (2,2-diaryloxymethyl) bis (ditridecyl) phosphite titanate, bis (dioctylpyrophospate) oxyacetate titanate, bis (dioctylpyrophospate) ethylene titanate, isopropyltrioctanoil titanate, isopropyldimathacrylisostearoyl titanate, isopropylisostearoyldiacryl titanate, isopropyltri (dioctylphosphate) titanate, isopropyltricumylphenyl titanate, isopropyltri (N-amidoethyl aminoethyl) titanate, dicumylphenyloxyacetate titanate and diisostearoylethylen titanate.

The aluminum-coupling agent may be exemplified by acetoalkoxyaluminumdiisopropylate.

As a method of forming the layer made of the above-mentioned coupling agent on the surface of the collector, there may be applied a method of applying either a coating composition obtained by dissolving the coupling agent into a liquid mixture of water and an organic solvent, or a coating composition obtained by dissolving the coupling agent into an organic solvent, onto the surface of the collector. In this stage, a pH value of the coating composition may be adjusted within a range of from 3 to 5, in order to promote a hydrolysis action of the coupling agent. As a catalyst for hydrolysis of the coupling agent, there may be added for example hydrochloric acid, acetic acid or the like. In order to promote a dehydration action between the coupling agent and the surface of the collector, the applied coupling agent may be heated at a temperature of from 120° C. to 130° C. As the above-mentioned organic solvent for the coupling agent, there may be used methanol, ethanol, isopropylalcohol, toluene, benzene, acetone, tetrahydrafuran, cellosolve methyl, or the like.

As a method of applying the coupling agent onto the surface of the collector made of a metallic foil, there may be used a conventional coating method such as a gravure coating method, a gravure reverse coating method, a roll coating method, a Mayer bar coating method, a blade coating method, a knife coating method, an air knife coating method, a slot die coating method, a slide die coating method, a dip coating method or the like. The coupling layer preferably has a thickness within a range of from 0.001 to 5 $\mu$m in a dried condition.

As an active material for the positive electrode used in the present invention, there may be used at least one kind of lithium oxides such as $LiCoO_2$, $LiNiO_2$, $LiMn_2O_4$ and the like, and chalcogen compounds such as $TiS_2$, $MnO_2$, $MoO_3$, $V_2O_5$ and the like. As an active material for the negative electrode, on the other hand, it is preferable to use metallic lithium, lithium alloy and carbonaceous material such as graphite, carbon black and acetylene, or material capable of intercalating lithium ions. When $LiCoO_2$ is used as the active material for the positive electrode and the carbonaceous material is used as the active material for the negative electrode, it is possible to obtain a lithium secondary battery having a high discharge voltage of about 4 volts.

It is preferable to disperse uniformly these active materials in the coating layer as formed. For this reason, it is preferable to use powder of the active material having a particle size of from 1 to 100 $\mu$m and an average particle size of about 10 $\mu$m.

As a binder used for the coating composition containing the above-mentioned active material in the process of the present invention, there may be used for example thermoplastic resin such as polyester resin, polyamide resin, polyacrylic acid-ester resin, polycarbonate resin, polyurethane resin, cellulose resin, polyolefin resin, polyvinyl resin, fluororesin, polyimide resin or the like; thermosetting resin such as rubber type resin, acrylic resin, urethane resin or the like; ionizing radiation-setting resin such as acrylate monomer, oligomer or the mixture thereof; or the mixture of these kinds of resin.

Description will be given below of a concrete method for preparing the coating composition for the electrode plate used in the present invention, which contains the active material. First, the binder and the powdery active material which are appropriately selected from the above-described materials, are added to a dispersing medium comprising an organic solvent such as toluene, methyl ethyl ketone, N-methylpyrrolidone, the mixture thereof or the like, and a conductive agent is added to the dispersing medium, as an occasion demands, to prepare a mixture. The thus prepared mixture is subjected to a mixing and dispersing process with the use of the conventional dispersing apparatus such as a homogenizer, a ball mill, a sand mill, a roll mill and the like.

In the preparation of the above-mentioned coating composition, a total amount of the active material and the binder is preferably within a range of from about 40 to 80 wt. parts relative to 100 wt. parts of the whole coating composition, and the ratio of the active material to the binder is preferably within a range of from 9:1 to 8:2. As a conductive agent added as an occasion demands in the preparation of the coating composition, there may be used for example carbonaceous material such as graphite, carbon black, acetylene black or the like.

As a method of applying the coating composition on the surface of the collector made of a metallic foil, there may be used a conventional coating method such as a gravure coating method, a gravure reverse coating method, a roll coating method, a Mayer bar coating method, a blade coating method, a knife coating method, an air knife coating method, a slot die coating method, a slide die coating method, a dip coating method or the like.

Figure 12:
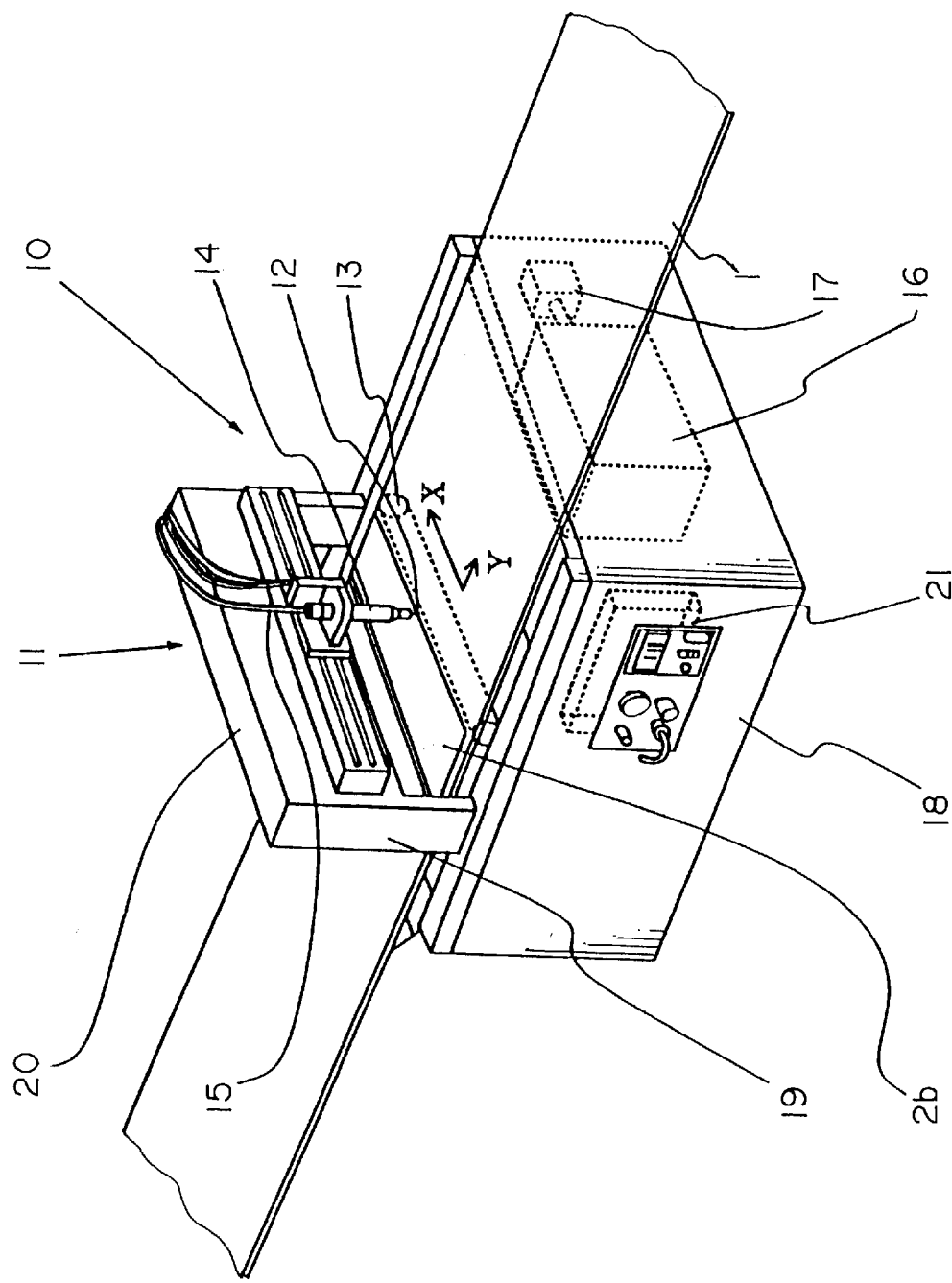
FIG. 12 is a perspective view illustrating a coating apparatus used in the process of the present invention in the second group.

The active material layer may be formed by applying the coating composition with the use of a coating apparatus. The coating apparatus will be described below with reference to FIG. 12. The coating apparatus 10 comprises an x-axis and y-axis direction driving robot 11 and a nozzle 12. According to the coating apparatus 10, the coating composition is applied onto the surface of the collector 1 to form a coating composition layer 2b by, while discharging the coating composition contained in a liquid container 14 called as a dispenser through the nozzle 12 provided at the lower end thereof, on the collector 1 which is movable in the Y-direction on a support 13 located in parallel with the x-axis and y-axis direction driving robot 11, moving the liquid container 14 in the X-direction along the surface of the collector 1.

The coating composition is supplied from a tank 16 to the liquid container 14 through a flexible pipe 15 under the control of a controller 17.

The x-axis and y-axis direction driving robot 11 is secured to a bridge-shaped frame 19 which is fixed to a base 18 including the support so as to stride over the support 13. The robot 11 includes an x-axis driving mechanism 20 which is reciprocatively movable in the X-direction and supports the liquid container 14. The controller 17 for the supply of the coating composition and the movement of the x-axis driving mechanism 20 in the X-direction is controlled by means of a controlling apparatus 21 provided on the base 18. The discharging port at the lower end of the nozzle 12 is arranged in the vicinity of the surface the collector 1. The distance between the discharge port of the nozzle 12 and the surface of the collector 1 are previously determined so as to be consistent with a target thickness of the coating composition layer 2b to be formed by the application of the coating composition.

The controlling apparatus 21 controls the driving of the x-axis driving mechanism 20 as described below.

According to a typical example of a control program, the liquid container 14 having the nozzle 12 is reciprocatively and linearly moved in the X-direction by means of the controlling apparatus 21, and the support 13 is carried in the Y-direction by a prescribed pitch. Here, the above-mentioned pitch is previously determined not so as to become larger than a width of a coating composition applied by the nozzle 12, thus making it possible to prevent a gap from being formed between linear narrow coating layers which are adjacent to each other in the Y-direction, to permit the coating of the entire area on the basis of the prescribed pattern.

The pitch in the width direction of the linear coating layers may be determined depending upon parameters such as a diameter of the discharge port of the nozzle 12, a discharging pressure, viscosity of the coating composition and its surface tension.

The controlling apparatus 21 is previously programmed so that, when the collector 1 is carried in the Y-direction by one pitch after the completion of the formation of one linear narrow coating layer by the driving of the nozzle 12 in the X-direction, the application of pressure to the liquid container 14 is ceased to stop the discharge of the coating composition from the nozzle 12.

Then, description will be given the step of applying the coating composition on the collector 1 with the use of the coating apparatus 10.

The coating composition is supplied to the liquid container 14 under the control of the controller 17, and the liquid container 14 having the nozzle 12 is simultaneously moved linearly in the X-direction by means of the x-axis driving mechanism 20, to form the first linear narrow coating composition layer. The pressure applied to the liquid container 14 is kept constant during the formation of the linear narrow coating composition layer.

After the completion of the formation of the first linear narrow coating composition layer, the discharge of the coating composition from the nozzle 12 is stopped, and accordingly it is possible to prevent the thickness of the end portion of the linear narrow coating composition layer 2b from becoming larger than that of the other portion thereof.

Then, the collector 1 is carried in the Y-direction by one pitch, and the nozzle 12 is driven in the opposite direction to the forming direction of the first linear narrow coating composition layer by the x-axis driving mechanism 20, to form the second linear narrow coating composition layer.

A plurality of linear narrow coating composition layers are formed by repeating the above-mentioned steps so as to form the coating composition layer 2b. The thus formed coating composition layer 2b is dried to form the coating layer 2. Thus, the coating composition can be applied to the collector 1 by controlling the movement of the nozzle in the X and Y-directions by means of the controlling apparatus 21, and carrying the collector 1.

The discharge port at the lower end of the nozzle 12 of the coating apparatus 10 may have a circular or oval cross-sectional shape, or may have a slit-shape. The nozzle 12 may comprise a multiple-type nozzle having a plurality of small nozzles. The use of the nozzle in which the discharge port has the oval cross-sectional shape or the slit-shape, permits to increase the width of the linear narrow coating composition layer, thus increasing the coating velocity.

Although the coating apparatus is described to have a single nozzle 12, a plurality of nozzles 12 may be provided at a prescribed interval which is an integral multiple of the pitch in the linear narrow coating composition layers in the Y-direction.

In this case, both of the distance between the "N"th nozzle and the "N+1"th nozzle in the Y-direction, and the distance between the "N+2"th nozzle and the "N+1"th nozzle in the Y-direction are previously determined to be identical with an integral multiple of the pitch in the linear narrow coating composition layers in the Y-direction, and the former distance is previously determined to be identical with the latter distance. The respective nozzles may be driven in synchronization with each other or may be driven in non-synchronization with each other.

The use of the plurality of nozzles permits to increase the coating velocity, since the application of the coating composition is carried out by the plurality of nozzles. Although there is described that, in coating apparatus 10, the coating composition is applied on the collector 1 by moving the collector 1 in the Y-direction and moving the liquid container 14 in the X-direction by means of the x-axis driving mechanism 20, the coating apparatus used in the present invention is not limited only to the above-described type of the apparatus, and the application of the coating composition may be carried out by stationarily arranging the collector and moving the liquid container 14 in the X and Y-directions.

Although there is described that, in the coating apparatus 10, the distance between the nozzle 12 and the surface of the collector 1 is previously determined to be identical with the target thickness of the coating composition layer 2b, the present invention is not limited only to such an arrangement, and the linear narrow coating composition layers may be formed by dripping the coating composition in the form of threads from the nozzle 12 which is apart from the collector 1 by a relatively long distance.

The distance between the nozzle 12 and the collector 1 may previously be determined to be smaller than the target thickness of the coating composition layer 2b, and the application of the coating composition may be carried out in such an arrangement.

Then, the drying step is carried out to remove the dispersing medium from the coating composition layer 2b formed as described above in the following manner, to prepare an active material layer.

As a heat source in the drying step, there may be used hot air, infrared radiation, microwave, high-frequency wave, or the combination thereof. The coating composition layer may be dried by heat radiated from the metallic rollers, the metallic sheet, and the like which support the collector 1 in the drying step. The active material layer has a thickness of from 10 to 200 $\mu$m, preferably of from 50 to 150 $\mu$m. The coating amount of the coating composition is previously determined so that the resultant active material layer has a thickness within the above-mentioned range. In order to improve homogeneousness of the coating layer formed by carrying out the above-described applying and drying steps, there may be added to the drying step, a step of pressing softly a film having a flat surface made of a polyethylene terephthalate or the like on the surface of the coating layer, and then, peeling the film therefrom to make the surface of the coating layer smooth. In case where the secondary battery is produced with the use of the electrode plate of the present invention, which has been prepared in the above-described manner, it is preferable to apply a heating treatment and a decompression treatment to the electrode plate prior to the assembling step of the secondary battery, in order to remove moisture in the coating layer of the electrode plate, which contains the active material.

Figure 11:
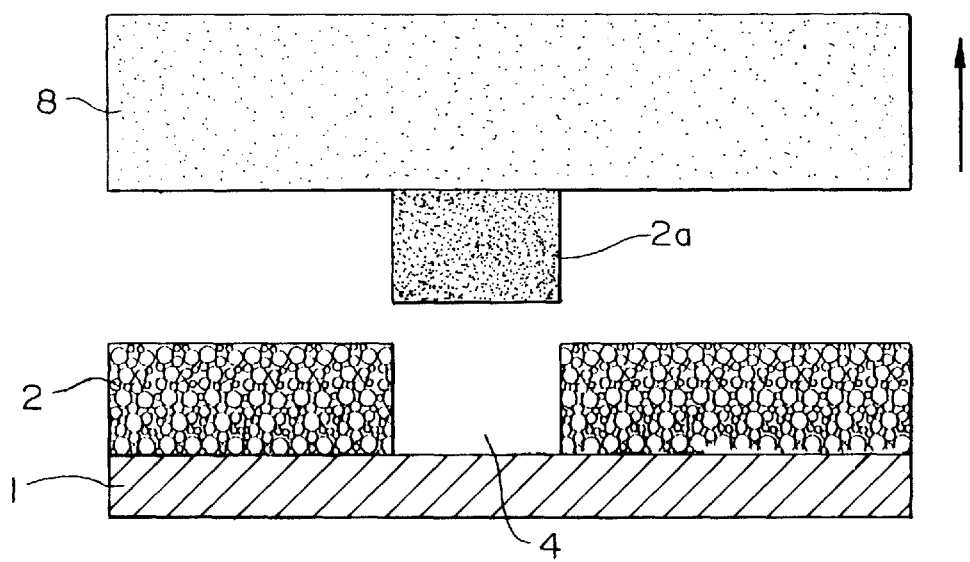
FIG. 11 is a schematic descriptive view illustrating further another step of the process of the present invention in the second group.

The peeling sheet used for peeling the active material layer formed in the aforementioned manner on the basis of the prescribed pattern in the present invention, is a porous sheet impregnated with the thermoplastic resin. As a porous sheet, there may be used material having excellent impregnation property with the thermoplastic resin, for example, woven fabric cloth, knitted cloth, nonwoven fabric cloth, or the like. The porous sheet preferably has a good adhesivity to the active material layer impregnated with the thermoplastic resin as shown in FIG. 11. It is more preferable to use nonwoven fabric cloth satisfying the above-described requiremnts. The more preferable nonwoven fabric cloth has a sufficient thickness and a large porosity so as to permit the impregnation with the thermoplastic resin and the peeling of the active material layer. It is preferable to use nonwoven fabric cloth having an uniform fibroid form, in order to permit the uniform peeling of the active material layer.

The peeling sheet used in the present invention is obtained by the sufficient impregnation of the above-mentioned porous sheet with the thermoplastic resin. Other than the above-mentioned thermoplastic resin, there may be used material which is easily melted by heat, for example, low-molecular weight polyethylene, polypropylene, derivatives thereof, many kinds of wax, or the like. Such materials preferably have a heat resistant property, and a poor adhesivity to the collector made of the metallic foil as well as a low extensibility for the precise formation of the non-coated portion on the basis of the prescribed pattern.

In view of the object of the present invention, the thermoplastic resin preferably has a melting point of from 100° C. to 250° C., and more preferably of form 120° C. to 170° C. When the melting point of the thermoplastic resin is excessively low, it softens at a room temperature, leading to hard handling thereof and a poor productivity of the electrode plate. When the melting point thereof is excessively high, on the other hand, there occurs uneconomical problems in energy, and the collector as a substrate may be damaged when causing the impregnation of the active material layer with the thermoplastic resin.

The thermoplastic resin preferably has viscosity of from 100 to 50,000 cP when the melting thereof, and more preferably of from 400 to 6,000 cP. When the viscosity of the thermoplastic resin is excessively high, there occurs uneconomical problems in energy. When the viscosity thereof is excessively low, the thermoplastic resin in a molten state tends to spread over in the inside of the active material coating layer 2 in a direction along a plane parallel to the surface thereof by the capillary phenomenon, thus making it impossible to form a sharp pattern.

Polyethylene or polypropylene suitably used as the thermoplastic resin in the present invention may be exemplified by that of a non-oxidized low density type, a non-oxidized middle density type, a non-oxidized high density type, an oxidized low density type, an oxidized middle density type, an oxidized high density type, a non-polarity type, a polarity type, a fine powdery type or the like, and any one of them is applicable to the present invention. Such a thermoplastic resin may be permeated through the sheet such as the above-mentioned nonwoven fabric cloth by any conventional method, for example, a method of immersing the nonwoven fabric cloth into the thermoplastic resin in the molten state, to cause the impregnation of the nonwoven fabric cloth with the thermoplastic resin. An amount of permeated thermoplastic resin is preferably within a range of from about 50 to about 500 g/m$^2$, depending upon the thickness of the active material layer to be peeled.

In the present invention, the above-mentioned peeling sheet is placed, as shown in FIGS. 7 to 11, on the active material layer formed in the above-described manner, and then the active material layer is partially peeled on the basis of the prescribed pattern. In this case, there may be used a pressure heating body such as for example a flat plate press, a roll press, or the like. Although the pressure required for the flat plate press is determined in relation to the heating temperature, it is preferably in a range of from 10 to 1,000 kgf/cm$^2$. Although the pressure required for the roll press is also determined in relation to the heating temperature, it is preferably in a range of from 5 to 500 kgf/cm$^2$.

When the peeling sheet is heat-pressed on the active material layer, it is preferable to carry out the heating from the side of the collector. If the heating is carried out from the side of the peeling sheet, the thermoplastic resin easily tends to be in a molten state, with the result that the thermoplastic resin may spread over a portion of the active material layer other than the portion to be peeled, thus causing an unfavorable problem. There may be provided an appropriate means for maintaining a prescribed distance between the pressure heating body and the active material layer, so as to prevent the thermoplastic resin from being spread over the non-target portion of the active material, and to prevent the peeling sheet from being collapsed during the heat-pressing step. The prescribed distance between the pressure heating body and the active material layer is preferably within a range of from 10 to 600 μm which is identical with the thickness of the peeling sheet. After the completion of the heat-pressing step and the cooling step, even when the portion of the active material layer may not be peeled together with the peeling sheet, such a portion may easily be peeled by the other appropriate peeling means, since the thermoplastic resin permeates into the portion to be peeled of the active material layer, through which the portion thereof adheres to the collector in a relatively small strength. For example, tension is applied to the collector as a substrate during the peeling step, to lift up the portion to be peeled of the active material layer so as to remove same. Alternately, the portion thereof may be blown off with air.

In case where the lithium secondary battery is produced with the use of the thus prepared electrode plates, as positive and negative plates, of the present invention for a secondary battery with a nonaqueous electrolyte, there is used, as an electrolyte, a nonaqueous electrolyte which is obtained by dissolving lithium salts as solute into an organic solvent.

As lithium salts as solute forming the nonaqueous electrolyte, there may be used inorganic lithium salt such as $LiClO_4$, $LiBF_4$, $LiPF_6$, $LiAsF_6$, LiCl, LiBr or the like, or organic lithium salt such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$, $LiOSO_2C_7F_{15}$, or the like.

In this stage, there may be used, as an organic solvent, cyclic esters, chain esters, cyclic ethers, chain ethers or the like.

The cyclic esters may be exemplified by propylene carbonate, butylene carbonate, γ-buthyrolactone, vinylene carbonate, 2-methyl-γ-buthyrolactone, acetyl-γ-buthyrolactone and γ-valerolactone.

The chain esters may be exemplified by dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, propionic acid alkyl ester, malonic acid dialkyl ester and acetic acid alkyl ester.

The cyclic ethers may be exemplified by tetrahydrofuran, alkyltetrahydrofuran, dialkyltetrahydrofuran, alkoxytetrahydrofuran, dialkoxytetrahydrofuran, 1,3-dioxolan, alkyl-1,3-dioxolan and 1,4-dioxolan.

The chain ethers may be exemplified by 1,2-dimethoxyethane, 1,2-diethoxyethane, diethyl ether, ethylene glycol dialkylether, diethylene glycol dialkylether, triethylene glycol dialkylether and tetraethylene glycol dialkylether.

Now, the present invention in the third group will be described in detail below.

The electrode plate of the present invention in the third group may be composed, as in the present invention in the second group, either of an original sheet having a series of plural plates as shown in FIG. 7(a), or of a single plate which is obtained by cutting the original sheet along lateral lines as shown in FIG. 7(a). In FIG. 8, a terminal 7 is connected to a portion of the surface of the collector, which is exposed on the basis of the prescribed pattern.

Figure 13:
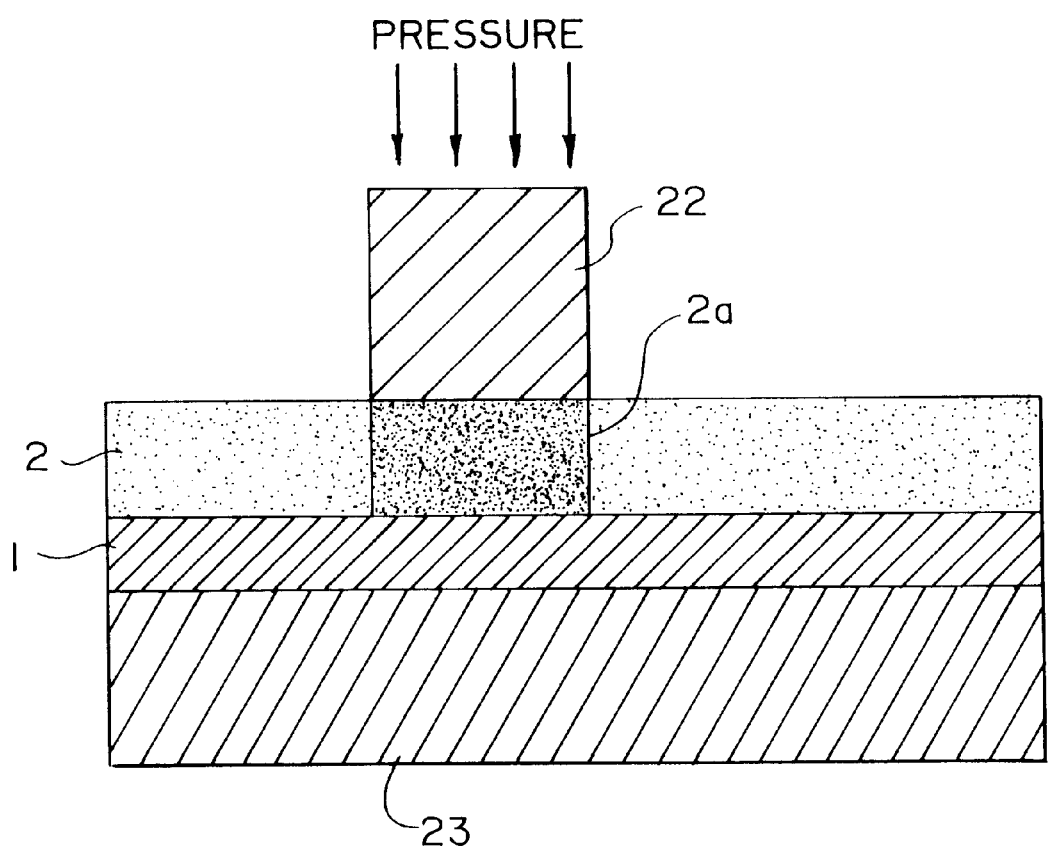
FIG. 13 is a schematic descriptive view illustrating one step of the process of the present invention in the third group.
Figure 14:
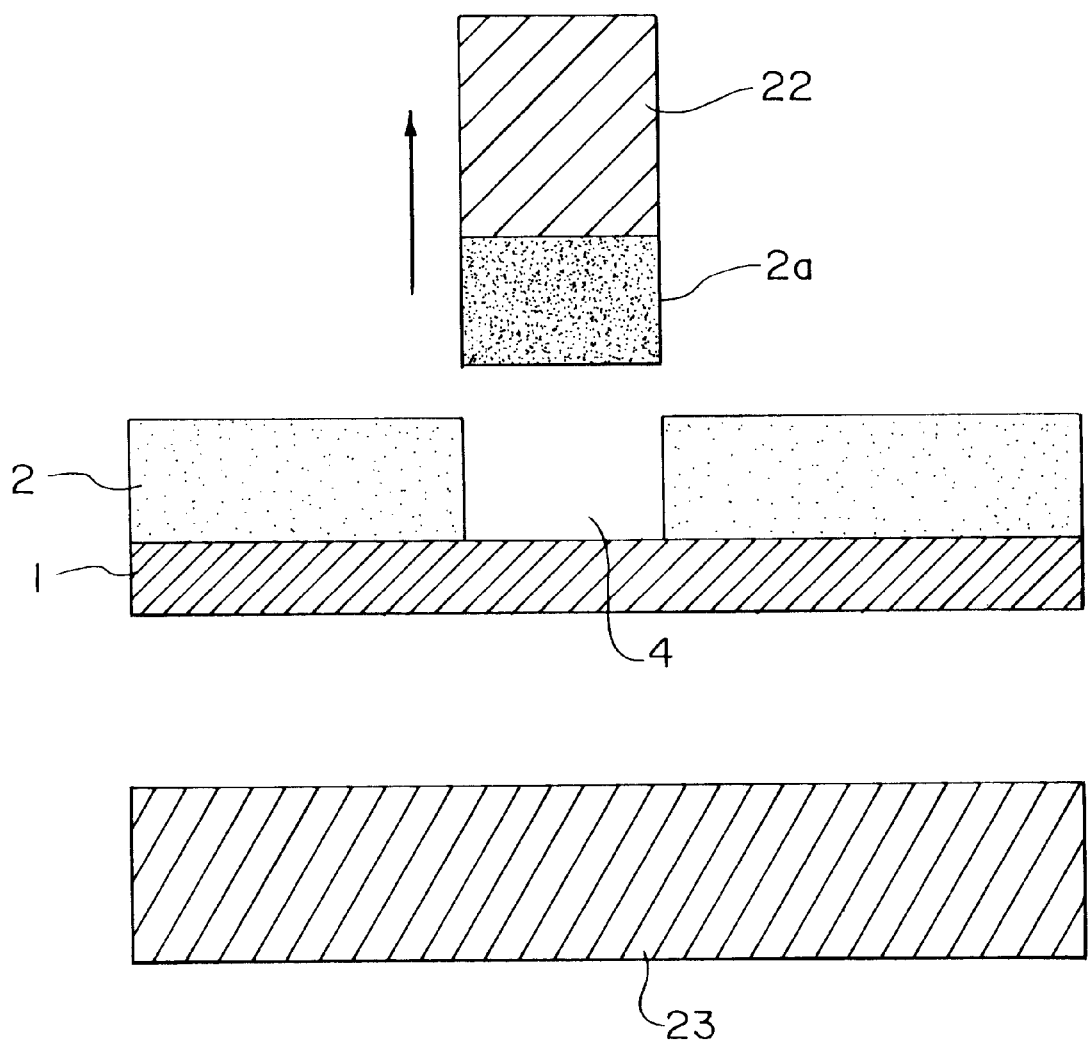
FIG. 14 is a schematic descriptive view illustrating another step of the process of the present invention in the third group.

The electrode plate of the present invention in the third group in which an active material layer is partially peeled on the basis of the prescribed pattern, can be produced in a manner as shown in FIGS. 13 and 14. More specifically, an active material layer 2 comprising active material layer and a binder is formed on a collector by applying a coating composition thereon, and then, the thus formed active material layer is heated. Although any conventional heating method may be applied, it is preferable to heat the active material layer from the side of the collector 1 with the use of an appropriate heating means such as a hot plate 23 as shown in FIGS. 13 and 14. A heating temperature is kept over or equal to a temperature at which a formed body made of thermoplastic resin is melted, for example in a range of from 30 to 250° C., preferably of from 70 to 150° C. When the active material layer 2 is heated, a formed body made of thermoplastic resin having substantially the same size as the portion to be peeled of the active material layer 2 is placed on a prescribed portion of the active material layer 2. In this stage, when the active material layer 2 is sufficiently heated, a pressing force as shown in arrows in FIG. 13, is not always required to be applied to the formed body 22. It is however preferable to apply pressure to the extent that the formed body 22 made of thermoplastic resin is not largely deformed, in order to promote the impregnation velocity of the thermoplastic resin which is in a molten state.

After the completion of the impregnation of the thermoplastic resin, only the hot plate 23 is moved downwardly, and then the collector 1 and the active material layer 2 impregnated with the thermoplastic resin are kept at a room temperature, or subjected to a forced cooling. Alternately, the heating of the thermoplastic resin from the side of the collector 1 is stopped, and then the collector 1 and the active material layer 2 impregnated with the thermoplastic resin are kept at a room temperature, or subjected to a forced cooling. Then, the thermoplastic resin permeating through the active material layer 2 rapidly solidifies, with the particles therein surrounded by the thermoplastic resin. In this stage, when the formed body 22 made of the thermoplastic resin is peeled, the portion 2a of the active material layer 2 impregnated with the thermoplastic resin can also be peeled together with the formed body 22, since the adhesive strength between the formed body 22 made of the thermoplastic resin and the active material layer 2 is remarkably larger than the adhesive strength between the collector 1 and the active material layer 2. The non-coated portion (i.e., peeled portion) having a sharp edge can easily be formed on the collector 1 on the basis of the prescribed pattern in this manner.

Figure 15:
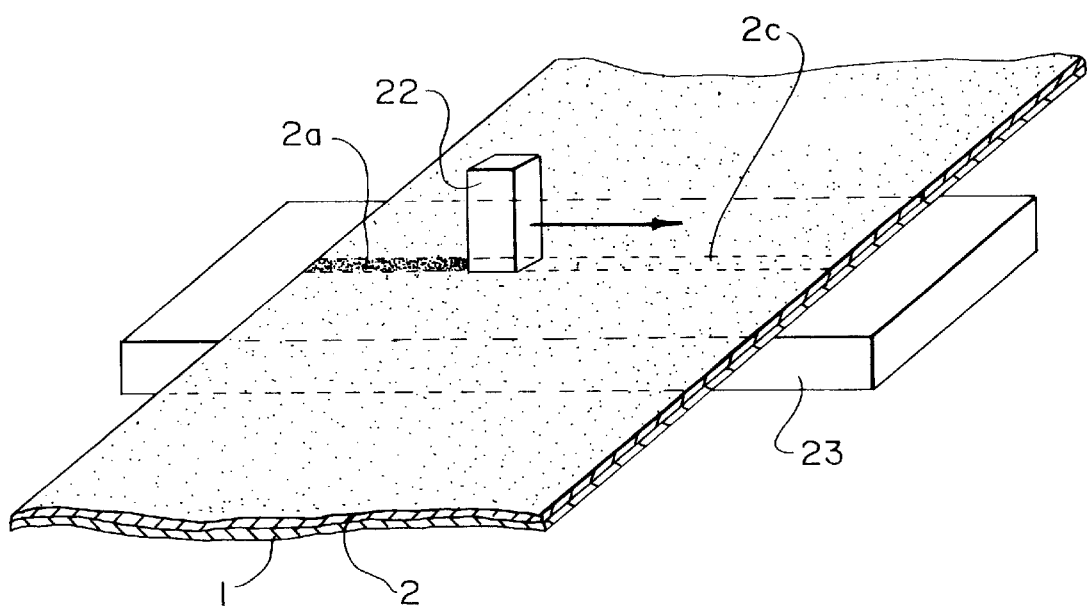
FIG. 15 is a schematic descriptive view illustrating further another step of the process of the present invention in the third group.

FIG. 15 is a descriptive view illustrating the other embodiment of the present invention. In the embodiment as shown in FIG. 15, there is used a formed body made of thermoplastic resin having substantially the same width as a prescribed width of the peeled portion to be formed of the active material layer 2 for the purpose of continuous impregnation of the portion 26 to be peeled of the active material layer 2, whereas in the embodiment as shown in FIG. 14, there is used the formed body 22 made of the thermoplastic resin having substantially the same size as the portion to be peeled of the active material layer 2.

More specifically, the active material layer 2 is heated, as in the embodiment shown in FIG. 14, to a prescribed temperature, and the active material layer 2 is continuously moved in a direction of an arrow shown in FIG. 15 to be impregnated with the thermoplastic resin, while pressing the formed body 22 made of the thermoplastic resin on the heated surface of the active material layer. The moving velocity in the above-mentioned step is determined so that the active material layer is impregnated with the thermoplastic resin in a sufficient amount thereof, taking into consideration a melting point or a softening point of the formed body 22 and a temperature of the active material layer 2.

Figure 16A:
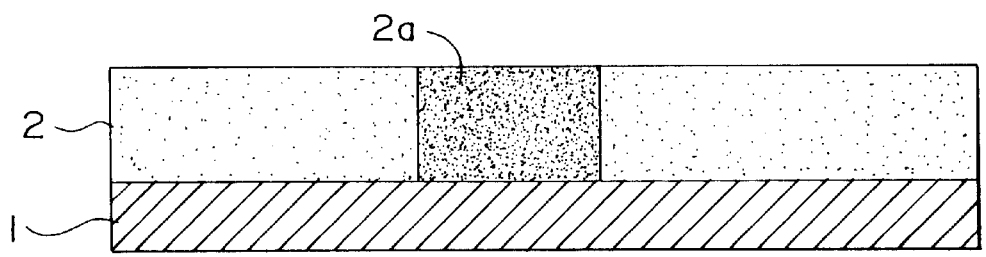
FIGS. 16(a) to 16(c) are schematic descriptive views illustrating further another step of the process of the present invention in the third group.
Figure 16B:
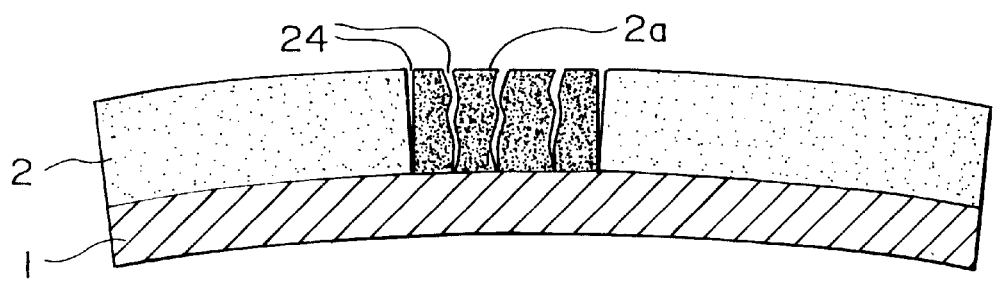
Figure 16C:
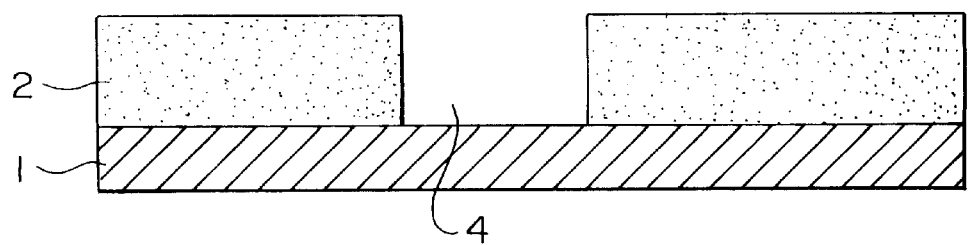

FIG. 16 shows an example of a step of peeling the active material layer 2 impregnated with the thermoplastic resin in accordance with the step as shown in FIG. 15. FIG. 16(*a*) shows the thermoplastic resin in a solidified condition after the impregnation step and the cooling step. When the electrode plate is bent to form a gentle curved surface as shown in FIG. 16(*b*) in the above-mentioned state, cracks 24 tend to easily occur not only at the boundary between the impregnated portion 2a of the active material layer 2 and the non-impregnated portion thereof, but also in the impregnated portion itself, since the impregnated portion of the active material layer 2 has a large density to be hard and brittle, whereas there is no occurrence of cracks and the peeling in the non-impregnated portion of the active material layer 2, due to the binder contained in the non-impregnated portion thereof. When the polypropylene wax is used, such a phenomenon occurs remarkably. The above-mentioned cracks may occur through the shrinkage of the impregnated portion of the active material layer 2, when cooling it.

In addition, the adhesive strength between the collector 1 and the thermoplastic resin in the impregnated portion of the active material layer 2 is smaller than that in the non-impregnated portion thereof. It is therefore possible to easily peel the impregnated portion of the active material layer 2 by scraping softly the impregnated portion, or blowing air thereto in a state as shown in FIG. 16(*b*) or a state in which the electrode plate is restored from the bending condition. The non-coated portion (i.e., peeled portion) having a sharp edge can easily be formed on the collector 1 on the basis of the prescribed pattern in this manner. With respect to a method of impregnating the active material layer 2 with the thermoplastic resin, there may be used a method of impregnating the active material layer 2 with the thermoplastic resin by arranging a formed body made of thermoplastic resin and having a prescribed pattern on the active material layer 2 and heating the active material layer 2, or another method of pressing a formed body made of thermoplastic resin and having a prescribed pattern on the heated active material layer 2 at a prescribed pressure to melt the thermoplastic resin which is in contact with the active material layer 2 and to impregnate the active material layer 2 with the thermoplastic resin. With respect to the step of peeling the impregnated portion 2a of the active material layer 2, there may be used any one of a method of vibrating the electrode plate, a method of applying tension to the collector 1 to lift up the impregnated portion 2a, a method of peeling it with the use of an adhesive tape, to which the present process of the present invention is not however limited.

As the formed body made of the thermoplastic resin for peeling the impregnated portion 2a of the active material layer 2 in the present invention, there may be used material which is easily melted by heat, i.e., thermoplastic resin generally used, as well as for example, low-molecular weight polyethylene, polypropylene, derivatives thereof, many kinds of wax, or the like. Such materials preferably have a heat resistant property, and a poor adhesivity to the collector made of the metallic foil as well as a low extensibility for the precise formation of the non-coated portion on the basis of the prescribed pattern. It is also possible to impregnate the active material layer with polyethylene by cutting a film made of low molecular weight polyethylene into a prescribed shape to form a formed body, placing the thus formed body on a portion to be peeled of the active material layer, and then melting the formed body with a prescribed pressure with the use of a heat plate.

In view of the object of the present invention, the above-described thermoplastic resin preferably has a melting point of from 20° C. to 250° C., and more preferably of form 60° C. to 150° C. When the melting point of the thermoplastic resin is excessively low, it softens at a room temperature, leading to hard handling thereof and a poor productivity of the electrode plate. When the melting point thereof is excessively high, on the other hand, there occurs uneconomical problems in energy, and the collector as a substrate may be damaged when causing the impregnation of the active material layer with the thermoplastic resin. The thermoplastic resin preferably has viscosity of from 100 to 50,000 cP when the melting thereof, and more preferably of from 400 to 6,000 cP. When the viscosity of the thermoplastic resin is excessively high, there occurs uneconomical problems in energy. When the viscosity thereof is excessively low, the thermoplastic resin in a molten state tends to spread over in the inside of the active material coating layer 2 in a direction along a plane parallel to the surface thereof by the capillary phenomenon, thus making it impossible to form a sharp pattern.

Polyethylene or polypropylene suitably used as the thermoplastic resin in the present invention may be exemplified by that of a non-oxidized low density type, a non-oxidized middle density type, a non-oxidized high density type, an oxidized low density type, an oxidized middle density type, an oxidized high density type, a non-polarity type, a polarity type, a fine powdery type or the like, and any one of them is applicable to the present invention. There is used a formed body made of such a thermoplastic resin having an appropriate shape.

It is necessary for the molten thermoplastic resin to permeate through fine cavities in the coating layer 2 so as to reach the boundary between the collector l and the active material layer. If the molten thermoplastic resin is solidified before it reaches the boundary therebetween, a portion to be removed of the coating layer 2 may be left non-peeled even when the resin-impregnated portion is peeled from the collector 1. In order to solve the above-mentioned problem, the collector 1 may sufficiently be heated to delay the solidification of the thermoplastic resin, or the thermoplastic resin having low viscosity may be selected to increase the permeating velocity of thereof, or the thermoplastic resin may be kept at a sufficiently high temperature to delay the solidification thereof.

In case where there is applied a method of applying the thermoplastic resin in a molten state on the active material layer, according as a thickness of the active material layer is increased, there is required a long period of time of several tens of seconds for the completion of permeation of the thermoplastic resin. There may be a case that complete permeation of the thermoplastic resin through the boundary between the active material layer and the collector cannot be achieved by one step, even when a lot of time is taken. Accordingly, when the active material layer has a large thickness, one permeation step may require a period of time of from several tens of seconds to several minutes, or the same permeation step must be repeated, as an occasion demands.

When there is used, in replacement of the step of applying the molten thermoplastic resin onto the active material layer, a step of pressing the formed body made of the thermoplastic resin to the active material layer, to cause only the portion of the thermoplastic resin, which is in contact with the active material layer to be melted, so as to permeate through the active material layer, it is possible to cause the thermoplastic resin to reach the surface of the collector for few seconds, thus permitting remarkable reduction in time required for forming the non-coating portion (i.e., the peeled portion) on the basis of the prescribed pattern.

Description will be given of each of materials of which the electrode plate is composed, in case where the process of the present invention is applied to the production of the electrode plate for a secondary battery with a noaqueous electrolyte. The secondary battery with a noaqueous electrolyte may be exemplified by a lithium secondary battery, and is characterized in the use of the nonaqueous organic solvent as an electrolyte. For example, there is used an electrode plate in which the coating layer (i.e., the active material coating layer) containing the active material for the electrode is formed on the collector made of a metallic foil, and the nonaqueous organic solvent is used as an electrolyte. In this battery, charge and discharge can be performed by interchange of electrons during the movement of a lithium ion between the positive electrode and the negative electrode.

As a collector used in the electrode plate of the present invention for a secondary battery with a nonaqueous electrolyte, it is preferable to use a metallic foil such as for example an aluminum foil, a copper foil or the like. Such a metallic foil preferably has a thickness of from about 10 $\mu$m to about 30 $\mu$m.

In the present invention, either the active material layer for the positive electrode, or the active material layer for the negative electrode is formed on the collector 1. A coupling agent layer may be formed on the surface of the collector 1 in order to improve the adhesivity between the collector 1 and the active material layer for the positive or negative electrode. As a coupling agent used for the formation of the coupling agent layer, there may be used a coupling agent having an excellent adhesivity to both of the collector 1 made of a metallic foil and the active material layer, which is appropriately selected from the coupling agents such as a silane-coupling agent, a titanate-coupling agent, an aluminum-coupling agent and the like.

As an active material for the positive electrode used in the present invention, there may be used at least one kind of lithium oxides such as $LiCoO_2$, $LiNiO_2$, $LiMn_2O_4$ and the like, and chalcogen compounds such as $TiS_2$, $MnO_2$, $MoO_3$, $V_2O_5$ and the like. As an active material for the negative electrode, on the other hand, it is preferable to use metallic lithium, lithium alloy and carbonaceous material such as graphite, carbon black and acetylene, or material capable of intercalating lithium ions. When $LiCoO_2$ is used as the active material for the positive electrode and the carbonaceous material is used as the active material for the negative electrode, it is possible to obtain a lithium secondary battery having a high discharge voltage of about 4 volts.

It is preferable to disperse uniformly these active materials in the coating layer as formed. For this reason, it is preferable to use powder of the active material having a particle size of from 1 to 100 $\mu$m and an average particle size of about 10 $\mu$m.

As a binder used for the coating composition containing the above-mentioned active material in the process of the present invention, there may be used for example thermoplastic resin such as polyester resin, polyamide resin, polyacrylic acid-ester resin, polycarbonate resin, polyurethane resin, cellulose resin, polyolefin resin, polyvinyl resin, fluororesin, polyimide resin or the like; thermosetting resin such as rubber type resin, acrylic resin, urethane resin or the like; ionizing radiation-setting resin such as acrylate monomer, oligomer or the mixture thereof; or the mixture of these kinds of resin.

Description will be given below of a concrete method for preparing the coating composition for the electrode plate used in the present invention, which contains the active material. First, the binder and the powdery active material which are appropriately selected from the above-described materials, are added to a dispersing medium comprising an organic solvent such as toluene, methyl ethyl ketone, N-methyl-2-pyrrolidone, the mixture thereof or the like, and a conductive agent is added to the dispersing medium, as an occasion demands, to prepare a mixture. The thus prepared mixture is subjected to a mixing and dispersing process with the use of the conventional dispersing apparatus such as a homogenizer, a ball mill, a sand mill, a roll mill and the like.

In the preparation of the above-mentioned coating composition, a total amount of the active material and the binder is preferably within a range of from about 40 to 80 wt. parts relative to 100 wt. parts of the whole coating composition, and the ratio of the active material to the binder is preferably within a range of from 9:1 to 8:2. As a conductive agent added as an occasion demands in the preparation of the coating composition, there may be used for example carbonaceous material such as graphite, carbon black, acetylene black or the like.

As a method of applying the coating composition on the surface of the collector made of a metallic foil, there may be used a conventional coating method such as a gravure coating method, a gravure reverse coating method, a roll coating method, a Mayer bar coating method, a blade coating method, a knife coating method, an air knife coating method, a slot die coating method, a slide die coating method, a dip coating method or the like.

Then, the drying step is carried out to remove the dispersing medium from the coating composition layer 2b formed as described above in the following manner, to prepare an active material layer. As a heat source in the drying step, there may be used hot air, infrared radiation, microwave, high-frequency wave, or the combination thereof. The coating composition layer may be dried by heat radiated from the metallic rollers, the metallic sheet, and the like which support the collector 1 in the drying step. The active material layer has a thickness of from 10 to 200 $\mu$m, preferably of from 50 to 150 $\mu$m. The coating amount of the coating composition is previously determined so that the resultant active material layer has a thickness within the above-mentioned range.

The coating layer obtained by carrying out the above-mentioned applying and drying steps is preferably subjected to a press treatment with the use of a metallic roll, a heating roll, a sheet pressing machine or the like, to prepare the electrode plate of the present invention, in order to improve homogeneousness of the coating layer. The pressing condition of from 500 kgf/cm$^2$ to 7,500 kgf/cm$^2$, more preferably of from 3,000 kgf/cm$^2$ to 5,000 kgf/cm$^2$ may be applied to the above-described press treatment. With a pressing force of under 500 kgf/cm$^2$, the homogeneousness of the coating layer may not sufficiently be improved. With a pressing force of over 7,500 kgf/cm$^2$, the electrode plate itself including the collector may be broken, thus causing an unfavorable problem. In case where the secondary battery is produced with the use of the electrode plate of the present invention, which has been prepared in the above-described manner, it is preferable to apply a heating treatment and a decompression treatment to the electrode plate prior to the assembling step of the secondary battery, in order to remove moisture in the coating layer of the electrode plate, which contains the active material.

In case where the lithium secondary battery is produced with the use of the thus prepared electrode plates, as positive and negative plates, of the present invention for a secondary battery with a nonaqueous electrolyte, there is used, as an electrolyte, a nonaqueous electrolyte which is obtained by dissolving lithium salts as solute into an organic solvent.

As lithium salts as solute forming the nonaqueous electrolyte, there may be used inorganic lithium salt such as $LiClO_4$, $LiBF_4$, $LiPF_6$, $LiAsF_6$, $LiCl$, $LiBr$ or the like, or organic lithium salt such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOS_2C_6F_{13}$, $LiOSO_2C_7F_5$, or the like.

In this stage, there may be used, as an organic solvent, cyclic esters, chain esters, cyclic ethers, chain ethers or the like.

The cyclic esters may be exemplified by propylene carbonate, butylene carbonate, γ-buthyrolactone, vinylene carbonate, 2-methyl-γ-buthyrolactone, acetyl-γ-buthyrolactone and γ-valerolactone.

The chain esters may be exemplified by dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, propionic acid alkyl ester, malonic acid dialkyl ester and acetic acid alkyl ester.

The cyclic ethers may be exemplified by tetrahydrofuran, alkyltetrahydrofuran, dialkyltetrahydrofuran, alkoxytetrahydrofuran, dialkoxytetrahydrofuran, 1,3-dioxolan, alkyl-1,3-dioxolan and 1,4-dioxolan.

The chain ethers may be exemplified by 1,2-dimethoxyethane, 1,2-diethoxyethane, diethyl ether, ethylene glycol dialkylether, diethylene glycol dialkylether, triethylene glycol dialkylether and tetraethylene glycol dialkylether.

Now, the present invention in the fourth group will be described in detail below.

The process of the present invention in the fourth group comprises a preparation step, an impregnation step, a solidification step and a peeling step. FIG. 17(a) illustrates the preparation step, FIG. 17(b) illustrates the impregnation step, FIG. 17(c) illustrates the solidification step and FIG. 17(d) illustrates the peeling step.

(a) Preparation step

A porous coating layer 2 is formed on a collector 1 as a substrate by applying a coating composition for an electrode plate, which comprises active material and a binder onto the collector 1, and drying same, as shown in FIG. 17(a).

As a collector used in the electrode plate of the present invention for a secondary battery with a nonaqueous electrolyte, it is preferable to use a metallic foil such as for example an aluminum foil, a copper foil or the like. Such a metallic foil preferably has a thickness of from about 10 μm to about 30 μm.

The active material may be classified into an active material for the positive electrode and an active material for the negative electrode. As an active material for the positive electrode used in the present invention, there may be used at least one kind of lithium oxide such as $LiCoO_2$, $LiNiO_2$, $LiMn_2O_4$ and the like, and chalcogen compounds such as $TiS_2$, $MnO_2$, $MoO_3$, $V_2O_5$ and the like. The active material mentioned above may be used alone or in combination with the other active material. As an active material for the negative electrode, it is preferable to use lithium-containing metal such as metallic lithium and lithium alloy, or carbonaceous material such as graphite, carbon black, acetylene or the like. When $LiCoO_2$ is used as the active material for the positive electrode and the carbonaceous material is used as the active material for the negative electrode, it is possible to obtain a lithium secondary battery having a high discharge voltage of about 4 volts. It is preferable to disperse uniformly these active materials in the coating layer as formed. For this reason, it is preferable to use powder of the active material having a particle size of from 1 to 100 μm and an average particle size of about 10 μm.

The binder for preparing the active material coating composition for the electrode plate is required to be chemically stable against the nonaqueous electrolyte, insoluble in the electrolyte, and soluble in a certain solvent to be able to be applied to the surface of the substrate in the form of thin film. As a binder used in the process of the present invention, there may be selectively used for example thermoplastic resin, i.e., polyester resin, polyamide resin, polyacrylic acid-ester resin, polycarbonate resin, polyurethane resin, cellulose resin, polyolefin resin, polyvinyl resin, fluororesin and polyimide resin. In this case, compounds in which reactive functional group is introduced (i.e., acrylate monomer or oligomer) may be simultaneously mixed. The acrylate monomer and the oligomer may be used alone or in combination.

Description will be given below of a concrete method for preparing the coating composition for the electrode plate used in the present invention, which contains the active material. First, the binder and the powdery active material which are appropriately selected from the above-described materials, are added to a dispersing medium or a solvent comprising an organic solvent such as N-methyl-2-pyroridone and toluene, and a conductive agent is added to the dispersing medium, as an occasion demands, to prepare a mixture. The thus prepared mixture is subjected to a mixing and dispersing process with the use of the conventional dispersing apparatus such as a homogenizer, a ball mill, a sand mill, a roll mill and the like. In this stage, there may be applied the same mixing ratio of the binder and the active material as the conventional mixing ratio thereof. There may preferably be applied the mixing weight ratio of the binder: the active material=5:5 through 1:9 for the positive electrode plate, and the mixing weight ratio of the binder: the active material=2:8 through 1:9 for the negative electrode plate. As a conductive agent added as an occasion demands, there may be used for example carbonaceous material such as graphite, carbon black, acetylene black or the like.

The thus prepared coating composition for the electrode plate, containing the active material, is applied on the collector as a substrate with the use of a gravure coater, a gravure reverse coater, a die coater, a slide coater or the like, and then dried to form the coating layer. The applying step and the drying step may be carried out several times to prepare a coating layer having the thickness of from 10 to 200 μm, preferably of from 50 to 170 μm.

When the coating layer obtained by carrying out the above-mentioned applying and drying steps is be subjected to a press treatment with the use of a metallic roll, a heating roll, a sheet pressing machine or the like, it is possible to improve homogeneousness of the coating layer. The above-described press treatment is not always essential. The pressing condition of from 500 kgf/cm$^2$ to 7,500 kgf/cm$^2$, more preferably of from 3,000 kgf/cm$^2$ to 5,000 kgf/cm$^2$ may be applied to the above-described press treatment. With a pressing force of under 500 kgf/cm$^2$, the homogeneousness of the coating layer may not sufficiently be improved. With a pressing force of over 7,500 kgf/cm$^2$, the electrode plate itself including the collector may be broken, thus causing an unfavorable problem.

The coating layer having a uniform thickness and excellent homogeneousness can be obtained by carrying out the above-described preparation step.

(b) Impregnation step

The above-described coating layer 2 is impregnated with a solidifiable material 3 as a liquid material, which has a larger cohesion after solidification thereof than that of the coating layer 2, to form an impregnated-portion 2a of the coating layer having a prescribed pattern.

The solidifiable material 3 is required to have a larger cohesion after solidification thereof than that of the coating layer 2. In other words, the solidifiable material 3 should solidify to become harder than the coating layer. When the solidifiable material 3 has a smaller cohesion after solidification than that of the coating layer, it is hard to perform a complete and precise peeling step of the solidifiable material-impregnated portion of the coating layer. Namely, there is a tendency that parts of the impregnated portion may be left non-peeled on the surface of the collector in the prescribed pattern, the non-peeled portion may have a blunt edge, leading to poor measurement accuracy of the pattern, and the adhesivity of the porous sheet to the coating layer may become low, thus making it impossible to peel the impregnated portion of the coating layer together with the porous sheet.

In the present invention, the term "cohesion" means not only a cohesive force in the narrow sense, but also a general force which have an action of solidifying material or maintaining material in a solid state. Accordingly, the term "cohesion" in the present invention includes interatomic or intermolecular attractive forces as a cohesive force in the narrow sense, as well as forces which contribute to chemical bond such as, for example, intermolecular covalent bond.

There may be used the solidifiable material which has any solidification machanism. There may be used, for example, material such as polymerization material or cross-linking material, which irreversibly solidifies through a chemical reaction. It is however convenient to use material which permits reversible repetition of solidification and liquefaction in accordance with certain conditions. Material which is solid at a room temperature, and can be liquefied by heat, is remarkably convenient in use in the actual working, since it is possible to adjust its flowability by heat.

As material which is solid at a room temperature, and can be liquefied by heat, a heat-fusible material may suitably be used. The heat-fusible material may exemplified by thermoplastic resin containing at least one kind of ethylene- or propylene-homopolymer or copolymer (for example, polyethylene, polypropylene, ethylene copolymer, propylene copolymer, or the like); organic or inorganic wax and the like.

The heat-fusible material used as a solidifiable material preferably has a melting point within a range of from 20° C. to 250° C., preferably within a range of from 60° C. to 150° C. When the melting point of the heat-fusible material is excessively low, it softens at a room temperature, leading to hard handling thereof and a poor productivity of the electrode plate. When the melting point thereof is excessively high, on the other hand, there occurs uneconomical problems in energy.

The heat-fusible material preferably has viscosity of from 10 to 50,000 cP when the melting thereof, and more preferably of from 400 to 6,000 cP. When the viscosity of the heat-fusible material is excessively high, the heat-fusible material tends to not permeate easily into fine cavities of the active material coating layer 2, leading to a poor productivity of the electrode plate. When the viscosity thereof is excessively low, the heat-fusible material tends to spread over in the inside of the active material coating layer 2 in a direction along a plane parallel to the surface thereof by the capillary phenomenon, thus making it impossible to form a sharp pattern. It is preferable to limit an adhesive strength between the heat-fusible material and the collector 1 to a value as smaller as possible, in the light of workability in the peeling step.

When the coating layer 2 is impregnated with the above-mentioned solidifiable material as a liquid material, it is necessary for the solidifiable material to permeate through fine cavities in the coating layer 2 so as to reach the surface of the collector 1. If the solidifiable material is solidified before it reaches the surface of the collector 1, a portion to be removed of the coating layer 2 may be left non-peeled even when the coating layer 2 impregnated with the solidifiable material is peeled from the collector 1. In order to solve the above-mentioned problem, at least one of the collector 1 and the coating layer 2 may be heated to an appropriate temperature to delay the solidification of the solidifiable material, or the solidifiable material having a low viscosity may be selected to increase the permeating velocity of thereof, or the solidifiable material may be kept at a sufficiently high temperature to delay the solidification thereof.

The liquefied solidifiable material 3 is applied onto the prescribed portion of the coating layer 2 by means of a conventional coating apparatus such as a dispenser, a gravure roll, a die head and the like. In case where the heat-fusible material is used as a solidifiable material, there may be utilized a method of applying the solidifiable material in a molten state on the coating layer on the basis of the prescribed pattern, as well as any one of a method of arranging a solid body made of the solidifiable material the basis of the pattern on the coating layer 2 and heating the coating layer 2 to melt the solidifiable material which is in contact with the coating layer 2, a method of pressing the above-mentioned solid body made of the solidifiable material on the basis of the pattern on the heated coating layer 2 at a prescribed pressure, to melt the solidifiable material which is in contact with the coating layer 2, a method of moving a solid body made of the solidifiable material on the heated coating layer while pressing the above-mentioned solid body onto the heated coating layer at a prescribed pressure, to continuously form a pattern, and the like.

The impregnated portion having the prescribed pattern having an excellent measurement accuracy can be obtained by carrying out the above-described impregnation step.

(c) Solidification step

A porous sheet 25 is brought into contact with the portion 2a of the coating layer, which is impregnated with the solidifiable material on the basis of the prescribed pattern, to cause part of the solidifiable material in the inside or on the surface of the impregnated portion 2a to migrate into the porous sheet 25. The migration of the solidifiable material causes the formation of an impregnated portion 25a also in the portion of the porous sheet 25, which corresponds to the impregnated portion 2a. Then, the solidifiable material in the impregnated portion 2a and the solidifiable material in the porous sheet 25 solidifies in an integral form.

The portion of the coating layer 2 impregnated with the solidifiable material is normally stuck to the collector 1 in a smaller strength, and this portion can easily be peeled. With respect to a peeling means, tension may be imparted to the collector 1 to lift up the portion of the coating layer 2 impregnated with the solidiable material from the collector 1 so as to perform the peeling thereof, or it may be peeled from the collector 1 by means of a spatula, or it may be peeled with the use of an adhesive tape, or it may be peeled from the collector 1 by the blowing of air. In the light of the working efficiency, it is however effective to utilize the method which permits the peeling of the entire impregnated portions 2a by only one operation, rather than the method of applying tension to the collector 1, and the method in which the spatula or the air gun is used. The method in which the spatula or the air gun is used may cause the production of small flakes of the peeled portion.

On the contrary, since the entire impregnated portions 2a can be peeled only by one operation with the use of the porous sheet in the present invention, the working efficiency can remarkably be improved. Moreover, the process of the present invention causes no production of small flakes of the peeled portion, unlike the method in which the spatula or the air gun is used.

In the method of peeling the portion of the coating layer utilizing the solidifiable material, use of a certain kind of the solidifiable material may cause the occurrence of cracks in the coating layer which is obtained by impregnating the portion of the coating layer with the solidifiable material and solidifying same. Especially, the solidifiable material having a larger cohesion makes it easy to peel the portion of coating layer, whereas it tends to easily cause the occurrence of cracks on the coating layer. Such occurrence of cracks leads to some adverse effects. The first adverse effect is of a problem that the peeling of the coating layer with cracks may cause the production of marks of the cracks on the exposed surface of the substrate. The marks of the cracks are produced by leaving a small amount of coating layer non-peeled in the form of stripes along the portion having the cracks, thus meaning insufficient peeling of the impregnated portion of the coating layer on the basis of the pattern. It is possible to completely inhibit the formation of the coating layer having the cracks by repeating the applying step of the solidifiable material and the peeling step at least twice, however such a method leads to excessive degradation of productivity, and poor measurement accuracy of the pattern. The second adverse effect is that the occurrence of the cracks in the vicinity of the edge portion of the pattern easily tends to leave flakes of the coating layer non-peeled, which is obtained by impregnating the portion of the coating layer with the solidifiable material and solidifying same, on the edge portion of the pattern. Such a phenomenon means that the non-peeled portion has a blunt edge, leading to poor measurement accuracy of the pattern.

On the contrary, since the porous sheet 25 is placed on the impregnated portion 2a of the coating layer when the solidifiable material is in a liquid state in the present invention, cracks do not easily tend to occur on the portion to be peeled of the coating layer. Accordingly, marks of the cracks do not easily tend to occur on the exposed surface of the substrate, and there can be formed the non-peeled portion having a sharp edge on the basis of the pattern.

As a porous sheet 25, there may be used any one of polyester mesh, metallic mesh, cloth, paper and a nonwoven fabric cloth.

The thickness of the porous sheet 25 is preferably as small as possible, provided that the porous sheet 25 has a sufficient strength so that the porous sheet 25 can peeled together with the impregnated portion 2a without causing any problems in the subsequent peeling step. The thickness thereof is preferably up to 400 μm, more preferably within a range of from 40 to 120 μm. With a thickness of over 400 μm, the greater part of the molten solidifiable material existing in the impregnated portion 2a may migrate into the porous sheet 25 by the capillary phenomenon, leading to insufficient peeling of the impregnated portion 2a.

A diameter of fibers of the porous sheet 25 and a porosity thereof may have an effect on the formation of the pattern. The diameter of the fibers of the porous sheet 25 is preferably up to 150 μm, more preferably within a range of from 30 to 70 μm. With a diameter of fibers of the porous sheet 25 of larger than 150 μm, the adhesive strength (namely, the sticking strength) between the porous sheet 25 and the solidifiable material becomes low. The porosity of the porous sheet 25 is preferably kept as high as possible. In case of a mesh sheet such as a polyester mesh, a metallic mesh or the like, the porosity thereof is preferably kept at least 30%, more preferably within a range of from 50 to 80%. With a porosity of under 30%, much time is required for impregnation of the porous sheet 25 with the solidifiable material, leading to insufficient sticking of the porous sheet due to entanglement of air bubbles between the solidifiable material and the porous sheet 25, and to unfavorable expansion of the edge portion of the pattern by the capillary phenomenon. Here, the term "porosity" is a value expressed in a ratio of the total area of gap portions excluding the area occupied by the fibers to the area of the entire porous sheet 25, in a plane view thereof. The porosity of the mesh sheet may vary depending on the diameter of the fibers and the weaving method.

When the heat-fusible material is used as a solidifiable material, the impregnated portion 2a and the porous sheet 25 can integrally be bonded by permeating the molten solidifiable material into the cavities of the impregnated portion 2a, bringing, prior to the solidification of the solidifiable material, the porous sheet 25 into contact with the surface of the impregnated portion 2a of the coating layer to cause part of the solidifiable material to permeate into the porous sheet 25, and cooling and solidify same.

As another method, the impregnated portion 2a and the porous sheet 25 can integrally be bonded by permeating the molten solidifiable material into the cavities of the impregnated portion 2a, cooling and solidifying same, bringing the porous sheet 25 into contact with the surface of the impregnated portion 2a of the coating layer, heating the contact portion thereof to remelt the solidifiable material to cause part of the solidifiable material to permeate into the porous sheet 25, and cooling and solidify same again. Here, as a method of heating the contact portion of the porous sheet 25 and the surface of the impregnated portion 2a of the coating layer, there may be used any kind of conventional means such as a heat roll, a heating plate, a dryer, an infrared radiation, and the like. When the metallic mesh is used, heat radiation is performed from the metallic mesh itself through high-frequency induction heating. A heating element such as nichrome wire may be used as a composing material of the porous sheet 25.

As further another method, the impregnated portion 2a and the porous sheet 25 can integrally be bonded by permeating the molten solidifiable material into the cavities of the impregnated portion 2a, cooling and solidifying same, bringing the heated porous sheet 25 into contact with the surface of the impregnated portion 2a of the coating layer, to remelt the solidifiable material in the contact portion thereof to cause part of the solidifiable material to permeate into the porous sheet 25, and cooling and solidify same again. Here, the porous sheet may previously be heated by any kind of conventional means such as a heat roll, a heating plate, a dryer, an infrared radiation, and the like. When the metallic mesh is used, heat radiation may be previously performed from the metallic mesh itself through high-frequency induction heating. A heating element such as nichrome wire may be used as a composing material of the porous sheet 25, and the previous heating with the use of this heating element may be performed.

Since the impregnated portion 2a and the porous sheet 25 can integrally be bonded by any one of the above-described methods, it is possible to remove the entire impregnated portions by only one operation in the subsequent peeling step.

(d) Peeling step

Finally, the portion 2a impregnated with the solidifiable material is peeled together with the porous sheet 25 sticking thereon in the integral solidification state of the solidifiable material in the coating layer 2 and the solidifiable material in the porous sheet 25, to expose the surface of the collector 1 on the basis of the prescribed pattern to obtain the peeled portion 4.

When an attempt is made to peel the impregnated portion 2a from the collector 1 in the peeling step using the porous sheet 25 in a state that the porous sheet 25 is loosened, and more specifically, the surface of the impregnated portion 25a of the porous sheet 25 is not in parallel with the surface of the non-impregnated portion 25b thereof (in a bent or warped condition), the peeling may frequently be caused on the boundary between the impregnated portion 2a and the porous sheet 25, thus leaving the impregnated portion 2a non-peeled on the collector 1. On the contrary, when tension is applied to the porous sheet 25 as shown in FIGS. 18(a) and (b) to carry out the peeling step in a state of no occurrence of loosening of the porous sheet 25, the impregnated portion 2a can clearly be peeled without leaving it non-peeled on the collector 1.

When the peeling step is carried out in a state of application of tension to the porous sheet 25, it is preferable to carry out the peeling step by keeping the original sheet 27 for the electrode plate away from the porous sheet 25 with a peeling roll 26 as a diverging point as shown in FIG. 19. When the non-flexible sheet such as a plastic plate having a relatively high strength is used as the porous sheet 25, the peeling roll 26 is not required since the peeling step can be carried out without causing the loosening of the porous sheet 25 in the analogous condition to the above-mentioned case in which tension is applied to the porous sheet 25.

Figure 20:
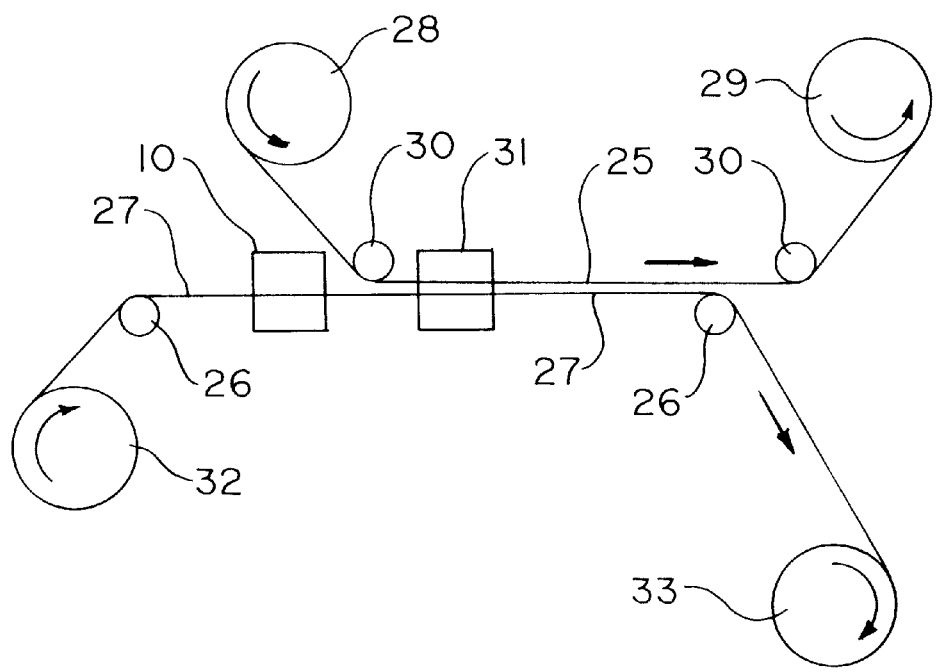
FIG. 20 is a schematic descriptive view illustrating further another example of a peeling step in the process of the present invention in the fourth group.

The porous sheet 25 may have a shape of postal card, or a strip-shape. FIG. 20 illustrates an exemplified use of the strip-shaped porous sheet 25. According to the process illustrated in FIG. 20, the porous sheet 25 is supplied from a feeding roll 28 while applying tension to the porous sheet 25, and the porous sheet 25 is supported by support rolls 30, 30, and then wound by a winding roll 29. The original strip-shaped sheet 27 for the electrode plate is supplied, on the other hand, by a feeding roll 32, supported by support rolls 26, 26, and then wound by a winding roll 33. The original sheet 27 for the electrode plate is continuously impregnated with the molten solidifiable material on the prescribed pattern by means of a coating apparatus 10. Then, the porous sheet 25 is placed on the original sheet 27 for the electrode plate, and then, the solidifiable material is cooled and solidified by means of a cooling and solidifying apparatus 31. Then, the porous sheet 25 is peeled from the original sheet 27 for the electrode plate, while keeping the original sheet 27 for the electrode plate away from the porous sheet 25 with a peeling roll 26 as a diverging point. Finally, a strip-shaped sheet having a plurality of electrode plates in each of which the surface of the collector is partially exposed on the basis of the prescribed pattern, is continuously wound by means of a winding roll 33. According to the process of the present invention as shown in FIG. 20, it is possible to continuously produce the strip-shaped sheet having a plurality of electrode plates.

Figure 21:
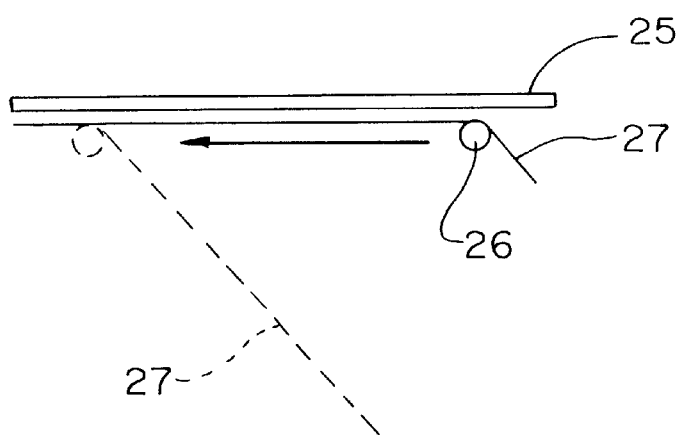
FIG. 21 is a schematic descriptive view illustrating further still another example of a peeling step in the process of the present invention in the fourth group.
Figure 22:
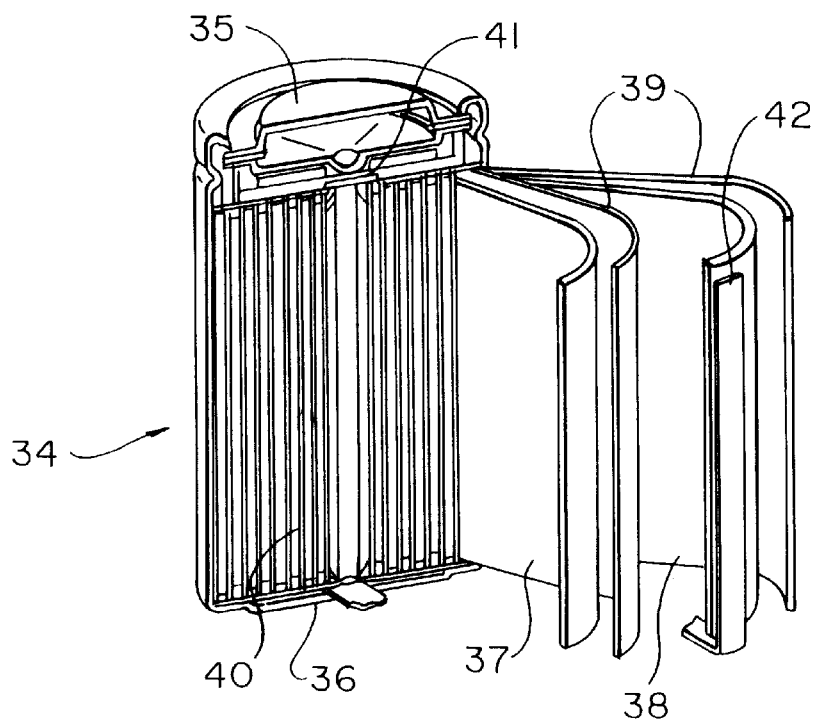
FIG. 22 is an exploded perspective view illustrating a cylindrical shape-lithium ion secondary battery as generally used.
Figure 23:
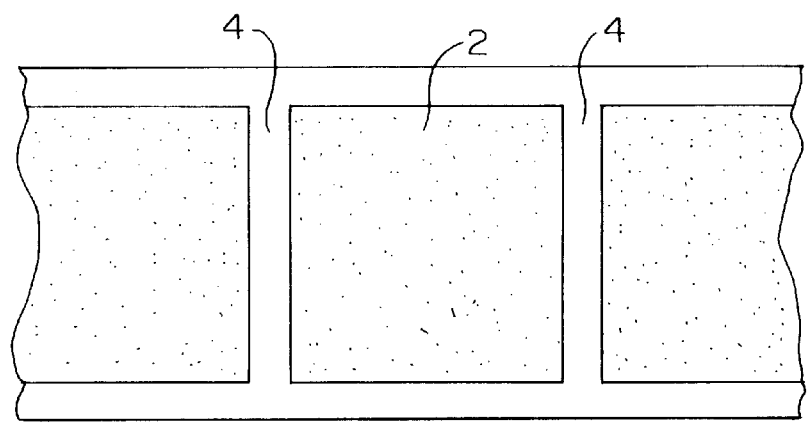
FIG. 23 is a plan view illustrating one example of an electrode plate of the present invention in the fourth group.

FIG. 21 illustrates the step of peeling the original sheet 27 for the electrode plate from the porous sheet 25 by moving horizontally the peeling roll 26 in a direction of an arrow as shown in FIG. 21, while applying tension to the porous sheet 25.

The porous sheet 25 may be used once and then thrown away, or may be reusable after washing or cleaning it.

It is possible to produce effectively the electrode plate for a secondary battery with a nonaqueous electrolyte having the non-coated portion on the basis of the prescribed pattern by carrying out the above-described steps (a) to (d) in this order. The non-coated portion of the thus produced electrode plate is excellent in measurement accuracy of the pattern, and in the non-coated portion therof, there is no production of powdery flakes from the edge portion of the pattern, and no existence of marks of cracks.

In case where the secondary battery is produced with the use of the electrode plate of the present invention, which has been prepared in the above-described manner, it is preferable to apply a heating treatment and a decompression treatment to the electrode plate prior to the assembling step of the secondary battery, in order to remove moisture in the coating layer of the electrode plate, which contains the active material.

When the secondary battery, for example, the lithium secondary battery is produced with the use of the above-described electrode plate, there is used a nonaqueous electrolyte which is obtained by dissolving lithium salts as solute into an organic solvent. In this stage, there may be used, as an organic solvent, cyclic esters, chain esters, cyclic ethers, chain ethers or the like. The cyclic esters may be exemplified by propylene carbonate, butylene carbonate, γ-buthyrolactone, vinylene carbonate, 2-methyl-γ-buthyrolactone, acetyl-γ-buthyrolactone and γ-valerolactone. The chain esters may be exemplified by dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, propionic acid alkyl ester, malonic acid dialkyl ester and acetic acid alkyl ester. The cyclic ethers may be exemplified by tetrahydrofuran, alkyltetrahydrofuran, dialkyltetrahydrofuran, alkoxytetrahydrofuran, dialkoxytetrahydrofuran, 1,3-dioxolan, alkyl-1,3-dioxolan and 1,4-dioxolan. The chain ethers may be exemplified by 1,2-dimethoxyethane, 1,2-diethoxyethane, diethyl ether, ethylene glycol dialkylether, diethylene glycol dialkylether, triethylene glycol dialkylether and tetraethylene glycol dialkylether.

As lithium salts as solute forming the nonaqueous electrolyte in cooperation with the above-mentioned organic solvent, there may be used inorganic lithium salt such as $LiClO_4$, $LiBF_4$, $LiPF_6$, $LiAsF_6$, $LiCl$, $LiBr$ or the like, or organic lithium salt such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$, $LiOSO_2C_7F_{15}$, or the like.

EXAMPLES

Now, the present invention will be described hereinbelow in more detail with reference to Experiment Examples in the present invention in the first to fourth groups and Comparative Examples.

Present Invention in First Group

Experiment Example No. 1-1

First, a coating composition for a positive electrode, containing active material for the positive electrode was prepared in the following manner. Materials for the coating composition for the positive electrode composed of $LiCoO_2$ powder of 40 wt. parts having a particle size of from 1 to 100 μm and an average particle size of 10 μm, graphite powder of 5.0 wt. parts as a conductive agent, polyvinylidene fluoride of 4 wt. parts as a binder (having the product name of "NEOFLON VDF, VP-850" manufactured by DAIKIN INDUSTRIES, CO. LTD.) and polyvinylidene fluoride of 20 wt. parts.

Of these materials, polyvinylidene fluoride was previously dissolved by polyvinylidene fluoride to prepare varnish. The other powdery materials were added to the thus prepared varnish, and these powdery materials and the varnish were stirred and mixed by means of a planetary mixer (manufactured by KODAIRA SEISAKUSHO CO. LTD.) for a period of time of 30 minutes, to prepare a coating composition in a form of slurry for the positive electrode containing the active material for the positive electrode.

With the use of the thus prepared coating composition for the positive electrode, the first coating step was carried out on a collector made of an aluminum foil having a thickness of 20 μm and a width of 300 mm by means of a die coater. Then, a drying step was carried out at a temperature of 140° C. for 2 minutes to form a coating layer on the aluminum foil, which included the active material for the positive electrode and had a thickness of 100 μm in a drying state. The resultant coating layer including the active material for the positive electrode was subjected to an aging treatment in a vacuum oven at a temperature of 80° C. for 48 hours to remove moisture in the coating layer, thereby preparing an electrode plate for the positive electrode.

Then, a coating composition for a negative electrode, containing active material for the negative electrode was prepared in the following manner. Materials for the coating composition for the negative electrode composed of graphite powder of 85 wt. parts, polyvinylidene fluoride of 15 wt. parts (having the product name of "NEOFLON VDF, VP-850" manufactured by DAIKIN INDUSTRIES, CO. LTD.) and polyvinylidene fluoride as a dispersing medium of 225 wt. parts. A coating composition in a form of slurry for the negative electrode was obtained with the use of these materials by means of the same dispersing machine in the same dispersing method as in the case of preparation of the coating composition for the positive electrode.

With the use of the thus prepared coating composition for the negative electrode, the first coating step was carried out on a collector made of a rolled copper foil having a thickness of 15 μm by means of a die coater. Then a drying step was carried out at a temperature of 140° C. for 2 minutes to form a coating layer on the copper foil, which included the active material for the negative electrode and had a thickness of 100 μm in a drying state. The resultant coating layer including the active material for the negative electrode was subjected to the same aging treatment to remove moisture in the coating layer, thereby preparing an electrode plate for the negative electrode.

The thus obtained electrode plates for the positive and negative electrodes were placed on a hot plate heated to a temperature of 90° C. Polypropylene (having the product name of "VISCOL 550P" manufactured by SANYO KASEI KOGYO CO. LTD.) which has been heated to a temperature of 250° C. to melt it, was applied on these electrode plates in a shape of strip having a width of 10 mm and a length of 200 mm by means of a dispenser. Then, the hot plate was removed, to solidify the polypropylene. The solidified polypropylene was easily peeled from the collector by applying tension to the collector to lift up the polypropylene, since it was hard and brittle. The collector had a non-coated portion on the basis of the prescribed pattern, which had a sharp edge and in which there was no production of powdery flakes of the coating layer.

Experiment Example No. 1-2

Electrode plates for the positive and negative electrodes were prepared under the same applying and drying conditions as in the Experiment Example No. 1-1. The thus obtained electrode plates for the positive and negative electrodes were placed on a hot plate heated to a temperature of 90° C. Polyethylene (having the product name of "SANWAX 161P" manufactured by SANYO KASEI KOGYO CO. LTD.) which has been heated to a temperature of 250° C. to melt it, was applied on these electrode plates in a shape of strip having a width of 10 mm and a length of 200 mm by means of a dispenser. Then, the hot plate was removed, to solidify the polyethylene. The solidified polyethylene was easily peeled, keeping its shape as applied, from the collector by pulling up the end of the solidified polyethylene, since it had a sufficient strength. The collector had a non-coated portion on the basis of the prescribed pattern, which had a sharp edge and in which there was no production of powdery flakes of the coating layer.

Experiment Example No. 1-3

Electrode plates for the positive and negative electrodes were prepared under the same applying and drying conditions as in the Experiment Example No. 1-1. The thus obtained electrode plates for the positive and negative electrodes were heated to a temperature of 70° C. by means of an infrared lamp. Wax (having the product name of "DIACARNA 30L" manufactured by MITSUBISHI KASEI KOGYO CO. LTD.) which has been heated to a temperature of 160° C. to melt it, was applied on these electrode plates in a shape of strip having a width of 10 mm and a length of 200 mm by means of a dispenser. Then, the infrared lamp was removed, to solidify the wax. The solidified wax was easily peeled from the collector by applying tension to the collector to lift up the wax, since it was hard and brittle. The collector had a non-coated portion on the basis of the prescribed pattern, which had a sharp edge and in which there was no production of powdery flakes of the coating layer.

Experiment Example No. 1-4

Electrode plates for the positive and negative electrodes were prepared under the same applying and drying conditions as in the Experiment Example No. 1-1. Then, a ribbon-shaped formed body having a width of 30 mm, a length of 200 mm and a thickness of 5 mm, and made of polyethylene (having the product name of "SANWAX 161P" manufactured by SANYO KASEI KOGYO CO.

LTD.) was placed on the surface of the coating layer of each of these electrode plates. A hot plate heated to a temperature of 250° C. was brought into contact with the back surface of the electrode plate for about one second, and then, the hot plate was removed therefrom. In this stage, part of polyethylene coming into contact with the coating layer was melted and permeated through the coating layer, and then solidified. The solidified polyethylene was easily peeled, keeping its shape as applied, from the collector by pulling up the end of the solidified polyethylene. The collector had a non-coated portion on the basis of the prescribed pattern, which had a sharp edge and in which there was no production of powdery flakes of the coating layer.

Experiment Example No. 1-5

Electrode plates for the positive and negative electrodes were prepared under the same applying and drying conditions as in the Experiment Example No. 1-1. The thus obtained electrode plates for the positive and negative electrodes were subjected to a pressing treatment at a pressure of 3,000 kgf/cm$^2$ by means of a roll press. These electrode plates having been subjected to the pressing treatment were placed on a hot plate heated to a temperature of 90° C. Polypropylene (having the product name of "VISCOL 550P" manufactured by SANYO KASEI KOGYO CO. LTD.) which has been heated to a temperature of 250° C. to melt it, was applied on these electrode plates in a shape of strip having a width of 10 mm and a length of 200 mm by means of a dispenser. Then, the hot plate was removed, to solidify the polypropylene. The solidified polypropylene was easily peeled from the collector by applying tension to the collector to lift up the polypropylene, since it was hard and brittle. The collector had a non-coated portion on the basis of the prescribed pattern, which had a sharp edge and in which there was no production of powdery flakes of the coating layer.

Experiment Example No. 1-6

Paste comprising frit of lead glass of 80 wt. %, ethylcellulose of 1 wt. %, buthylcarbinol acetate of 10 wt. % and α-terpineol of 9 wt. % and having viscosity of 80,000 cP was applied on the entire surface of a square glass plate as a substrate for a plasma-display panel, and then dried to prepare a coating layer. A square plastic sheet, each side of which was smaller by 1 mm than the side of the square glass plate, was placed on the thus prepared coating layer so that the peripheral portion of the coating layer was exposed in a width of 0.5 mm. Polypropylene wax (having the product name of "VISCOL 550P" manufactured by SANYO KASEI KOGYO CO. LTD.) which has been heated to a temperature of 250° C. to melt it, was applied on the thus exposed peripheral portion of the coating layer to impregnate this portion with polyethylene wax. After completion of the cooling of the impregnated portion of the coating layer, the impregnated portion was peeled from the glass plate, with the result that the peripheral portion having a width of 0.5 mm of the glass plate was clearly exposed. Then, the glass plate having the coating layer was sintered by a conventional method to form a primer layer.

Comparative Example No. 1-1

Electrode plates for the positive and negative electrodes were prepared under the same applying and drying conditions as in the Experiment Example No. 1-1. An adhesive tape having a width of 10 mm and a length of 200 mm was stuck onto each of the thus obtained electrode plates for the positive and negative electrodes, and then, the adhesive tape was peeled from each of the electrode plates to prepare a non-coated portion thereon. Much of portions to be removed of the coating layer were left non-peeled on the collector, and the non-coated portion had a blunt edge and in which there was observed the production of powdery flakes of the coating layer. It was also confirmed that such a peeling step with the use of the adhesive tape was not industrially applicable to an actual production.

Comparative Example No. 1-2

Electrode plates for the positive and negative electrodes were prepared under the same applying and drying conditions as in the Experiment Example No. 1-1. The coating layer of each of the electrode plates for the positive and negative electrodes was scraped off by means of a spatula to prepare a non-coated portion having a width of 10 mm and a length of 200 mm. Much of portions to be removed of the coating layer were left non-peeled on the collector, and it was hard to form the non-coated portion on the basis of the prescribed pattern. Scratches were observed on the surface of the collector.

Comparative Example No. 1-3

Electrode plates for the positive and negative electrodes were prepared under the same applying and drying conditions as in the Experiment Example No. 1-1. The thus obtained electrode plates for the positive and negative electrodes were kept at a room temperature. Then, polypropylene (having the product name of "VISCOL 550P" manufactured by SANYO KASEI KOGYO CO. LTD.) which had been heated to a temperature of 250° C. to melt it, was applied on these electrode plates in a shape of strip having a width of 10 mm and a length of 200 mm by means of a dispenser. Then, the polypropylene was completely solidified by an air cooling step. The applied polypropylene was solidified on the surface of the coating layer prior to the permeation thereof through the inside the coating layer. As a result, even when the polypropylene was removed, the portion to be removed of the coating layer was left non-peeled on the surface of the collector, thus making it impossible to form any non-coated portion.

Comparative Example No. 1-4

Electrode plates for the positive and negative electrodes were prepared under the same applying and drying conditions as in the Experiment Example No. 1-1. The thus obtained electrode plates for the positive and negative electrodes were placed on a hot plate heated to a temperature of 70° C. Wax (having the product name of "SP-0145" manufactured by NIPPON SEIRO CO. LTD.) which has been heated to a temperature of 160° C. to melt it, was applied on these electrode plates in a shape of strip having a width of 10 mm and a length of 200 mm by means of a dispenser. Then, the hot plate was removed, to solidify the wax. Since the wax has a low viscosity when the melting thereof, it spread over in the inside of the coating layer in a direction along a plane parallel to the surface thereof by the capillary phenomenon, thus making it impossible to form a sharp pattern.

Present Invention in Second Group

Experiment Example No. 2-1

A coating composition for a positive electrode, containing active material for the positive electrode was prepared in the following manner. Materials for the coating composition for the positive electrode composed of $LiCoO_2$ powder of 90 wt. parts having a particle size of from 1 to 100 μm and an average particle size of 10 μm, graphite powder of 5.0 wt. parts as a conductive agent, polyvinylidene fluoride of 4 wt. parts as a binder (having the product name of "NEOFLON VDF, VP-850" manufactured by DAIKIN INDUSTRIES, CO. LTD.) and N-methylpyrrolidone of 20 wt. parts. Of these materials, polyvinylidene fluoride was previously dissolved by polyvinylidene fluoride to prepare varnish. The other powdery materials were added to the thus prepared varnish, and these powdery materials and the varnish were stirred and mixed by means of a planetary mixer (manufactured by KODAIRA SEISAKUSHO CO. LTD.) for a period of time of 30 minutes, to prepare a coating composition in a form of slurry for the positive electrode containing the active material for the positive electrode. The thus prepared coating composition had viscosity of 39,000 cP.

The coating composition for the positive electrode containing the active material for the positive electrode was applied on an area having a width of 300 mm and a length of 500 mm of a collector made of an aluminum foil having a thickness of 20 μm, a width of 320 mm and a length of 600 mm with the use of a coating apparatus under applying conditions comprising an inside diameter of a nozzle of 0.92 mm and a pressure of 0.2 $kgf/cm^2$. The moving velocity of the nozzle was 30 mm/sec., and the forwarding pitch was 6 mm/min. during the applying step. The tip of the nozzle had a wide slit-shape, unlike the conventional needle-shape, thus permitting the application of the coating composition in a width of 30 mm by one operation.

Then, the applied coating composition was dried at a temperature of 80° C. to remove the solvent contained therein, thereby forming an active material coating layer. In order to make the surface of the coating layer smooth and uniform, a polyethylene terephthalate film was placed and pressed on the coating layer, and then this film was peeled therefrom. Then, the coating layer was dried in an oven heated to a temperature of 120° C. for two minutes. The coating layer had a thickness of 130 μm after the completion of the drying step.

Then, a non-woven fabric cloth (having the product name of "FC-406" manufactured by JAPAN VILENE CO. LTD.) having a thickness of 420 μm, a width of 310 mm, and a length of 550 mm was impregnated with polypropylene (having the product name of "VISCOL 550P" manufactured by SANYO KASEI KOGYO CO. LTD.) which had been heated to a temperature of 250° C. to melt it, thereby preparing a peeling sheet. The thus prepared peeling sheet had a thickness of 470 μm, and an amount of polypropylene with which the non-woven fabric cloth was impregnated, was 270 $g/cm^2$.

The peeling sheet was placed on the active material coating layer, and they were pressed to each other by means of a flat plate press having a width of 305 mm and a length of 25 mm. The pressing conditions comprised a pressure of 50 $kgf/cm^2$ and a pressing time of three seconds. The flat plate press comprised two flat pressing plates, one plate coming into contact with the surface of the electrode plate, which was opposite to the surface on which the active material layer has been formed, was kept at a temperature of 150° C., and the other plate was kept at a temperature of 25° C., which was equal to a room temperature. The distance between the two pressing plates was kept 125 μm during the pressing step. After completion of the heat pressing step, they were left for one minute as they were, and then, the peeling sheet was peeled from the collector having the active material layer. In this stage, a portion of the active material layer was transferred to the peeling sheet, thereby permitting the easy peeling of the portion thereof on the basis of the prescribed pattern. As a result, the collector had a non-coated portion on the basis of the prescribed pattern, which had a sharp edge and in which there was no production of powdery flakes of the coating layer.

Experiment Example No. 2-2

A coating composition for a negative electrode, containing active material for the negative electrode was prepared in the following manner. Materials for the coating composition for the negative electrode composed of graphite powder of 85 wt. parts, polyvinylidene fluoride of 15 wt. parts as a binder (having the product name of "NEOFLON VDF, VP-850" manufactured by DAIKIN INDUSTRIES, CO. LTD.) and N-methylpyrrolidone of 225 wt. parts. These powdery materials were dispersed in a dispersing machine at 8,000 rpm, to prepare a coating composition for the negative electrode containing the active material for the negative electrode. The thus prepared coating composition had viscosity of 32,500 cP.

An applying step of the above-described coating composition for the negative electrode, a solvent-removing step, a pressing step and a drying step which were the same as those in the Experimental Example 2-1, were applied to a collector made of a copper foil having a thickness of 14 μm, a width of 320 mm and a length of 600 mm to form an active material coating layer thereon. The active material coating layer had a thickness of 100 μm after the completion of the drying step.

A peeling sheet was prepared in the same manner as in the Experiment Example No. 2-1. The peeling sheet was placed on the active material coating layer, and they were pressed to each other by means of a flat plate press having a width of 305 mm and a length of 88 mm. The pressing conditions comprised a pressure of 125 $kgf/cm^2$ and a pressing time of three seconds. The flat plate press comprised two flat pressing plates, one plate coming into contact with the surface of the electrode plate, which was opposite to the surface on which the active material layer has been formed, was kept at a temperature of 140° C., and the other plate was kept at a temperature of 25° C., which was equal to a room temperature. The distance between the two pressing plates was kept 125 μm during the pressing step. After completion of the heat pressing step, they were left for one minute as they were, and then, the peeling sheet was peeled from the collector having the active material layer. In this stage, a portion of the active material layer was transferred to the peeling sheet, thereby permitting the easy peeling of the portion thereof on the basis of the prescribed pattern. As a result, the collector had a non-coated portion on the basis of the prescribed pattern, which had a sharp edge and in which there was no production of powdery flakes of the coating layer.

Experiment Example No. 2-3

A collector having an active material coating layer for the positive electrode and a peeling sheet were prepared in the same manner as in the Experiment Example No. 2-1. The peeling sheet was placed on the active material coating layer, and they were pressed to each other by means of a roll press having a width of 305 mm and a roll diameter of 200 mm. The pressing conditions comprised a linear pressure of 67 kgf/cm and a traveling velocity of 12.6 cm/min. The roll press comprised two pressing rolls, one roll coming into contact with the surface of the electrode plate, which was opposite to the surface on which the active material layer has been formed, was kept at a temperature of 175° C., and the other roll was kept at a temperature of 25° C., which was equal to a room temperature. The distance between the two pressing rolls was kept 150 μm during the pressing step. After completion of the heat pressing step, they were left for one minute as they were, and then, the peeling sheet was peeled from the collector having the active material layer. In this stage, a portion of the active material layer was transferred to the peeling sheet, thereby permitting the easy peeling of the portion thereof on the basis of the prescribed pattern. As a result, the collector had a non-coated portion on the basis of the prescribed pattern, which had a sharp edge and in which there was no production of powdery flakes of the coating layer.

Experiment Example No. 2-4

A collector having an active material coating layer for the negative electrode and a peeling sheet were prepared in the same manner as in the Experiment Example No. 2-2. The peeling sheet was placed on the active material coating layer, and they were pressed to each other by means of a roll press having a width of 305 mm and a roll diameter of 200 mm. The pressing conditions comprised a linear pressure of 100 kgf/cm and a traveling velocity of 12.6 cm/min. The roll press comprised two pressing rolls, one roll coming into contact with the surface of the electrode plate, which was opposite to the surface on which the active material layer has been formed, was kept at a temperature of 165° C., and the other roll was kept at a temperature of 25° C., which was equal to a room temperature. The distance between the two pressing rolls was kept 150 μm during the pressing step. After completion of the heat pressing step, they were left for one minute as they were, and then, the peeling sheet was peeled from the collector having the active material layer. In this stage, a portion of the active material layer was transferred to the peeling sheet, thereby permitting the easy peeling of the portion thereof on the basis of the prescribed pattern. As a result, the collector had a non-coated portion on the basis of the prescribed pattern, which had a sharp edge and in which there was no production of powdery flakes of the coating layer.

Experiment Example No. 2-5

A collector having an active material coating layer for the positive electrode, another collector having an active material coating layer for the negative electrode, and a peeling sheet were prepared in the same manner as in the Experiment Example Nos. 2-1 through 2-4, and the same heat pressing step and the same peeling step through the transfer action as therein were carried out, except that polyethylene (having the product name of "SANWAX 161P" manufactured by SANYO KASEI KOGYO CO. LTD.) was used as thermoplastic resin. As a result, the collector had a non-coated portion on the basis of the prescribed pattern, which had a sharp edge and in which there was no production of powdery flakes of the coating layer.

Experiment Example No. 2-6

A collector having an active material coating layer for the positive electrode, another collector having an active material coating layer for the negative electrode, and a peeling sheet were prepared in the same manner as in the Experiment Example Nos. 2-1 through 2-4, and the same heat pressing step and the same peeling step through the transfer action as therein were carried out, except that polyethylene (having the product name of "A-C392" manufactured by ALLIED SIGNAL CO. LTD.) was used as thermoplastic resin. As a result, the collector had a non-coated portion on the basis of the prescribed pattern, which had a sharp edge and in which there was no production of powdery flakes of the coating layer.

Experiment Example No. 2-7

A collector having an active material coating layer for the positive electrode, another collector having an active material coating layer for the negative electrode, and a peeling sheet were prepared in the same manner as in the Experiment Example Nos. 2-1 through 2-4, and the same heat pressing step and the same peeling step through the transfer action as therein were carried out, except that polyethylene (having the product name of "Hoechst-Wax PE190" manufactured by HOECHST INDUSTRY CO. LTD.) was used as thermoplastic resin. As a result, the collector had a non-coated portion on the basis of the prescribed pattern, which had a sharp edge and in which there was no production of powdery flakes of the coating layer.

Experiment Example No. 2-8

A collector having an active material coating layer for the positive electrode, another collector having an active material coating layer for the negative electrode, and a peeling sheet were prepared in the same manner as in the Experiment Example Nos. 2-1 through 2-4, and the same heat pressing step and the same peeling step through the transfer action as therein were carried out, except that polyethylene (having the product name of "Hoechst-Wax PE191" manufactured by HOECHST INDUSTRY CO. LTD.) was used as thermoplastic resin. As a result, the collector had a non-coated portion on the basis of the prescribed pattern, which had a sharp edge and in which there was no production of powdery flakes of the coating layer.

Experiment Example No. 2-9

A collector having an active material coating layer for the positive electrode, another collector having an active material coating layer for the negative electrode, and a peeling sheet were prepared in the same manner as in the Experiment Example Nos. 2-1 through 2-4, and the same heat pressing step and the same peeling step through the transfer action as therein were carried out, except that polyethylene (having the product name of "LUWAX OA3 Powder" manufactured by BASF JAPAN CO. LTD.) was used as thermoplastic resin. As a result, the collector had a non-coated portion on the basis of the prescribed pattern, which had a sharp edge and in which there was no production of powdery flakes of the coating layer.

Experiment Example No. 2-10

A collector having an active material coating layer for the positive electrode, another collector having an active material coating layer for the negative electrode, and a peeling sheet were prepared in the same manner as in the Experiment Example Nos. 2-1 through 2-4, and the same heat pressing step and the same peeling step through the transfer action as therein were carried out, except that a non-woven fabric cloth (having the product name of "JH-1007" manufactured by JAPAN VILENE CO. LTD.) was used. The thus prepared peeling sheet had a thickness of 210 μm, and an amount of polypropylene with which the non-woven fabric cloth was impregnated, was 130 g/cm². As a result, the collector had a non-coated portion on the basis of the prescribed pattern, which had a sharp edge and in which there was no production of powdery flakes of the coating layer.

Experiment Example No. 2-11

A collector having an active material coating layer for the positive electrode, another collector having an active material coating layer for the negative electrode, and a peeling sheet were prepared in the same manner as in the Experiment Example Nos. 2-1 through 2-4, and the same heat pressing step and the same peeling step through the transfer action as therein were carried out, except that a non-woven fabric cloth (having the product name of "WP-8085" manufactured by JAPAN VILENE CO. LTD.) was used. The thus prepared peeling sheet had a thickness of 670 μm, and an amount of polypropylene with which the non-woven fabric cloth was impregnated, was 496 g/cm². As a result, the collector had a non-coated portion on the basis of the prescribed pattern, which had a sharp edge and in which there was no production of powdery flakes of the coating layer.

Present Invention in Third Group

Experiment Example No. 3-1

First, a coating composition for a positive electrode, containing active material for the positive electrode was prepared in the following manner. Materials for the coating composition for the positive electrode composed of LiCoO₂ powder of 89 wt. parts having a particle size of from 1 to 100 μm and an average particle size of 10 μm, graphite powder of 8 wt. parts as a conductive agent, and polyvinylidene fluoride varnish of 33 wt. parts as a binder (having the product name of "KF#1100", 12% N-methyl-2-pyrrolidone solution manufactured by KUREHA CHEMICAL INDUSTRY, CO. LTD.). The varnish and the other powdery materials added thereto were stirred and mixed by means of a planetary mixer (manufactured by KODAIRA SEISAKUSHO CO. LTD.) for a period of time of 30 minutes, to prepare a coating composition in a form of slurry for the positive electrode containing the active material for the positive electrode.

With the use of the thus prepared coating composition for the positive electrode, the coating step was carried out on a collector as a substrate made of an aluminum foil having a thickness of 20 μm and a width of 300 mm by means of a die coater. Then, a drying step was carried out by passing the substrate applied with the coating composition through a drying oven having a length of 8 m having a plurality of different temperature zones of 80° C., 100° C., 130° C. and 140° C.) at a traveling velocity of 4 m/min, to form a coating layer on the substrate made of the aluminum foil, which included the active material for the positive electrode and had a thickness of 90 μm in a drying state. Further, the resultant coating layer including the active material for the positive electrode was subjected to an aging treatment in a vacuum oven at a temperature of 100° C. for 48 hours to remove moisture in the coating layer, thereby preparing an electrode plate for the positive electrode.

Then, a coating composition for a negative electrode, containing active material for the negative electrode was prepared in the following manner. Materials for the coating composition for the negative electrode composed of graphite powder of 85 wt. parts, polyvinylidene fluoride varnish of 125 wt. parts (having the product name of "KF#1100", 12% N-methyl-2-pyrrolidone solution manufactured by KUREHA CHEMICAL INDUSTRY, CO. LTD.), and N-methyl-2-pyrrolidone of 115 wt. parts as a dispersing medium. A coating composition in a form of slurry for the negative electrode was obtained with the use of these materials by means of the same dispersing machine in the same dispersing method as in the case of preparation of the coating composition for the positive electrode.

With the use of the thus prepared coating composition for the negative electrode, the coating step was carried out on a collector as as substrate made of a rolled copper foil having a thickness of 15 μm by means of a die coater. Then, a drying step was carried out by passing the substrate applied with the coating composition through a drying oven having a length of 8 m (having a plurality of different temperature zones of 80° C., 100° C., 130° C. and 140° C.) at a traveling velocity of 2 m/min, to form a coating layer on the substrate made of the copper foil, which included the active material for the negative electrode and had a thickness of 135 μm in a drying state. The resultant coating layer including the active material for the negative electrode was subjected to the same aging treatment to remove moisture in the coating layer, thereby preparing an electrode plate for the negative electrode.

The thus obtained electrode plates for the positive and negative electrodes were placed on a hot plate heated to a temperature of 190° C. A plate made of polypropylene (having the product name of "VISCOL 550P" manufactured by SANYO KASEI KOGYO CO. LTD.) and having a rectangular parallelepiped shape with dimensions of 10 cm×20 cm×3 cm was gently placed on the active material layer of the electrode plate. Then, they were pressed to each other at a pressing force of 5 kgf/cm² for three seconds to impregnate the active material layer with the polypropylene. Then, the hot plate was removed, to solidify the polypropylene in the impregnated portion of the coating layer. The solidified polypropylene was easily peeled from the collector with the portion of the active material layer being stuck to the polypropylene plate, which had been impregnated with the polypropylene, by removing the polypropylene plate from the electrode plate. The collector had a non-coated portion on the basis of the prescribed pattern, which had a sharp edge and in which there was no production of powdery flakes of the coating layer.

Experiment Example No. 3-2

Electrode plates for the positive and negative electrodes were prepared under the same applying and drying conditions as in the Experiment Example No. 3-1. However, the active material layer for the positive electrode had a thickness of 120 μm and the active material layer for the negative electrode had a thickness of 160 μm. There was carried out the same vacuum drying step as in the Experiment Example No. 3-1.

The thus obtained electrode plates for the positive and negative electrodes were placed on a hot plate heated to a temperature of 190° C. A plate made of polypropylene (having the product name of "VISCOL 550P" manufactured by SANYO KASEI KOGYO CO. LTD.) and having a rectangular parallelepiped shape with dimensions of 10 cm×20 cm×3 cm was gently placed on the active material layer of the electrode plate. Then, they were pressed to each other at a pressing force of 5 kgf/cm² for three seconds to impregnate the active material layer with the polypropylene.

Then, the hot plate was removed, to solidify the polypropylene in the impregnated portion of the coating layer. The solidified polypropylene was easily peeled from the collector with the portion of the active material layer being stuck to the polypropylene plate, which had been impregnated with the polypropylene, by removing the polypropylene plate from the electrode plate. The collector had a non-coated portion on the basis of the prescribed pattern, which had a sharp edge and in which there was no production of powdery flakes of the coating layer.

Experiment Example No. 3-3

Electrode plates for the positive and negative electrodes were prepared under the same applying and drying conditions as in the Experiment Example No. 3-1. The thus obtained electrode plates for the positive and negative electrodes were placed on a hot plate heated to a temperature of 190° C. A plate made of polypropylene (having the product name of "VISCOL 550P" manufactured by SANYO KASEI KOGYO CO. LTD.) and having a rectangular parallelepiped shape with dimensions of 10 cm×20 cm×3 cm was gently placed on the active material layer of the electrode plate. Then, they were pressed to each other at a pressing force of 5 kgf/cm$^2$ for three seconds to impregnate the active material layer with the polypropylene. Then, the hot plate was removed, to solidify the polypropylene in the impregnated portion of the coating layer. The solidified polypropylene was easily peeled from the collector by applying tension to the collector to lift up the polyethylene, since it was hard and brittle. The collector had a non-coated portion on the basis of the prescribed pattern, which had a sharp edge and in which there was no production of powdery flakes of the coating layer.

Experiment Example No. 3-4

Electrode plates for the positive and negative electrodes were prepared under the same applying and drying conditions as in the Experiment Example No. 3-1. The thus obtained electrode plates for the positive and negative electrodes were placed on a hot plate heated to a temperature of 190° C. A cylindrical block made of polypropylene (having the product name of "VISCOL 550P" manufactured by SANYO KASEI KOGYO CO. LTD.) and having a diameter of 1 cm and a length of 10 cm was gently placed on the active material layer of the electrode plate so that the end of the cylindrical block was brought into contact with the surface of the active material layer. The cylindrical block was moved along a straight line at a velocity of 60 cm/min., while applying a pressure of 5 kgf/cm$^2$ to the block. Then, the cylindrical polypropylene block and the hot plate were removed, to solidify the polypropylene in the impregnated portion of the coating layer. The solidified polypropylene was easily peeled from the collector by applying tension to the collector to lift up the polyethylene, since it was hard and brittle. The collector had a non-coated portion on the basis of the prescribed pattern, which had a sharp edge and in which there was no production of powdery flakes of the coating layer.

Experiment Example No. 3-5

Electrode plates for the positive and negative electrodes were prepared under the same applying and drying conditions as in the Experiment Example No. 3-1. The thus obtained electrode plates for the positive and negative electrodes were subjected to a pressing treatment at a pressure of 3,000 kgf/cm$^2$ by means of a roll press. A plate made of polypropylene (having the product name of "VISCOL 550P" manufactured by SANYO KASEI KOGYO CO. LTD.) and having a rectangular parallelepiped shape with dimensions of 10 cm×20 cm×3 cm was gently placed on the active material layer of the electrode plate. Then, they were pressed to each other at a pressing force of 5 kgf/cm$^2$ for three seconds to impregnate the active material layer with the polypropylene. Then, the hot plate was removed, to solidify the polypropylene in the impregnated portion of the coating layer. The solidified polypropylene was easily peeled from the collector with the portion of the active material layer being stuck to the polypropylene plate, which had been impregnated with the polypropylene, by removing the polypropylene plate from the electrode plate. The collector had a non-coated portion on the basis of the prescribed pattern, which had a sharp edge and in which there was no production of powdery flakes of the coating layer.

Comparative Example No. 3-1

Electrode plates for the positive and negative electrodes were prepared under the same applying and drying conditions as in the Experiment Example No. 3-1. An adhesive tape having a width of 10 mm and a length of 200 mm was stuck onto each of the thus obtained electrode plates for the positive and negative electrodes, and then, the adhesive tape was peeled from each of the electrode plates to prepare a non-coated portion thereon. As a result, much of portions to be removed of the coating layer were left non-peeled on the collector, and the non-coated portion had a blunt edge and in which there was observed the production of powdery flakes of the coating layer.

Comparative Example No. 3-2

Electrode plates for the positive and negative electrodes were prepared under the same applying and drying conditions as in the Experiment Example No. 3-1. The coating layer of each of the electrode plates for the positive and negative electrodes was scraped off by means of a spatula to prepare a non-coated portion having a width of 10 mm and a length of 200 mm. As a result, much of portions to be removed of the coating layer were left non-peeled on the collector, and it was hard to form the non-coated portion on the basis of the prescribed pattern. Scratches were observed on the surface of the collector.

Comparative Example No. 3-3

Electrode plates for the positive and negative electrodes were prepared under the same applying and drying conditions as in the Experiment Example No. 3-1. The thus obtained electrode plates for the positive and negative electrodes were kept at a room temperature. Then, polypropylene (having the product name of "VISCOL 550P" manufactured by SANYO KASEI KOGYO CO. LTD.) which had been heated to a temperature of 250° C. to melt it, was applied on these electrode plates in a shape of strip having a width of 10 mm and a length of 200 mm by means of a dispenser. Then, the polypropylene was completely solidified by an air cooling step. The applied polypropylene was solidified on the surface of the coating layer prior to the permeation thereof through the inside the coating layer. As a result, even when the polypropylene was removed, the portion to be removed of the coating layer was left non-peeled on the surface of the collector, thus making it impossible to form any non-coated portion.

Comparative Example No. 3-4

Electrode plates for the positive and negative electrodes were prepared under the same applying and drying conditions as in the Experiment Example No. 3-1. The thus obtained electrode plates for the positive and negative electrodes were placed on a hot plate heated to a temperature of 70° C. Wax (having the product name of "SP-0145" manufactured by NIPPON SEIRO CO. LTD.) which has been heated to a temperature of 160° C. to melt it, was applied on these electrode plates in a shape of strip having a width of 10 mm and a length of 200 mm by means of a dispenser. Then, the hot plate was removed, to solidify the wax. Since the wax has a low viscosity when the melting thereof, it spread over in the inside of the coating layer in a direction along a plane parallel to the surface thereof by the capillary phenomenon, thus making it impossible to form a sharp pattern.

Comparative Example No. 3-5

Electrode plates for the positive and negative electrodes were prepared under the same applying and drying conditions as in the Experiment Example No. 3-1. However, the active material layer for the positive electrode had a thickness of 120 µm and the active material layer for the negative electrode had a thickness of 160 µm. There was carried out the same vacuum drying step as in the Experiment Example No. 3-1. The thus obtained electrode plates for the positive and negative electrodes were placed on a hot plate heated to a temperature of 190° C. Then, polypropylene (having the product name of "VISCOL 550P" manufactured by SANYO KASEI KOGYO CO. LTD.) which has been heated to a temperature of 250° C. to melt it, was applied on these electrode plates in a shape of strip having a width of 10 mm and a length of 200 mm by means of a dispenser. They were left for 30 minutes as they were. Then, the hot plate was removed from the electrode plate, and the polypropylene was completely solidified by an air cooling step. The applied polypropylene was solidified on the surface of the coating layer prior to the permeation thereof through the inside the coating layer. As a result, even when the polypropylene was removed, the portion to be removed of the coating layer was left non-peeled on the surface of the collector, thus making it impossible to form any satisfactory non-coated portion.

Present Invention in Fourth Group

Experiment Example No. 4-1

(1) Electrode Plate for Positive Electrode

LiCoO$_2$ powder of 89 wt. parts as active material for the positive electrode, having a particle size of from 1 to 100 µm and an average particle size of 10 µm, graphite powder of 8 wt. parts as a conductive agent were added to polyvinylidene fluoride varnish of 33 wt. parts as a binder (having the product name of "KF#1100", 12% N-methyl-2-pyrrolidone solution manufactured by KUREHA CHEMICAL INDUSTRY, CO. LTD.). These materials were stirred and mixed by means of a planetary mixer (manufactured by KODAIRA SEISAKUSHO CO. LTD.) for a period of time of 30 minutes, to prepare a coating composition in a form of slurry for the positive electrode.

With the use of the thus prepared coating composition for the positive electrode, the coating step was carried out on a collector as a substrate made of an aluminum foil having a thickness of 20 µm and a width of 300 mm by means of a die coater. Then, a drying step was carried out by passing the substrate applied with the coating composition through a drying oven having a length of 8 m (having a plurality of different temperature zones of 80° C., 100° C., 130° C. and 140° C.) at a traveling velocity of 4 m/min, to form a coating layer on the substrate made of the aluminum foil, which had a thickness of 90 µm in a drying state. Further, the resultant coating layer including the active material for the positive electrode was subjected to an aging treatment in a vacuum oven at a temperature of 80° C. for 48 hours to remove moisture in the coating layer, thereby preparing an electrode plate for the positive electrode.

(2) Electrode Plate for Negative Electrode

Graphite powder of 85 wt. parts as active material for the negative electrode, polyvinylidene fluoride varnish of 125 wt. parts as a binder (having the product name of "KF#1100", 12% N-methyl-2-pyrrolidone solution manufactured by KUREHA CHEMICAL INDUSTRY, CO. LTD.) and N-methyl-2-pyrrolidone were stirred and mixed, as in the above-described production of the positive electrode, by means of a planetary mixer (manufactured by KODAIRA SEISAKUSHO CO. LTD.) for a period of time of 30 minutes, to prepare a coating composition in a form of slurry for the negative electrode.

With the use of the thus prepared coating composition for the negative electrode, the coating step was carried out on a collector as a substrate made of a rolled copper foil having a thickness of 15 µm and a width of 300 mm by means of a die coater. Then, a drying step was carried out by passing the substrate applied with the coating composition through a drying oven having a length of 8 m (having a plurality of different temperature zones of 80° C., 100° C., 130° C. and 140° C.) at a traveling velocity of 2 m/min, to form a coating layer on the substrate made of the aluminum foil, which had a thickness of 135 µm in a drying state. Further, the resultant coating layer including the active material for the negative electrode was subjected to an aging treatment in a vacuum oven at a temperature of 80° C. for 48 hours to remove moisture in the coating layer, thereby preparing an electrode plate for the negative electrode.

(3) Formation of Pattern

The thus obtained electrode plates for the positive and negative electrodes were placed on a hot plate heated to a temperature of 190° C. Polypropylene wax (having the product name of "VISCOL 550P" manufactured by SANYO KASEI KOGYO CO. LTD.) which had been heated to a temperature of 250° C. to melt it, was applied on these electrode plates in a shape of strip having a width of 100 mm, a length of 200 mm and a thickness of 0.6 mm by means of a hot-melting gun. Then, a polyester mesh sheet (having the product name of "TNO70S" manufactured by NIPPON TOKUSHU ORIMONO CO. LTD; mesh size: 70 mesh, a fiber diameter: 71 µm) was brought into contact with the surface of the applied molten wax, while applying tension to the mesh sheet, to cause the wax to permeate almost uniformly through the mesh sheet. Then the hot plate was removed to solidify the wax.

The solidified wax was supported in the mesh sheet without the production of large cracks on the wax. The solidified wax was easily peeled together with the portion of the coating layer, through which the wax has been permeated, on the basis of the prescribed pattern, by removing the mesh sheet from the electrode plate The thus peeled wax and the wax impregnated-portion of the coating layer were stuck on the mesh sheet, keeping the prescribed pattern formed on the mesh sheet. The collector had a non-coated portion on the basis of the prescribed pattern, which had a sharp edge and in which there was no production of powdery flakes of the coating layer.

Experiment Example No. 4-2

Electrode plates for the positive and negative electrodes were prepared as in the same manner as the Experiment Example No. 4-1. The thus obtained electrode plates for the positive and negative electrodes were placed on a hot plate heated to a temperature of 190° C. A plate made of polypropylene wax (having the product name of "VISCOL 550P" manufactured by SANYO KASEI KOGYO CO. LTD.) and having a rectangular parallelepiped shape with dimensions of 10 cm×20 cm×3 cm was gently placed on the active material layer of the electrode plate. Then, they were pressed to each other at a pressing force of 5 kgf/cm² for three seconds. Then, the polypropylene plate was removed, and a polyester mesh sheet (having the product name of "TNO70S" manufactured by NIPPON TOKUSHU ORIMONO CO. LTD; mesh size: 70 mesh, a fiber diameter: 71 $\mu$m) was brought into contact with the surface of the applied molten wax existing on the coating layer for the electrode plate, while applying tension to the mesh sheet, to cause the wax to permeate almost uniformly through the mesh sheet. Then the hot plate was removed to solidify the wax.

The solidified wax was supported in the mesh sheet without the production of large cracks on the wax. The solidified wax was easily peeled together with the portion of the coating layer, through which the wax has been permeated, on the basis of the prescribed pattern, by removing the mesh sheet from the electrode plate The thus peeled wax and the wax impregnated-portion of the coating layer were stuck on the mesh sheet, keeping the prescribed pattern formed on the mesh sheet. The collector had a non-coated portion on the basis of the prescribed pattern, which had a sharp edge and in which there was no production of powdery flakes of the coating layer.

Experiment Example No. 4-3

Electrode plates for the positive and negative electrodes were prepared as in the same manner as the Experiment Example No. 4-1. The thus obtained electrode plates for the positive and negative electrodes were placed on a hot plate heated to a temperature of 190° C. Polypropylene wax (having the product name of "VISCOL 550P" manufactured by SANYO KASEI KOGYO CO. LTD.) which had been heated to a temperature of 250° C. to melt it, was applied on these electrode plates in a shape of strip having a width of 100 mm, a length of 200 mm and a thickness of 0.6 mm by means of a hot-melting gun. Then, a stainless steel mesh sheet having the mesh size of 80 mesh and a fiber diameter of 54 $\mu$m was brought into contact with the surface of the applied molten wax, while applying tension to the mesh sheet, to cause the wax to permeate almost uniformly through the mesh sheet. Then the hot plate was removed to solidify the wax.

The solidified wax was supported in the mesh sheet without the production of large cracks on the wax. The solidified wax was easily peeled together with the portion of the coating layer, through which the wax has been permeated, on the basis of the prescribed pattern, by removing the mesh sheet from the electrode plate The thus peeled wax and the wax impregnated-portion of the coating layer were stuck on the mesh sheet, keeping the prescribed pattern formed on the mesh sheet. The collector had a non-coated portion on the basis of the prescribed pattern, which had a sharp edge and in which there was no production of powdery flakes of the coating layer.

Experiment Example No. 4-4

Electrode plates for the positive and negative electrodes were prepared as in the same manner as the Experiment Example No. 4-1. The thus obtained electrode plates for the positive and negative electrodes were placed on a hot plate heated to a temperature of 190° C. Polypropylene wax (having the product name of "VISCOL 550P" manufactured by SANYO KASEI KOGYO CO. LTD.) which had been heated to a temperature of 250° C. to melt it, was applied on these electrode plates in a shape of strip having a width of 100 mm, a length of 200 mm and a thickness of 0.6 mm by means of a hot-melting gun. Then, a non-woven fabric cloth (having the product name of "KH-3002K" manufactured by JAPAN VILENE CO. LTD.) was brought into contact with the surface of the applied molten wax, while applying tension to the non-woven fabric cloth, to cause the wax to permeate almost uniformly through the non-woven fabric cloth. Then, the hot plate was removed to solidify the wax.

The solidified wax was supported in the mesh sheet without the production of large cracks on the wax. The solidified wax was easily peeled together with the portion of the coating layer, through which the wax has been permeated, on the basis of the prescribed pattern, by removing the mesh sheet from the electrode plate The thus peeled wax and the wax impregnated-portion of the coating layer were stuck on the mesh sheet, keeping the prescribed pattern formed on the mesh sheet. The collector had a non-coated portion on the basis of the prescribed pattern, which had a sharp edge and in which there was no production of powdery flakes of the coating layer.

Experiment Example No. 4-5

Electrode plates for the positive and negative electrodes were prepared as in the same manner as the Experiment Example No. 4-1. The thus obtained electrode plates for the positive and negative electrodes were placed on a hot plate heated to a temperature of 190° C. Polypropylene wax (having the product name of "VISCOL 550P" manufactured by SANYO KASEI KOGYO CO. LTD.) which had been heated to a temperature of 250° C. to melt it, was applied on these electrode plates in a shape of strip having a width of 100 mm, a length of 200 mm and a thickness of 0.6 mm by means of a hot-melting gun. Then, they were cooled to a temperature of 100° C. to solidify the polypropylene wax. Then, a stainless steel mesh sheet having the mesh size of 80 mesh and a fiber diameter of 54 $\mu$m was brought into contact with the surface of the applied wax, while applying tension to the mesh sheet. A heating plate which has been heated to a temperature of 190° C. was gently placed on the mesh sheet for three seconds to remelt a portion of the wax, which was in contact with the mesh sheet so that the mesh sheet was embedded into the wax. Finally, the remelted wax was cooled to solidify.

The solidified wax was supported in the mesh sheet. The solidified wax was easily peeled together with the portion of the coating layer, through which the wax has been permeated, on the basis of the prescribed pattern, by removing the mesh sheet from the electrode plate The thus peeled wax and the wax impregnated-portion of the coating layer were stuck on the mesh sheet, keeping the prescribed pattern formed on the mesh sheet. The collector had a non-coated portion on the basis of the prescribed pattern, which had a sharp edge and in which there was no production of powdery flakes of the coating layer.

Experiment Example No. 4-6

Electrode plates for the positive and negative electrodes were prepared as in the same manner as the Experiment Example No. 4-1. The thus obtained electrode plates for the positive and negative electrodes were placed on a hot plate heated to a temperature of 190° C. Polypropylene wax (having the product name of "VISCOL 550P" manufactured by SANYO KASEI KOGYO CO. LTD.) which had been heated to a temperature of 250° C. to melt it, was applied on these electrode plates in a shape of strip having a width of 100 mm, a length of 200 mm and a thickness of 0.6 mm by means of a hot-melting gun. Then, they were cooled to a temperature of 100° C. to solidify the polypropylene wax. Then, a stainless steel mesh sheet having the mesh size of 80 mesh and a fiber diameter of 54 μm, which has previously been heated to a temperature of 190° C. was brought into contact with the surface of the applied wax, while applying tension to the mesh sheet, to remelt a portion of the wax, which was in contact with the mesh sheet so that the mesh sheet was embedded into the wax. Finally, the remelted wax was cooled to solidify.

The solidified wax was supported in the mesh sheet. The solidified wax was easily peeled together with the portion of the coating layer, through which the wax has been permeated, on the basis of the prescribed pattern, by removing the mesh sheet from the electrode plate The thus peeled wax and the wax impregnated-portion of the coating layer were stuck on the mesh sheet, keeping the prescribed pattern formed on the mesh sheet. The collector had a non-coated portion on the basis of the prescribed pattern, which had a sharp edge and in which there was no production of powdery flakes of the coating layer.

Experiment Example No. 4-7

Electrode plates for the positive and negative electrodes were prepared as in the same manner as the Experiment Example No. 4-1. The thus obtained electrode plates for the positive and negative electrodes were placed on a hot plate heated to a temperature of 190° C. Polypropylene wax (having the product name of "VISCOL 550P" manufactured by SANYO KASEI KOGYO CO. LTD.) which had been heated to a temperature of 250° C. to melt it, was applied on these electrode plates in a shape of strip having a width of 100 mm, a length of 200 mm and a thickness of 0.6 mm by means of a hot-melting gun. Then, a polyester mesh sheet (having the product name of "TNO40T" manufactured by NIPPON TOKUSHU ORIMONO CO. LTD; mesh size: 40 mesh, a fiber diameter: 200 μm) was brought into contact with the surface of the applied molten wax existing on the coating layer for the electrode plate, while applying tension to the mesh sheet, to cause the wax to permeate almost uniformly through the mesh sheet. Then the hot plate was removed to solidify the wax.

The solidified wax was supported in the mesh sheet without the production of large cracks on the wax. Although a small piece of the coating layer, impregnated with the wax was left non-peeled on the surface of the collector when the mesh sheet was removed from the electrode plate, such a small piece was easily peeled by a spatula. There was no existence of marks of cracks on the exposed surface of the collector.

Experiment Example No. 4-8

Electrode plates for the positive and negative electrodes were prepared as in the same manner as the Experiment Example No. 4-1. The thus obtained electrode plates for the positive and negative electrodes were placed on a hot plate heated to a temperature of 190° C. Polypropylene wax (having the product name of "VISCOL 550P" manufactured by SANYO KASEI KOGYO CO. LTD.) which had been heated to a temperature of 250° C. to melt it, was applied on these electrode plates in a shape of strip having a width of 100 mm, a length of 200 mm and a thickness of 0.6 mm by means of a hot-melting gun. Then, a polyester mesh sheet (having the product name of "TNO390T" manufactured by NIPPON TOKUSHU ORIMONO CO. LTD; mesh size: 390 mesh, a fiber diameter: 34 μm, porosity: 23%) was brought into contact with the surface of the applied molten wax existing on the coating layer for the electrode plate, while applying tension to the mesh sheet, to cause the wax to permeate almost uniformly through the mesh sheet. Then the hot plate was removed to solidify the wax.

The solidified wax was supported in the mesh sheet without the production of large cracks on the wax. The solidified wax was easily peeled together with the portion of the coating layer, through which the wax has been permeated, on the basis of the prescribed pattern, by removing the mesh sheet from the electrode plate. There was no existence of marks of cracks on the exposed surface of the collector. However, ten-odd seconds were required for disappearance of bubbles between the mesh sheet and the coating layer, and there was observed the spreading of the molten wax in a small amount over the boundary between the mesh sheet and the coating layer, leading to a blunt edge portion at a restricted area of the coating layer.

Experiment Example No. 4-9

Electrode plates for the positive and negative electrodes were prepared as in the same manner as the Experiment Example No. 4-1. The thus obtained electrode plates for the positive and negative electrodes were placed on a hot plate heated to a temperature of 190° C. Polypropylene wax (having the product name of "VISCOL 550P" manufactured by SANYO KASEI KOGYO CO. LTD.) which had been heated to a temperature of 250° C. to melt it, was applied on these electrode plates in a shape of strip having a width of 100 mm, a length of 200 mm and a thickness of 0.6 mm by means of a hot-melting gun. Then, a non-woven fabric cloth (having the product name of "FC-406" manufactured by JAPAN VILENE CO. LTD., having a thickness of 420 μm) was brought into contact with the surface of the applied molten wax existing on the coating layer for the electrode plate, while applying tension to the non-woven fabric cloth, to cause the wax to permeate almost uniformly through the non-woven fabric cloth. Then the hot plate was removed to solidify the wax.

The solidified wax was supported in the non-woven fabric cloth without the production of large cracks on the wax. Although a small piece of the coating layer, impregnated with the wax was left non-peeled on the surface of the collector due to a relatively small amount of wax permeating through the coating layer, when the mesh sheet was removed from the electrode plate, such a small piece was easily peeled by a spatula. There was no existence of marks of cracks on the exposed surface of the collector.

Comparative Example No. 4-1

Electrode plates for the positive and negative electrodes were prepared as in the same manner as the Experiment Example No. 4-1. An adhesive tape having a width of 10 mm and a length of 200 mm was stuck onto each of the thus obtained electrode plates for the positive and negative electrodes, and then, the adhesive tape was peeled from each of the electrode plates to prepare a non-coated portion thereon. As a result, much of portions to be removed of the coating layer were left non-peeled on the collector, and the non-coated portion had a blunt edge and in which there was observed the production of powdery flakes of the coating layer.

Comparative Example No. 4-2

Electrode plates for the positive and negative electrodes were prepared as in the same manner as the Experiment Example No. 4-1. The coating layer of each of the electrode plates for the positive and negative electrodes was scraped off by means of a spatula to prepare a non-coated portion having a width of 10 mm and a length of 200 mm. As a result, much of portions to be removed of the coating layer were left non-peeled on the collector, and it was hard to form the non-coated portion on the basis of the prescribed pattern. Scratches were observed on the surface of the collector.

Comparative Example No. 4-3

Electrode plates for the positive and negative electrodes were prepared as in the same manner as the Experiment Example No. 4-1. The thus obtained electrode plates for the positive and negative electrodes were placed on a hot plate heated to a temperature of 190° C. Then, polypropylene wax (having the product name of "VISCOL 550P" manufactured by SANYO KASEI KOGYO CO. LTD.) which had been heated to a temperature of 250° C. to melt it, was applied on these electrode plates in a shape of strip having a width of 10 mm, a length of 200 mm and a thickness of 0.6 mm by means of a hot-melting gun. Then, the polypropylene wax was cooled to a room temperature by an air cooling step to solidify it.

There occurred large cracks on the polypropylene wax during solidification thereof, leading to the production of numerous pieces of the solidified wax. After removing these numerous pieces of the solidified wax, there was existence of marks of cracks on the exposed surface of the collector.

As is clear from the foregoing, according to the Experiment Examples Nos. 4-1 through 4-6, very excellent results were provided. According to the Experiment Examples Nos. 4-7 through 4-9, there were provided slightly poorer results than those in the Experiment Examples Nos. 4-1 through 4-6. Reasons therefor were presumed that factors of the porous sheet, such as porosity, mesh number, a diameter of the fiber and a thickness were not controlled in optimum conditions.

On the contrary, according to the Comparative Examples Nos. 4-1 through 4-3, any favorable results were not obtained. Especially, in the Comparative Example No. 4-3, even when the coating layer of the electrode plate was impregnated with polypropylene wax, there was observed marks of cracks of the wax on the exposed surface of the collector, due to no use of the porous sheet.

According to the present invention in the first group, it is possible to keep the thickness of the coating layer uniform and to keep a prescribed pattern sharp.

According to the present invention in the second group, it is possible to precisely form an active material layer on a collector on the basis of the prescribed pattern by heat-pressing a peeling sheet which is obtained by impregnating a porous sheet with thermoplastic resin, to the collector with the active material.

According to the present invention in the third group, it is possible to form precisely and easily form a non-coated portion of an active material layer on a surface of the collector on the basis of the prescribed pattern without the production of powdery flakes of the active material layer, in the light of the technical concept that, when a molten thermoplastic resin (plastic or wax) is permeated through fine numerous cavities existing in the active material layer, and then cooled, the thermoplastic resin solidifies to surround the active material layer, with the result that a region of the active material layer impregnated with the thermoplastic resin can easily be separated from the other non-impregnated region of the active material layer.

According to the present invention in the third group, it is possible to form efficiently a non-coated portion of an active material layer on the basis of the prescribed pattern for a short period of time, since the pattern forming in the non-coated portion thereof can be performed by bonding a part of the coating layer formed on a substrate or a collector with a porous sheet in an integral state by liquid material (i.e., solidifiable material) having a larger cohesion after solidification thereof than that of the coating layer, and then peeling the porous sheet from the substrate or the collector on which the coating layer is formed. According to such a process, it is possible to form the excellent pattern in measurement accuracy without the production of powdery flakes of the coating layer on the edge of the non-peeled portion of the coating layer, since no mechanical means is required. The utilization of this pattern forming process permits the production of an electrode plate having a prescribed pattern for a secondary battery with a nonaqueous electrolyte, which is excellent in measurement accuracy and reliability, has no mark of cracks on the substrate or the collector, and causes no production of powdery flakes of the coating layer on the edge of the non-peeled portion formed on the basis of the prescribed pattern. The use of a repeatable material in melting and solidification actions as the liquid material permits modification of the essential steps of the process of the present invention in various ways, and as a result, the process of the present invention is applicable not only a continuous production line, but also a non-continuous production line.

What is claimed is:

1. A process for producing an electrode plate for a secondary battery with a nonaqueous electrolyte, which comprises the steps of:

applying an electrode forming composition comprising active material and a binder on a collector, and drying same to form an active material layer on the collector;

impregnating, based on a prescribed pattern, said active material layer with liquid material having a larger cohesion after solidification thereof than that of said active material;

solidifying said liquid material to form a solidified material; and peeling a portion of said active material layer, which has been impregnated with said solidified material, to expose partially a surface of said collector based on said prescribed pattern.

2. A process as claimed in claim 1, wherein:

said liquid material comprises material which is solid at a room temperature, and can be liquefied by heat.

3. A process as claimed in claim 2, wherein:

said material which can be liquefied by heat comprises at least one of thermoplastic resin, organic or inorganic wax and a low melting point-metal.

4. A process as claimed in claim 2, wherein:

said material which can be liquefied by heat has viscosity of from 10 to 50,000 cP when melted.

5. A process as claimed in claim 2, wherein:

said material which can be liquefied by heat has a melting point of from 20° C. to 250° C.

6. A process as claimed in claim 1, wherein:

said liquid material comprises material which can be solidified by chemical reaction.

7. A process as claimed in claim 6, wherein:
said liquid material comprises at least one of polymerization material and cross-linking material.

8. A process as claimed in claim 1, wherein:
said substrate is a collector for a lithium battery.

9. A process as claimed in claim 8, wherein:
said binder comprises fluororesin.

10. A process as claimed in claim 1, wherein:
said liquid material comprises thermoplastic resin;
said step of impregnating the active material layer with the liquid material comprises impregnating a portion of the active material layer to be removed with the thermoplastic resin by the use of heat;
said step of solidifying the liquid material comprises cooling said thermoplastic resin; and
said step of peeling the active material layer comprises removing said thermoplastic resin together with the portion of the active material to be removed.

11. A process as claimed in claim 10, wherein:
said step impregnating the portion of the active material layer to be removed with the thermoplastic resin comprises heat-pressing a peeling sheet impregnated with said thermoplastic resin onto the portion of the active material layer to be removed; and
said step of removing the thermoplastic resin together with the portion of the active material layer to be removed comprises peeling said peeling sheet from said active material layer to remove said portion of the active material layer to be removed in a heat heat pressed region together with the peeling sheet.

12. A process as claimed in claim 11, wherein:
said peeling sheet comprises a porous sheet.

13. A process as claimed in claim 11, wherein:
said thermoplastic resin has a melting point of from 100° C. to 250° C.

14. A process as claimed in claim 11, wherein:
said thermoplastic resin has viscosity of from 100 to 50,000 cP when melted.

15. A process as claimed in claim 11, wherein:
said peeling sheet comprises a nonwoven fabric cloth.

16. A process as claimed in claim 11, wherein:
heating in the heat-pressing of said peeling sheet is conducted from a side of the collector.

17. A process as claimed in claim 10, wherein:
said step of impregnating the portion of the active material layer to be removed with the thermoplastic resin comprises heating said active material layer and then bringing a formed body which is made of said thermoplastic resin and is solid at a room temperature into contact with said portion of the active material layer to be removed.

18. A process as claimed in claim 17 wherein:
said formed body made of the thermoplastic resin has substantially the same shape as that of the portion of the active material layer to be removed.

19. A process as claimed in claim 17, wherein:
the active material layer is continuously impregnated with said thermoplastic resin while pressing said formed body made of the thermoplastic resin on the heated surface of the active material layer.

20. A process as claimed in claim 17, wherein:
said thermoplastic resin has a melting point of from 20° C. to 250° C.

21. A process as claimed in claim 17, wherein:
said thermoplastic resin has viscosity of from 100 to 50,000 cP when melted.

22. A process as claimed in claim 17, wherein:
said heating of the active material layer is conducted from a side of the collector.

23. A process as claimed in claim 1, wherein:
a step of bringing a porous sheet into contact with the active material layer to cause a part of said liquid material existing in said active material layer and/or existing on the surface thereof to migrate into said porous sheet is carried out between said step of impregnating the active material layer with the liquid material and said step of solidifying the liquid material;
said step of solidifying the liquid material comprises integrally solidifying the liquid material remaining in said active material layer and the liquid material caused to migrate into said porous sheet; and
said step of peeling the portion of the active material layer comprises peeling the portion of the coating layer, which has been impregnated with the liquid material, together with said porous sheet in the integral solidification condition of the liquid material in the active material layer and the liquid material in the porous sheet, to expose partially the surface of the substrate based on the prescribed pattern.

24. A process as claimed in claim 23, wherein:
the portion of the coating layer, which has been impregnated with the liquid material is peeled together with said porous sheet by peeling the porous sheet from the collector while imparting tension to said porous sheet not so as to be loosened, in said step of partially exposing the surface of the collector based on the prescribed pattern.

25. A process as claimed in claim 23, wherein:
said liquid material comprises material which is solid at a room temperature, and can be liquefied by heat.

26. A process as claimed in claim 25, wherein:
said material which can be liquefied by heat comprises at least one of thermoplastic resin, organic or inorganic wax and a low melting point-metal.

27. A process as claimed in claim 26, wherein:
said thermoplastic resin is at least one thermoplastic resin selected from the group consisting of ethylene homopolymer, propylene homopolymer, ethylene copolymer and propylene copolymer.

28. A process as claimed in claim 25, wherein:
said material which is solid at a room temperature, and can be liquefied by heat has a melting point of from 20° C. to 250° C.

29. A process as claimed in claim 25, wherein:
said material which is solid at a room temperature, and can be liquefied by heat has viscosity of from 10 to 50,000 cP when melted.

30. A process as claimed in claim 23, wherein:
said porous sheet comprises any one of polyester mesh, metallic mesh, cloth, paper and a nonwoven fabric cloth.

31. A process as claimed in claim 1, wherein:
a step of bringing a porous sheet into contact with the active material layer to cause a part of said liquid material existing in said active material layer and/or existing on the surface thereof to migrate into said porous sheet is carried out between said step of impregnating the active material layer with the liquid material and said step of solidifying the liquid material;

said step of solidifying the liquid material comprises integrally solidifying the liquid material remaining in said active material layer and the liquid material caused to migrate into said porous sheet by cooling same; and said step of peeling the portion of the active material layer comprises peeling the portion of the coating layer, which has been impregnated with the liquid material, together with said porous sheet in the integral solidification condition of the liquid material in the active material layer and the liquid material in the porous sheet, to expose partially the surface of the collector based on the prescribed pattern.

32. A process as claimed in claim 1, wherein:

a step of cooling the liquid material to solidify same, a step of bringing a porous sheet into contact with the active material layer, and a step of heating contact portions of the active material layer and the porous sheet to remelt a part of the solidified liquid material so as to cause the remelted liquid material to migrate into the porous sheet are conducted in this order between said step of impregnating the active material layer with the liquid material and said step of solidifying the liquid material; and said step of peeling the portion of the active material layer comprises peeling the portion of the coating layer, which has been impregnated with the liquid material together with said porous sheet in the integral solidification condition of the liquid material in the active material layer and the liquid material in the porous sheet, to expose partially the surface of the collector based on the prescribed pattern.

33. A process as claimed in claim 1, wherein:

a step of cooling the liquid material to solidify same and a step of bringing a heated porous sheet into contact with the active material layer to remelt a part of the solidified liquid material so as to cause the remelted liquid material to migrate into the porous sheet are conducted in this order between said step of impregnating the active material layer with the liquid material and said step of solidifying the liquid material; and said step of peeling the portion of the active material layer comprises peeling the portion of the coating layer, which has been impregnated with the liquid material, together with said porous sheet in the integral solidification condition of the liquid material in the active material layer and the liquid material in the porous sheet, to expose partially the surface of the collector based on the prescribed pattern.

* * * * *